(12) United States Patent
Obata et al.

(10) Patent No.: US 7,051,349 B2
(45) Date of Patent: May 23, 2006

(54) DISC CARTRIDGE, DISC RECORDING MEDIUM UNIT AND DISC RECORDER AND/OR REPRODUCER

(75) Inventors: Manabu Obata, Kanagawa (JP); Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 10/432,535

(22) PCT Filed: Sep. 26, 2002

(86) PCT No.: PCT/JP02/09957

§ 371 (c)(1),
(2), (4) Date: May 23, 2003

(87) PCT Pub. No.: WO03/030171

PCT Pub. Date: Apr. 10, 2003

(65) Prior Publication Data

US 2004/0080992 A1    Apr. 29, 2004

(30) Foreign Application Priority Data

Sep. 27, 2001  (JP) .............................. 2001-297511

(51) Int. Cl.
*G11B 23/03* (2006.01)
(52) U.S. Cl. .................................... 720/734
(58) Field of Classification Search ................ 720/734, 720/735, 741, 742; 360/133; 219/121.64
See application file for complete search history.

(56) References Cited

U.S. PATENT DOCUMENTS

| | | | |
|---|---|---|---|
| 4,471,397 A | 9/1984 | Cloutier | |
| 4,695,911 A | 9/1987 | Loosen | |
| 5,951,890 A * | 9/1999 | Beuch et al. | 219/121.64 |
| 6,023,398 A * | 2/2000 | Tannert et al. | 360/133 |

(Continued)

FOREIGN PATENT DOCUMENTS

JP          5-12823          1/1993

(Continued)

*Primary Examiner*—Tianjie Chen
(74) *Attorney, Agent, or Firm*—Oblon, Spivak, McClelland, Maier & Neustadt, P.C.

(57) ABSTRACT

The present invention relates to a disk cartridge in which a disk-like recording medium such as an optical disk, a magneto-optical disk and a magnetic disk is accommodated within a disk compartment of a cartridge housing, a disk recording medium device in which the disk-like recording medium is accommodated in advance within the disk compartment so as to become freely rotatable and a disk recording and/or reproducing apparatus for recording and/or reproducing information by using this disk recording medium device. According to a disk cartridge of the present invention, there is provided a disk cartridge composed of a cartridge housing including an upper shell, a rotary member and a lower shell, a shutter member movable between the opening position and the closing position to open and close an opening portion of the cartridge housing and a shutter fixing means for holding the shutter member in the closed state at the closing position and in which the shutter member is held in the opened state at the opening position by the shutter fixing means. According to the present invention, there is no risk that vibrations generated from an external apparatus will be transmitted to the disk cartridge and the like through an open and hold mechanism. Thus, malfunctions caused by vibrations can be prevented or suppressed when information is written in and read out from the disk-like recording medium.

26 Claims, 33 Drawing Sheets

U.S. PATENT DOCUMENTS

| | | | |
|---|---|---|---|
| 6,052,359 A * | 4/2000 | Fujiura | 720/735 |
| 6,094,326 A * | 7/2000 | Ikebe et al. | 360/133 |
| 6,205,116 B1 * | 3/2001 | Hashimoto | 720/741 |
| 6,590,858 B1 * | 7/2003 | Inoue | 720/742 |
| 2001/0040866 A1 | 11/2001 | Shiomi et al. | |

FOREIGN PATENT DOCUMENTS

| | | |
|---|---|---|
| JP | 2000-90628 | 3/2000 |
| JP | 2000-113630 | 4/2000 |

* cited by examiner

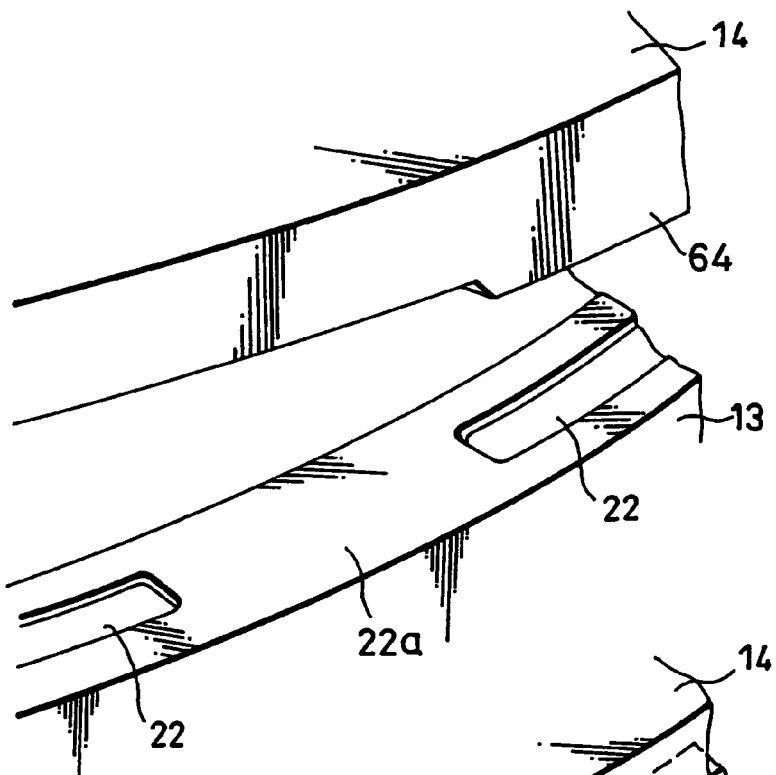
F I G. 23A
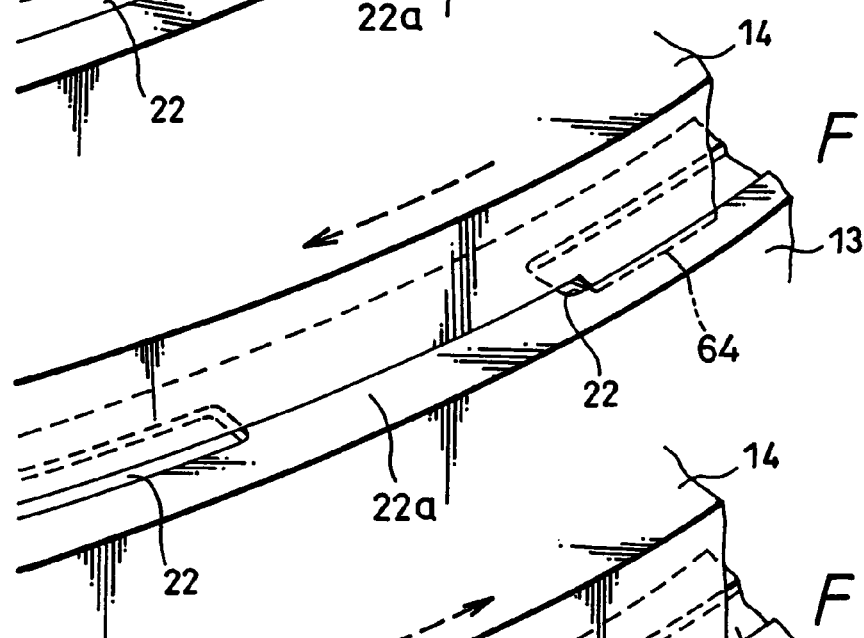
F I G. 23B
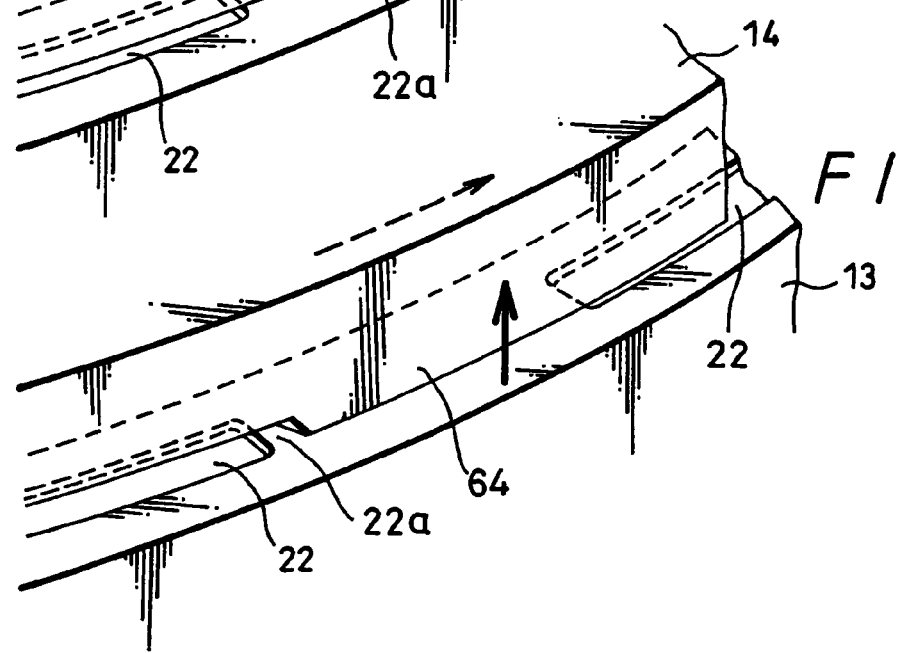
F I G. 23C

Cartridge Insertion Direction

DISC CARTRIDGE, DISC RECORDING MEDIUM UNIT AND DISC RECORDER AND/OR REPRODUCER

This application is a 371 of PCT/JP02/09957 Sep. 26, 2002.

TECHNICAL FIELD

The present invention relates to a disk cartridge in which a disk-like recording medium such as an optical disk, a magneto-optical disk and a magnetic disk is accommodated within a disk compartment of a cartridge housing, a disk recording medium device in which the disk-like recording medium is accommodated within the disk compartment so as to become freely rotatable and a disk recording and/or reproducing apparatus for recording and/or reproducing information by using this disk-like recording medium.

BACKGROUND ART

As a disk recording medium device in which a disk-like recording medium capable of recording and/or reproducing information such as audio data, video data or computer data is accommodated within a cartridge housing so as to become freely rotatable, there is known a disk recording medium device having an arrangement shown in FIG. 42, for example. This disk recording medium device 1 is an information recording media which incorporates therein a write once magneto-optical disk on which users are able to record (write) information such as computer data later on.

This disk recording medium device 1 comprises a cartridge housing 2 composed of a pair of upper shell 2a and lower shell 2b, a magneto-optical disk 4 accommodated within a disk compartment 3 of this cartridge housing 2 so as to become freely rotatable and so forth. The cartridge housing 2 has on its upper and lower surfaces provided an upper and lower opening portion 5 that extends from a central portion to one side. This opening portion 5 can be opened and closed by a shutter member 6 that can slide along one side. The shutter member 6 is constantly spring-biased in the direction to close the opening portion 5 under spring force of a spring, not shown. Reference numeral 6a denotes a presser member for preventing a tip end portion of the shutter member 6 from being disengaged from the opening portion inadvertently.

The magneto-optical disk 4 has at its central portion provided a disk-like center hub 7 made of metal. This center hub 7 is located at the position opposing to the inner end portion of the opening portion 5, i.e. located at substantially the central portion of the cartridge housing 2. A turntable provided on the main body side of an information recording and reproducing apparatus is mounted to the center hub 7. The magneto-optical disk 4 is chucked to the turntable and thereby the magneto-optical disk is rotated at a predetermined velocity (e.g. constant linear velocity). At that time, a magneto-optical pickup device of which the head portion is inserted into the opening portion 5 functions to record or reproduce information on or from the magneto-optical disk 4.

However, in the conventional disk recording medium device having the above-mentioned arrangement, the shutter member 6 that is provided on the cartridge housing 2 so as to become freely slidable is constantly spring-biased in the direction in which it closes the opening portion 3 by a spring. When the disk recording medium device is in use, the shutter member 6 is slid in the direction in which it opens the opening portion 3 to open the opening portion against spring-biasing force of this spring. To this end, a disk recording and reproducing apparatus that records and reproduces an information signal by using this disk recording medium device 1 needs an open and hold mechanism for holding the shutter member 6 at the opening position in order to hold the opening portion 3 in the opened state while the disk recording medium device is in use.

While such open and hold mechanism is generally provided on the disk recording and reproducing apparatus, various vibration sources are existing on the disk recording and reproducing apparatus and shocks are applied to the disk recording and reproducing apparatus from the outside unavoidably. Vibrations generated from this disk recording and reproducing apparatus or shocks inputted to the disk recording and reproducing apparatus from the outside are transmitted through the open and hold mechanism to the disk recording medium device 1. As a result, when vibrations from the disk recording and reproducing apparatus are applied to the disk recording medium device 1, vibrations are transmitted to the magneto-optical disk 4 and a magneto-optical head of a magneto-optical pickup device and the like. There arises a problem in which an information signal is read out from and written in the magneto-optical disk 1 inaccurately.

When external shocks are applied to the disk recording medium device 1, it is unavoidable that the open and hold mechanism for holding the shutter member 6 at the opening position is disengaged from the disk recording and reproducing apparatus. In such case, the shutter member 6 that intends to move toward the closing direction is brought in contact with the optical head of the optical pickup device and the turntable. As a result, there is a risk that the optical head will be broken or that the shutter member 6 itself will be broken.

In particular, as a storage capacity of an optical disk is increasing progressively and a recording density is increasing progressively, pitches of recording patterns is becoming narrower and linear density is increasing more in recent years. Thus, when an information recording surface of a magnetic recording medium such as an optical disk and a magneto-optical disk is vibrated or smudged by dusts and the like, such vibrations and the smudged information recording surface hinder the optical pickup device from reading or writing information correctly. So that information cannot be read out from and written in the disk recording medium device normally.

In view of the aforesaid aspect, it is an object of the present invention to provide a disk cartridge, a disk recording medium device and a disk recording and/or reproducing apparatus in which when a shutter member has finished opening the opening portion, pressure from an open and hold mechanism of an external apparatus and which is used to hold the shutter member at the opening position can be prevented from being applied to a cartridge housing so that the shutter member can be held at the opening position by an inside mechanism.

DISCLOSURE OF THE INVENTION

In a disk cartridge according to the present invention, there is provided a disk cartridge comprising a cartridge housing in which a disk compartment is formed between an upper shell and a rotary member or between the rotary member and a lower shell by combining the upper shell, the rotary member and the lower shell, the rotary member is supported by at least one of the upper shell and the lower shell so as to become freely rotatable and an opening portion is formed on at least one of the upper shell and the lower shell or at least one of the upper shell and the lower shell and the rotary member, a shutter member provided on the cartridge housing so as to become movable between the opening position at which it opens the opening portion and the closing position at which it closes the opening portion in response to rotation of the rotary member, a shutter fixing means for holding the shutter member in the closed state at the closing position and in which the shutter member is held in the opened state at the opening position by the shutter fixing means.

Further, in a disk cartridge according to the present invention, there is provided a disk cartridge comprising a cartridge housing in which a disk compartment is formed by combining an upper shell and a lower shell and an opening portion is provided on at least one of the upper shell and the lower shell, a shutter member provided on the cartridge housing so as to become movable between the opening position at which it opens the opening portion and the closing position at which it closes the opening portion and a shutter fixing means for holding the shutter member in the closed state at the closing position and in which the shutter member is held in the opened state at the opening position by the shutter fixing means.

In a disk recording medium device according to the present invention, there is provided a disk recording medium device comprising a cartridge housing in which a disk compartment is formed between an upper shell and a rotary member or between the rotary member and a lower shell by combining the upper shell, the rotary member and the lower shell, the rotary member is supported by at least one of the upper shell and the lower shell so as to become freely rotatable and an opening portion is provided on at least one of the upper shell and the lower shell or between at least one of the upper shell and the lower shell and the rotary member, a disk-like recording medium accommodated within the disk compartment so as to become freely rotatable, a shutter member provided on the cartridge housing so as to become movable between the opening position at which it opens the opening portion and the closing position at which it closes the opening portion in response to rotation of the rotary member and a shutter fixing means for holding the shutter member in the closed state at the closing position and in which the shutter member is held in the opened state at the opening position by the shutter fixing means.

Further, in a disk recording medium device according to the present invention, there is provided a disk recording medium device comprising a cartridge housing in which a disk compartment is formed by combining an upper shell and a lower shell and an opening portion is provided on at least one of the upper shell and the lower shell, a disk-like recording medium accommodated within the disk compartment so as to become freely rotatable, a shutter member provided on the cartridge housing so as to become movable between the opening position at which it opens the opening portion and the closing position at which it closes the opening portion and a shutter fixing means for holding the shutter member in the closed state at the closing position and in which the shutter member is held in the opened state at the opening position by the shutter fixing means.

In a disk recording and/or reproducing apparatus according to the present invention, there is provided a disk recording and/or reproducing apparatus comprising a disk recording medium device including a cartridge housing in which a disk-like recording medium is accommodated within a disk compartment so as to become freely rotatable, a shutter member movable between the opening position at which it opens an opening portion provided on the cartridge housing so as to expose a part of the disk-like recording medium and the closing position at which it closes the opening portion and a shutter fixing means for holding the shutter member in the closed state at the closing position, a shutter opening and closing means for opening and closing the opening portion by moving the shutter member in response to inserting and ejecting operations of the disk recording medium device and a table drive apparatus to which the disk recording medium device is loaded detachably and which is inserted into the disk recording and/or reproducing apparatus from the opening portion opened by the shutter opening and closing means to chuck and rotate the disk-like recording medium, wherein the cartridge housing is formed by combining the upper shell and the lower shell or by combining the upper shell, the rotary member and the lower shell, the disk compartment is formed between the upper shell and the lower shell or between the upper shell and the rotary member or between the rotary member and the lower shell and the shutter member is held in the opened state at the opening position by the shutter fixing means.

BRIEF DESCRIPTION OF DRAWINGS

FIGS. 23 are perspective views to which reference will be made in explaining the manner in which the rotary member is elevated and lowered relative to the upper shell when the opening portion of the disk recording medium device according to the present invention is opened and closed, wherein FIG. 23A is an exploded perspective view, FIG. 23B is a perspective view showing the state in which the rotary member is lowered relative to the upper shell and FIG. 23C is a perspective view showing the state in which the rotary member is elevated relative to the upper shell.

BEST MODE FOR CARRYING OUT THE INVENTION

Embodiments of the present invention will be described below with reference to the accompanying drawings. FIGS. 1 to 41 are diagrams showing embodiments of a disk cartridge, a disk recording medium device and a disk recording and/or reproducing apparatus according to the present invention.

In the present application, "disk cartridge" refers to such a disk cartridge having a main arrangement comprising an upper shell, a lower shell or an upper shell, a lower shell and a rotary member and one or a pair of shutter members (two shutter members and a combination of more than three shutter members may be possible) and a housing presented before a disk-like recording medium is accommodated. A "disk recording medium device" refers to such a disk recording medium device in which a disk-like recording medium is accommodated within a disk compartment and which comprises a combination of a cartridge housing and a disk-like recording medium. Further, "disk recording and/or reproducing apparatus" refers to such a disk recording and/or reproducing apparatus which comprises a combination of a disk recording medium device, a table drive apparatus and the like.

A disk recording medium device 10 including a disk cartridge according to the present invention accommodates therein a read-only optical disk in which various information signals such as a music signal as audio information and a video signal and a music signal as video information are recorded in advance or an optical disk in which information signals such as audio information and video information can be recorded only once (write once optical disk) or an optical disk 11 in which information signals such as audio information and video information can be recorded repeatedly (rewritable optical disk) as a disk-like recording medium.

However, the disk-like recording medium is not limited to the above-mentioned optical disks and a magnetic disk having a magnetic thin film layer formed on the surface of a thin disk to store information based upon the magnetization state of the specific position, a magneto-optical disk capable of writing or reading information in or out of a similarly formed magnetic thin film layer by the use of an optical head and a magnetic head and other disk-like recording mediums can be applied to the present invention, for example.

Figure 1:
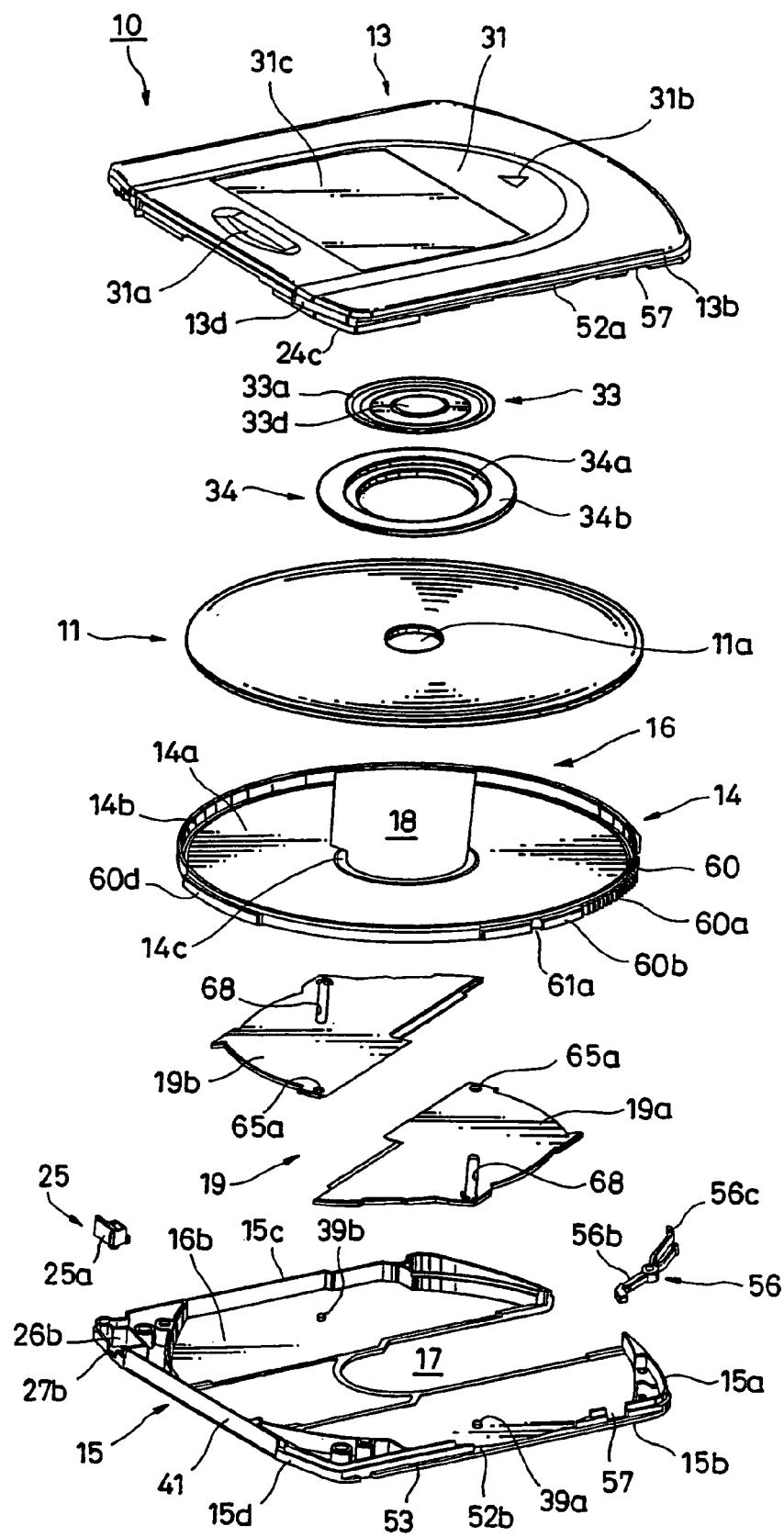
FIG. 1 is an exploded perspective view showing a disk recording medium device according to an embodiment of the present invention from the upper surface side in an exploded fashion.
Figure 2:
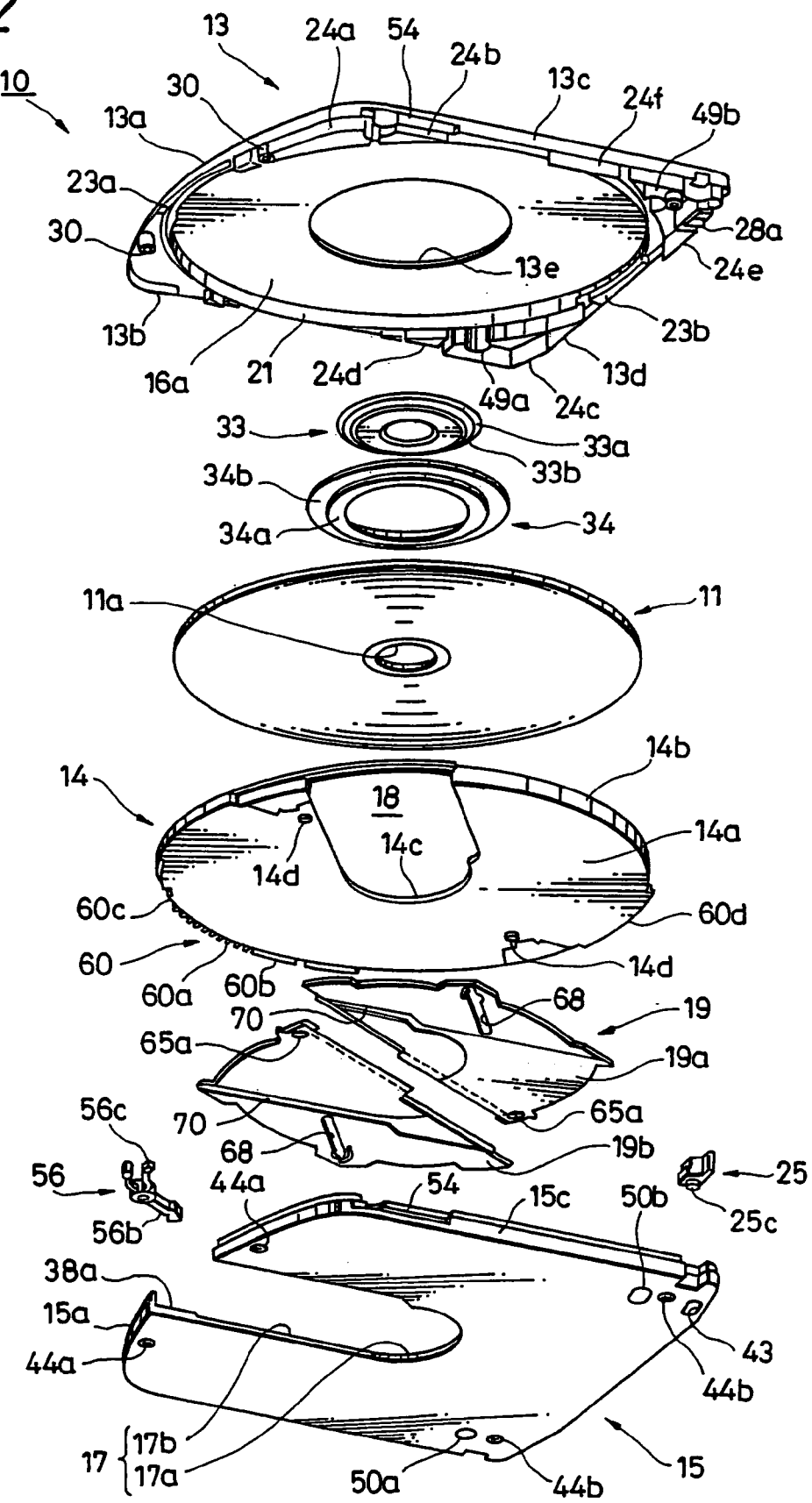
FIG. 2 is an exploded perspective view showing a disk recording medium device according to an embodiment of the present invention from the lower surface side in an exploded fashion.

The disk recording medium device 10 comprises, as shown in FIGS. 1 and 2, a cartridge housing 12 formed by combining a pair of an upper shell 13, a rotary member 14 and a lower shell 15, an optical disk 11 accommodated within a disk compartment 16 formed within this disk cartridge 12 so as to become freely rotatable, a pair of shutter members 19a, 19b for opening and closing an inside opening portion 18 and an outside opening portion 17 formed in the rotary member 14 and the lower shell 15 and the like. The disk cartridge is obtained by removing the optical disk 11 from this disk recording medium device 10.

Since the disk recording medium device 10 generally uses the optical disk 11 such that the optical disk is placed in the horizontal state, the shell disposed on the upper side of the optical disk 11 is referred to as the "upper shell 13" and the shell disposed on the lower side of the optical disk 11 is referred to as the "lower shell 15". However, the disk recording medium device 10 is also able to use the optical disk 11 such that the optical disk 11 is placed in the vertical state or in the oblique state. In such case, the upper shell 13 in this embodiment may be referred to as a "first shell" and the lower shell 15 may be referred to as a "second shell".

As shown in FIGS. 1 to 4, the upper shell 13 is formed of a thin dish-like member having substantially a square shape of which the front side is shaped like an arc. This upper shell 13 has a lower surface (surface appearing as a front surface in FIG. 4) in which an annular upper inner surface wall 21 continued in the circumferential direction is formed at the central portion thereof. A circular upper concave portion 16a is set on the inside of this upper inner surface wall 21. Then, an annular cam groove 22 is provided on the outside of the upper inner surface wall 21 so as to be continued in the circumferential direction to surround the upper inner surface wall 21. Cam portions 22a of predetermined lengths (portions hatched in a cross-stripes fashion) are provided at three portions of the circumferential direction of the cam groove 22 with substantially an equal interval. The cam portion 22a is adapted to lift up the rotary member 14 so that the rotary member may approach the lower shell 15 when the rotary member 14 is rotated, displaced and moved to a predetermined position of the upper shell 13. Actions of the cam portion 22a will be described in detail later on.

On the outer peripheral edge of the upper shell 13, there are formed an upper front edge 13a, left and right upper side surface edges 13b, 13c and an upper rear surface edge 13d. The upper front surface edge 13a has a first concave portion 23a formed at its substantially central portion to properly position the lower shell 15 and to insert and eject an optical head which will be described later on. A central portion of the upper rear surface edge 13d is concaved in the inside to provide a concave portion $13_{d0}$ to which the lower rear surface edge of the lower shell 15 is attached. Further, the upper rear surface edge 13d has a second concave portion 23b formed at its substantially central portion to properly position the lower shell 15. Then, the upper inner surface wall 21 has recesses 21a, 21b of shapes and sizes corresponding to the respective concave portions 23a, 23b formed at its positions opposing to the first and second concave portions 23a, 23b.

Two front upper surrounding walls 24a, 24b are formed on one upper front surface edge 13a and between the upper side surface edge 13c and the cam groove 22 of the upper shell 13 with a predetermined clearance. Further, among the upper rear surface edge 13d, the upper side surface edge 13b and the cam groove 22, there are provided two rear upper surrounding walls 24c, 24d with a predetermined clearance. Then, two rear side upper surrounding walls 24e, 24f are formed on the upper rear surface edge 13d and between the upper side surface edge 13c and the cam groove 22d with a predetermined clearance. These upper surrounding walls 24a to 24f are set to be higher than the upper inner surface wall 21. In particular, the three upper surrounding walls 24a, 24c and 24e located at the respective corner portions are set to be high enough to contact with the inner surface of the lower shell 15 upon assembly-process.

Further, on the inside of the rear upper surrounding wall 24e of the upper shell 13, there is provided an upper concave portion 26a of a plug housing portion 26 to which a mis-erase prevention member 25, which will be described later on, is attached slidably. This upper concave portion 26a is formed of the upper rear surface edge 13d with an upper recess 27a for forming the upper half of the opening window 27 for sliding the mis-erase prevention member 25 and an upper housing wall 28a provided so as to surround the inside of the upper recess 27a. Then, the upper concave portion 26a is provided with a guide portion 29 having two notches formed thereon to intermittently render the mis-erase prevention member operative. Further, the upper shell 13 has screw fixing protrusions 30 formed at its four corner portions to fix the lower shell 15 by screws.

Figure 3:
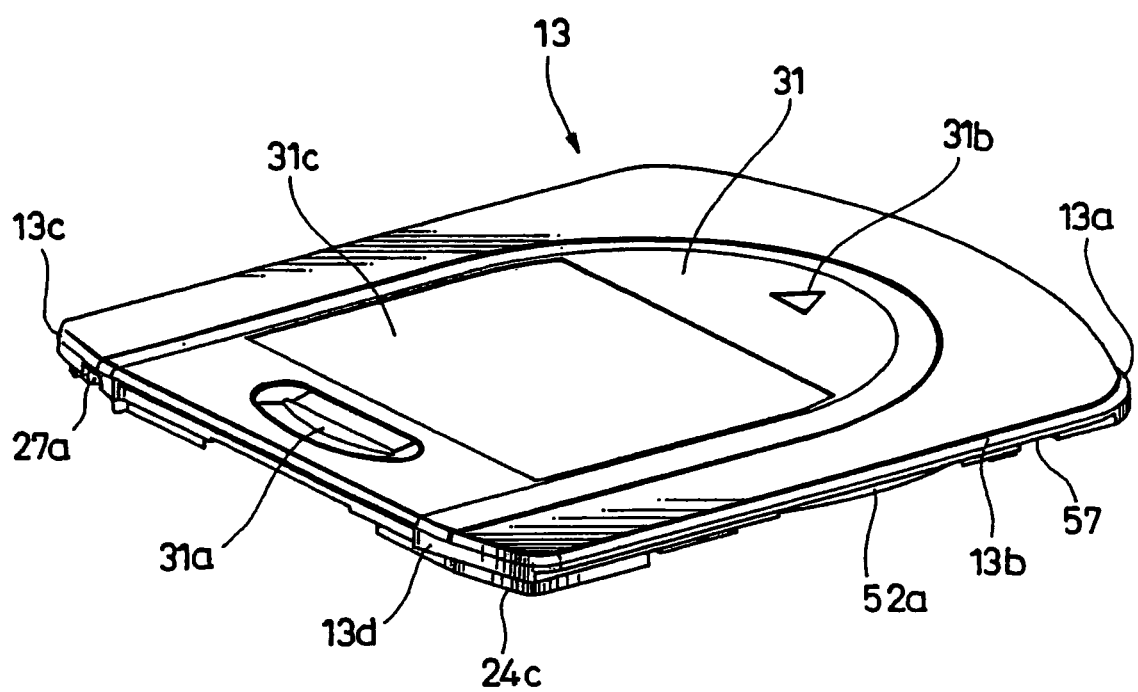
FIG. 3 is a perspective view showing an upper shell of a disk cartridge for use with a disk recording medium device according to the present invention from the upper surface side.

As shown in FIG. 3, the upper surface of the upper shell 13 is slightly expanded upwardly from the central portion to the rear surface, and an expanded portion 31 of the upper shell has a nonskid holding concave portion 31a formed at its rear surface to prevent a user from slipping the disk recording medium device when a user holds the disk recording medium device. This expanded portion 31 has a triangular instruction mark 31b formed at its front surface to indicate the correct insertion direction in which the disk recording medium device 10 should be inserted into the disk recording and reproducing apparatus. An upper surface attachment surface 31c is provided between the instruction mark 31b and the holding concave portion 31a to attach a label where users can write recorded contents and other necessary items.

A chucking ring 33 is supported at the central portion of the inner surface of this upper shell 13 by a ring holder 34 so as to become freely rotatable. The chucking ring 33 and the ring holder 34 have arrangements shown in FIGS. 5 and 6 in an enlarged-scale. Specifically, the chucking ring 33 is shaped like a disk made of a magnetic material (e.g. stainless steel SUS430, etc.) that can be attracted by a magnet. Then, a plurality of annular concave and convex portions having different diameters are provided at concentric circles, whereby the chucking ring 33 is provided with a flange portion 33a located at the outermost periphery of the concentric circle, a holding portion 33b that contacts with the optical disk 11, a tapered portion 33c set between the holding portion 33b and the flange portion 33a, a position restriction portion 33d located at the innermost periphery of the concentric circle and an escape portion 33e set between the position restriction portion 33d and the holding portion 33b.

The holding portion 33b of the chucking ring 33 plays a role of a presser portion for pressing the optical disk against the turntable by pressing the peripheral edge portion that surrounds the center hole 11a of the optical disk 11. This holding portion 33b projects to one surface side and the flange portion 33 projects to the opposite surface side. Then, with a proper step difference between the surface of the flange portion 33a and the surface of the holding portion 33b, the escape portion 33e and the position restriction portion 33d are set from the side of the holding portion 33b to the flange portion 33a.

Figure 21:
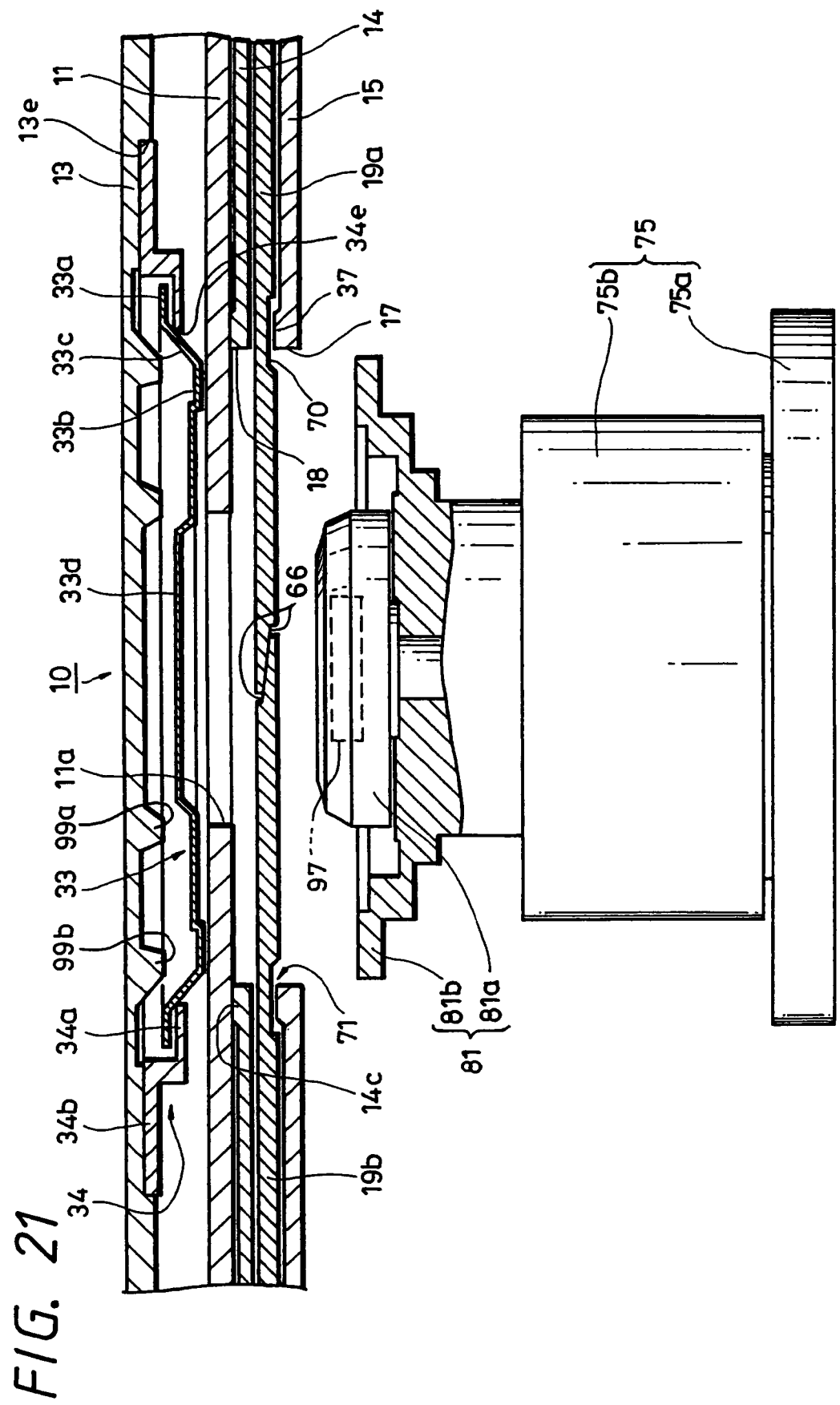
FIG. 21 is an explanatory diagram view to which reference will be made in explaining chucking in the disk recording medium device according to the present invention and illustrates, in a cross-sectional fashion, the state obtained before an optical disk is attached to the turntable.
Figure 22:
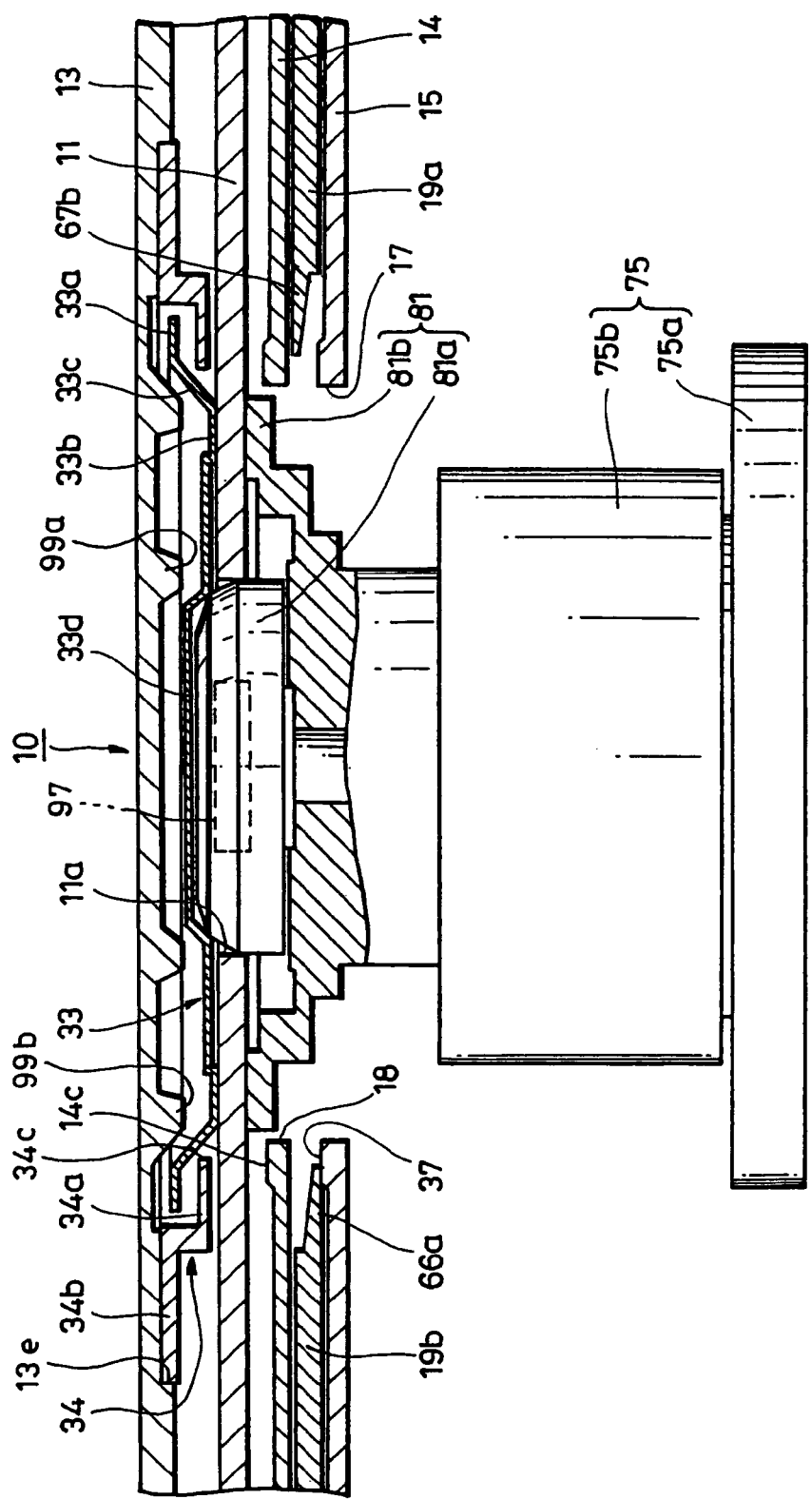
FIG. 22 is an explanatory diagram to which reference will be made in explaining chucking in the disk recording medium device according to the present invention and illustrates, in a cross-sectional fashion, the state obtained after the optical disk has been attached to the turntable.

The position restriction portion 33d of the chucking ring 33 opposes the tip end portion of the fitting portion 81a of the turntable 81 as shown in FIGS. 21 and 22 and serves as a magnetic force reception portion that receives magnetic force of a magnet 97 incorporated within the fitting portion 81a. This position restriction portion 33d is provided at its center with a tapered concave portion 33f matched with the shape of the tip end portion of the fitting portion 81a. Upon chucking, the tip end portion of the fitting portion 81a is fitted into the tapered concave portion so as to become freely detachable.

The ring holder 34 is generally shaped like a ring and includes an inward inside flange 34a formed at one surface side and an outward outside flange 34b formed on the other surface side. The ring holder 34 supports the chucking ring 33 such that the chucking ring is accommodated therein so as to become freely rotatable. The chucking ring has the outside flange 34b integrally fixed to substantially the central portion of the inner surface of the upper shell 13 by a fixing means such as fusion or adhesion using an adhesive agent. In order to make the surface of the outside flange 34b of the ring holder 34 become flush with the inner surface of the upper shell 13, the upper shell 13 has an attachment hole 13e into which the outside flange 34b is fitted.

Although the inside diameter of the inside flange 34a of this ring holder 34 is larger than the outside diameter of the holding portion 33b of the chucking ring 33, the inside diameter of the inside flange is smaller than the inside diameter of the flange portion 33a and is large enough to come in contact with the slanting surface of the tapered portion 33c. Accordingly, the thick portion set on the inside of the radius portion of the chucking ring 33 is inserted into the center hole 34c of the ring holder 34 up to its intermediate portion. Then, the tapered portion 33c of the chucking ring 33 is supported from the underside by the inner peripheral edge of the inside flange 34a of the ring holder 34. As a consequence, within the ring holder 34, the chucking ring 33 can be moved in the plane direction in a predetermined range and can also be moved in the thickness direction (axis direction) perpendicular to the plane direction within a predetermined range.

The attachment hole 13e formed on the inner surface of the upper shell 13 is provided with two annular convex portions 98a, 98b in correspondence with the shape of the above-mentioned ring holder 34. Two annular convex portions 99a, 99b are shaped so as to become concentric with the center of the chucking ring 33. The outer surface of the position restriction portion 33d is opposed to the inner surface of the first annular convex portion 99a set at the inside and the inner surface of the tapered portion 33c of the chucking ring 33 is opposed to the outer surface of the second annular convex portion 99b set at the outside. According to the existence of the first and second annular convex portions 99a, 99b, an inclination angle of the chucking ring 33 can be decreased in the state in which the disk recording medium device 10 is placed in the vertical direction.

The lower shell 15 is combined with the lower surface of the upper shell 13. As shown in FIGS. 1, 2, 14 and 15, the lower shell 15 has the outside shape approximately similar to that of the upper shell 13 and is formed of a thin dish-like member of approximately square-shape of which the front surface side is shaped like an arc. This lower shell 15 is provided with the outside opening portion 17 that is opened in the front surface side. The outside opening portion 17 comprises a table opening portion 17a provided at substantially the central portion of the lower shell 15 and a head opening portion 17b extended from this table opening portion 17a along the radius direction and which is opened in the front surface.

The outside opening portion 17 is adapted to enable a turntable of a table drive device, which will be described later on, and an optical head of an optical pickup device, which will be described later on, to face the optical disk 11 accommodated within the disk compartment 16. The outside opening portion is wide enough to enter and eject the turntable of the table drive apparatus and the optical head of the optical pickup device. Specifically, the turntable is entered into and ejected from the table opening portion 17a and the optical head is entered into and ejected from the head opening portion 17b.

Moreover, the lower shell 15 has lower inner surface walls 36a, 36b, 36c and 36d of arc-shapes formed at its four corners, and the lower concave portion 16b is set on the inside of the inner surface walls 36a to 36d. Further, the outside opening portion 17 of the lower shell 15 has a rib 37 formed at its inner surface peripheral edge to decrease a clearance between it and the shutter member for increasing an airtight property.

The rib 37 includes an arc-like rib portion 37a formed along the peripheral edge of the table opening portion 17a in a semicircle fashion, linear rib portions 37b, 37b formed along the two edges of the head opening portion 17b in parallel to each other and symmetrical rib portions 37c, 37c extended in the opposite direction so as to well balance with the linear rib portions 37b. The two linear rib portions 37b and the two symmetrical rib portions 37c have shield portions 38a, 38b formed at their outside portions to close clearances formed at the outside portions of the two shutter members 19a, 19b.

Further, within the lower concave portion 16b of the lower shell 15, there is provided a pair of operation convex portions 39a, 39b for opening and closing a pair of shutter members 19a, 19b based upon the rotation movement of the rotary member 14. A pair of operation convex portions 39a, 39b is disposed at both sides of the outside opening portion 35 so as to sandwich the table opening portion 17a.

The lower shell 15 has a lower front surface edge 15a, right and left lower side surface edges 15b, 15c and a lower rear surface edge 15d formed at its outer peripheral edge. The lower front surface edge 15a, the lower side surface edges 15b, 15c and the lower rear surface edge 15d have stepped structures in which stepped portions are formed on the intermediate portions of the height directions and in which the upper portions increase in thickness. The thin portions of the lower front surface edge 15a, the right and left lower side surface edges 15b, 15c and the lower rear surface edge 15d enter the inside portions of the upper front surface edge 13a, the upper side surface edges 13b, 13c and the upper rear surface edge 13d of the upper shell 13 to cause the respective stepped portions to come in contact with the respective lower end faces of the upper front surface edge 13a, the upper side surface edges 13b, 13c and the upper rear surface edge 13d.

An opening end 40a of the head opening portion 17b defined at substantially the central portion of the lower front surface edge 15a of the lower shell 15 engages with the first concave portion 23a of the upper shell 13 so that the front side is properly positioned. The lower rear surface edge 15d has a positioning portion 40b (see FIG. 32) formed at its central portion to engage with the second concave portion 23b of the upper shell 13 so that the rear side is properly positioned. This positioning portion 40b has a label attachment wall 41 provided at its outside and the outer surface of the label attachment wall serves as a label attachment surface. This label attachment wall 41 considerably projects toward the side of the upper shell 13 so as to become able to keep a flat surface portion as wide as possible. Upon assembly-process, this label attachment wall is inserted into the concave portion $13_{d0}$.

The lower front surface edge 15a, the lower side surface edge 15c and the inner surface wall 36b of the lower shell 15 constitute a front lower surrounding wall 42a. Further, the lower rear surface edge 15d, the lower side surface edge 15b and the lower inner surface wall 36c constitute a rear lower surrounding wall 42b. Then, the lower rear surface edge 15d, the lower side surface edge 15c and the lower inner surface wall 36d constitute a rear lower surrounding wall 42c. As a result, when the upper and lower shells 13, 15 are assembled, the front upper surrounding wall 24a of the upper shell 13 is fitted into the inside of the front lower surrounding wall 42a. Then, the rear upper surrounding wall 24c is fitted into the inside of the rear lower surrounding wall 42b, and the rear upper surrounding wall 24e is fitted into the inside of the rear lower surrounding wall 42c.

Further, on the inside of the rear lower surrounding wall 42c of the lower shell 15, there is provided the lower concave portion 26b to which the mis-erase prevention member 25 is attached. This lower concave portion 26b is composed of the lower rear surface edge 15d in which the lower recess 27b forming the lower half of the opening window 27 is formed and the lower housing wall 28b provided so as to surround the inside of the lower recess 27b. This lower concave portion 26b has a guide groove 43 formed on its lower surface to guide the mis-erase prevention member 25 to thereby restrict the slide direction. This lower concave portion 26b and the upper concave portion 26a constitute the plug housing portion 26.

Figure 13:
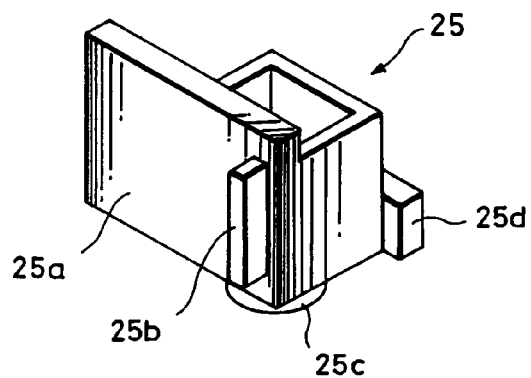
FIG. 13 is a perspective view showing a mis-erase prevention member of the disk cartridge for use with the disk recording medium device according to the present invention from the upper surface side.
Figure 14:
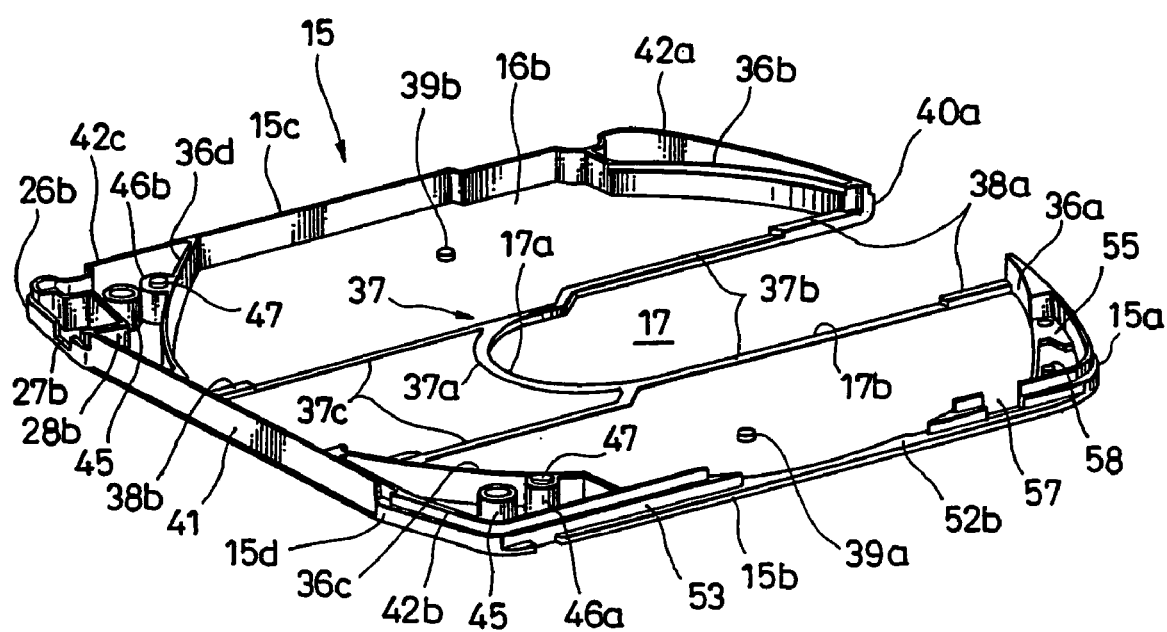
FIG. 14 is a perspective view showing the lower shell of the disk cartridge for use with the disk recording medium device according to the present invention from the upper surface side.

This mis-erase prevention member 25 has an arrangement that is shown in FIG. 13 in an enlarged-scale. Specifically, the mis-erase prevention member 25 is generally shaped like a cube and the front portion 25a is provided with a projection portion which projects to one side. The opposite side of the projection portion of this front portion 25 is provided with an operation protrusion 25b that is used by users to slide the mis-erase prevention member 25. Further, the mis-erase prevention member 25 has a guide protrusion 25c formed on its lower surface to slidably engage with the guide groove 43 of the lower shell 15. The mis-erase prevention member has an engagement portion 25d provided on the rear surface opposite to the front surface portion 25a to engage with the guide portion 29 to prevent the mis-erase prevention member from being dropped. Although not shown, in the vicinity of this engagement portion 25d, there is provided a resilient member that is resiliently engaged with the recess of the guide portion 29, although not shown. Resilience of this resilient member may enable users to feel sense of clicking when users slide the mis-erase prevention member.

Figure 15:
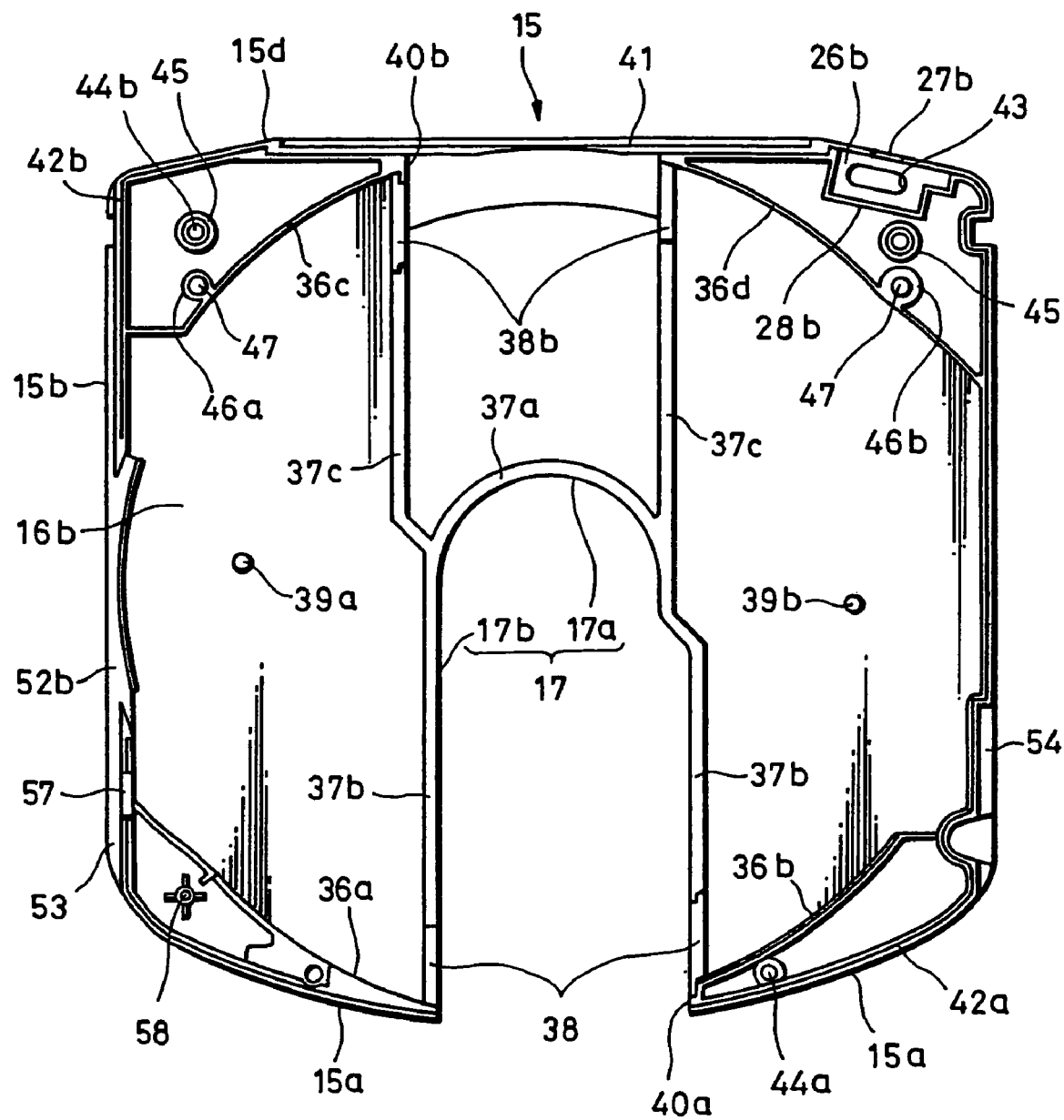
FIG. 15 is a plan view of the lower shell of the disk cartridge for use with the disk recording medium device according to the present invention.

Further, as shown in FIG. 15, the lower shell 15 has front attachment holes 44a and back attachment holes 44b provided at four corner portions to fasten the lower shell 15 to the upper shell 13 by screws. The respective rear attachment holes 44b extend through cylindrical cylinder shaft portions 45 provided on the inner surface of the lower shell 15 and the tapping protrusions 30 of the upper shell 13 are fitted into the inner surface side of the respective attachment holes 44b.

Further, in the vicinity of the respective cylinder shaft portions 45, there are provided positioning shaft portions 46a, 46b. While the first positioning shaft portion 46a is formed as a planar circle-like convex portion, the second positioning shaft portion 46b is formed as a planar oblong convex portion. The two positioning shaft portions 46a, 46b have a pair of reference protrusions 47, 47 provided at their upper ends to properly position the upper and lower shells 13, 15. A pair of reference protrusions 47, 47 is circular in plane shape and is approximately the same in height.

Figure 4:
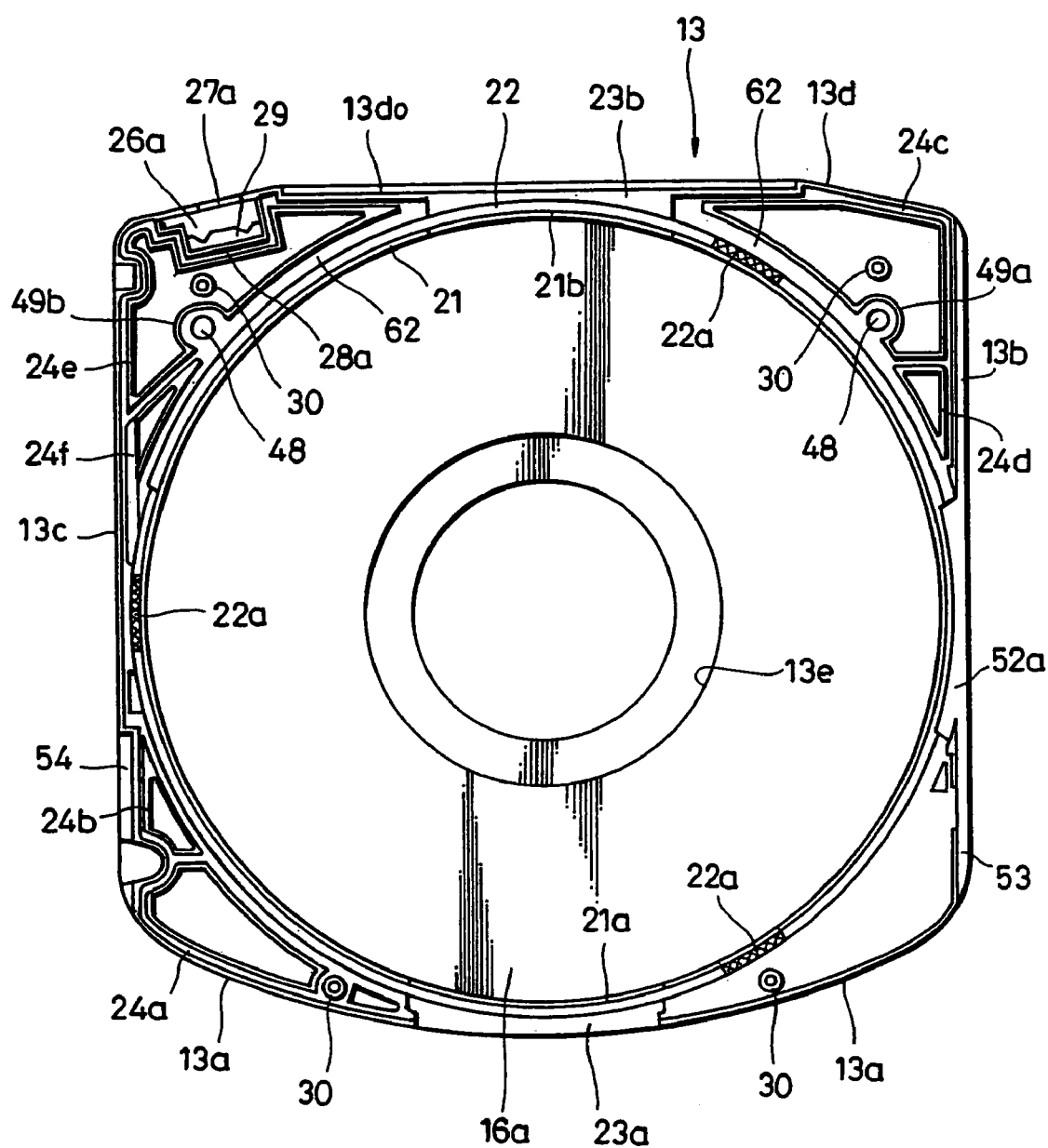
FIG. 4 is a bottom view of the upper shell of the disk cartridge for use with the disk recording medium device according to the present invention.
Figure 5:
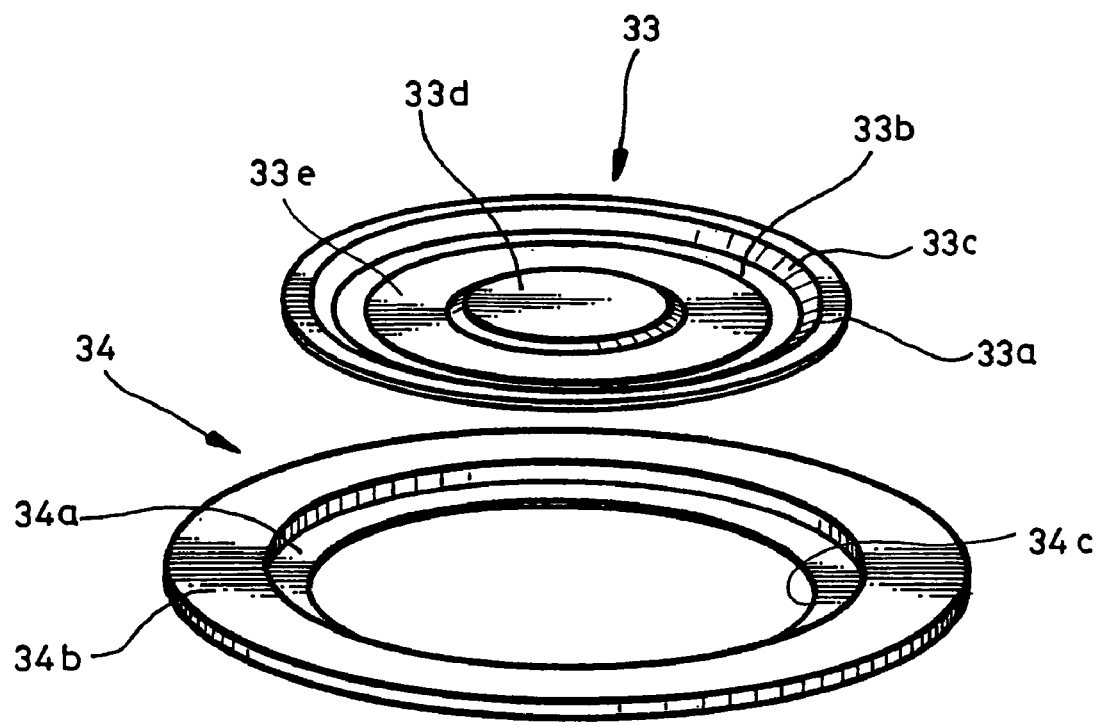
FIG. 5 is a perspective view showing a chucking ring and a ring holder attached to the upper shell of the disk cartridge for use with the disk recording medium device according to the present invention from the upper surface side.
Figure 6:
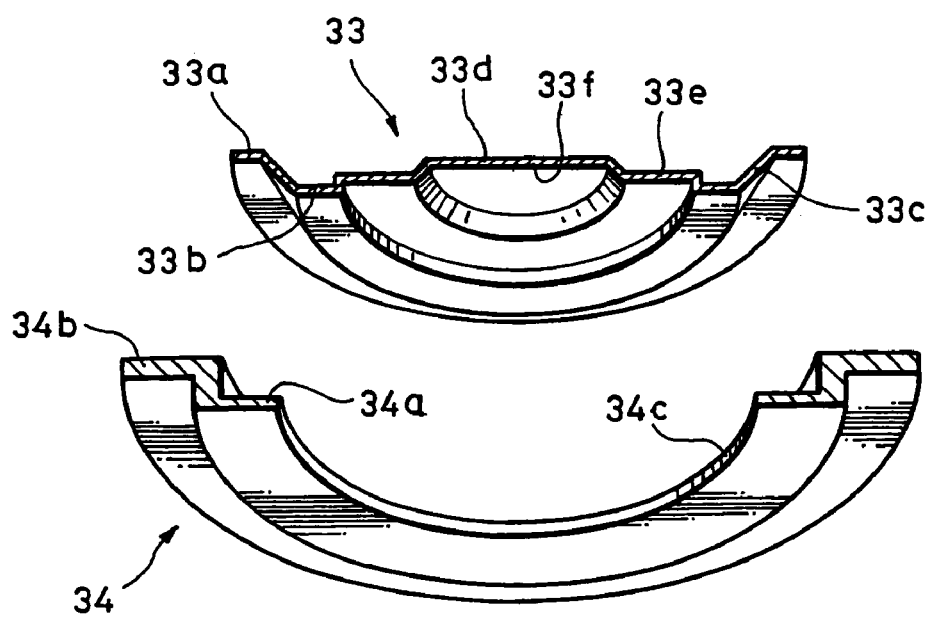
FIG. 6 is a perspective view showing the central portions of the chucking ring and the ring holder attached to the upper shell of the disk cartridge for use with the disk recording medium device according to the present invention from the lower surface side in a cross-sectional fashion.
Figure 20:
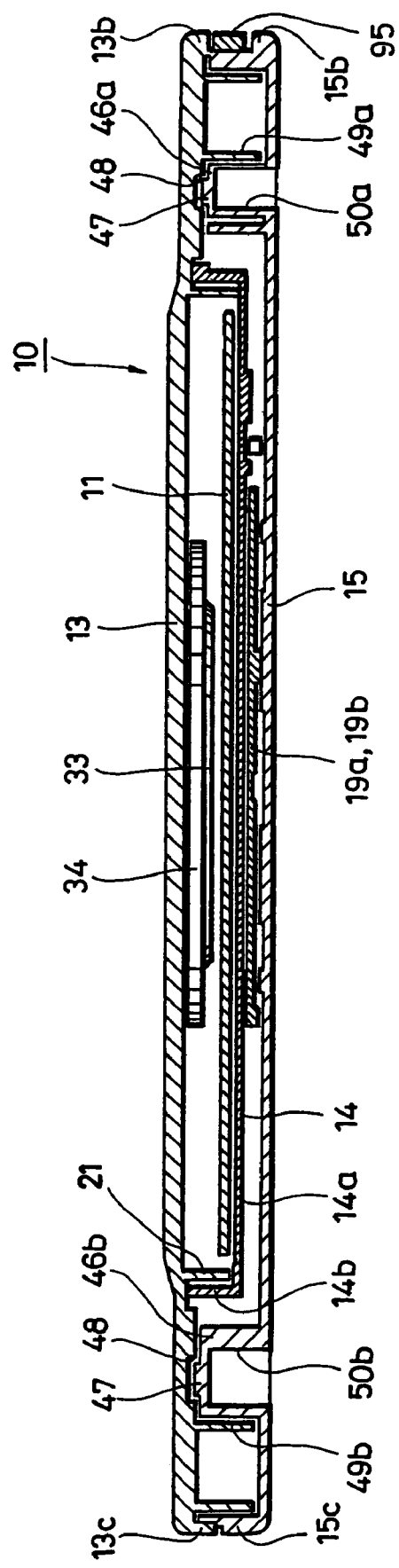
FIG. 20 is an explanatory cross-sectional view taken along the lines connecting a pair of positioning holes of the disk recording medium device shown in FIG. 17.

The upper shell 13 has a pair of reference holes 48, 48 corresponding to a pair of reference protrusions 47, 47 as shown in FIG. 20. In order to avoid interference with the respective reference protrusions 47, the upper shell 13 has an escape portion 49a curved like a circle and an escape portion 49b curved like an ellipse provided at the rear upper surrounding wall 24c and the rear upper surrounding wall 24e as shown in FIG. 4.

The lower shell 15 has a pair of positioning holes 50a, 50b provided at its positioning shaft portions 46a, 46b to open in the lower surface opposite to the reference protrusion 47. A pair of positioning holes 50a, 50b is adapted to properly position the disk recording medium device 10 at the disk loading portion that is the predetermined position of the disk recording and reproducing apparatus. To this end, while the first positioning hole 50a is circular as seen from the flat surface, the second positioning hole 50b is shaped like an oblong ellipse hole that can absorb size error generated in the horizontal direction when the disk recording medium device is properly positioned to the disk loading portion.

The rotary member 14 is made freely rotatable within the upper and lower concave portions 16a, 16b formed when the upper shell 13 and the lower shell 15 having the above-mentioned arrangements are combined together. The upper and lower shells 13, 15 and the rotary member 14 constitute the cartridge housing 12.

One side edge portions 13b, 15b of the upper and lower shells 13, 15 thus combined have an opening window 52 formed at approximately their central portions to expose a part of the outer peripheral surface of the rotary member 14. This opening window 52 consists of an upper recess portion 52a provided at the joint portion of the upper shell 13 and a lower recess portion 52b provided at the joint portion of the lower shell 15. Further, the upper and lower shells 13, 15 have a loading guide groove 53 provided at their one side edge portions 13b, 15b to extend along their joint surface in the front and rear direction. The loading guide groove 53 is provided in order to enable a shutter opening and closing means, which will be described later on, to rotate the rotary member 14 when the shutter opening and closing means is inserted into the loading guide groove.

The other side edge portions 13c, 15c have a mis-insertion detection groove 54 extended in somewhere of the front and rear direction along the joint surface in an opposing relation to this loading guide groove 53. Half portions of the loading guide groove 53 and the mis-insertion detection groove 54 are provided on the upper shell 13 and the lower shell 15 so that square grooves are respectively formed when the two shells 13, 15 are combined together. According to the combination of the loading guide groove 53 and the mis-insertion detection groove 54, the disk recording medium device 10 can be prevented from being erroneously inserted into the apparatus when the disk recording medium device is loaded onto the table drive apparatus and hence the disk recording medium device 10 can constantly be loaded onto the table drive apparatus with correct attitude.

Further, a lock housing portion 55 is formed on the inside of one front edge portions 13a, 15a of the upper and lower shells 13, 15. Then, the lock housing portion 55 has a lock member 56, which shows a concrete example of a shutter fixing means, swingably provided thereon to lock the rotary member 14 at predetermined position. The lock housing portion 55 is communicated with the lower concave portion 16b and is also communicated with the loading guide groove 53 through an opening hole 57 bored on one side edge portions 13b, 15b. A support shaft 58 which swingably supports the lock member 56 is provided on the lower shell 15 forming one of the lock housing portion 55 in such a manner as to protrude toward the side of the upper shell 13.

Figure 11:
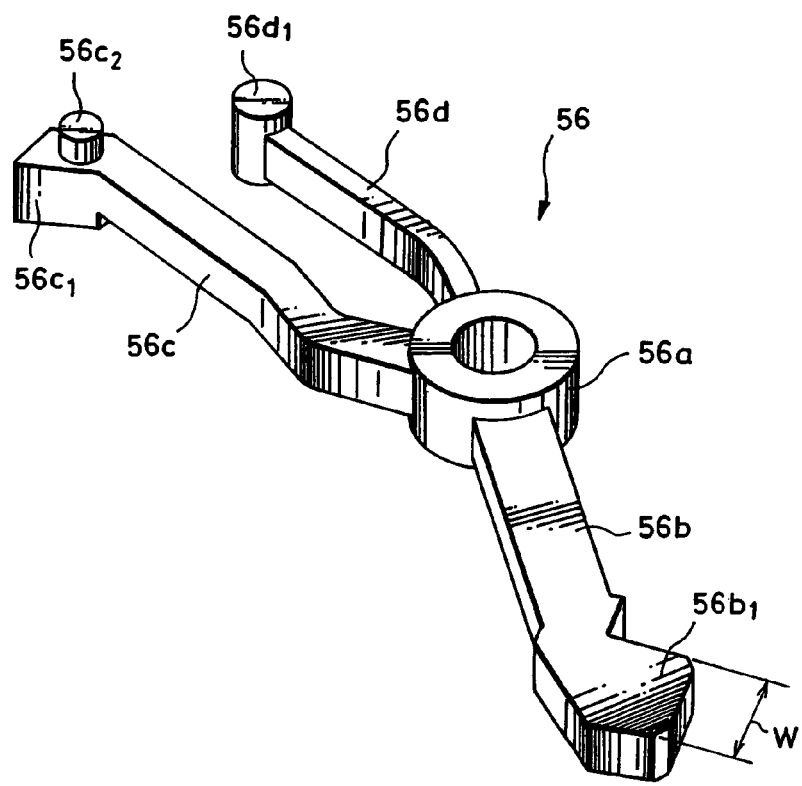
FIG. 11 is a perspective view showing a lock member of the disk cartridge for use with the disk recording medium device according to the present invention from the upper surface side.
Figure 12:
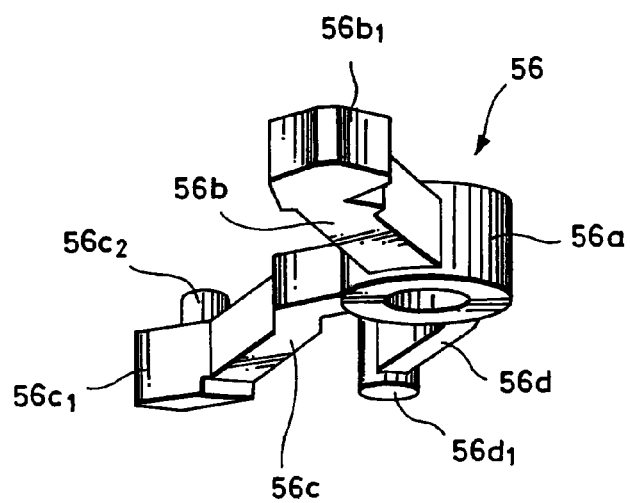
FIG. 12 is a perspective view showing the lock member of the disk cartridge for use with the disk recording medium device according to the present invention from the lower surface side.

As shown in FIGS. 11 and 12 in an enlarged-scale, the lock member 56 is formed of a lever-like member that is fitted into the support shaft 58 so as to become freely rotatable and which can swing in the plane direction. Specifically, the lock member 56 consists of an annular rotary shaft portion 56a, an operation arm 56b projecting to one side from this rotary shaft portion 56a and a lock arm 56c and a resilient arm 56d, both of which are projecting to the other side from the rotary shaft portion 56a. The operation arm 56 has an input portion $56_{b1}$ provided at its tip end to project in the lateral direction. The input portion $56_{b1}$ of the operation arm 56b has a hammerhead-like shape and has strength large enough to endure pressing force applied from the lateral direction.

Pushing force is applied to the input portion $56_{b1}$ of this operation arm 56 by a rack portion 85a of a rack rod 95 which will be described later on. Specifically, when the disk recording medium device 10 is loaded onto the disk recording and/or reproducing apparatus, the gear teeth of the rack portion 95a are brought in contact with the input portion $56_{b1}$ from the lateral direction due to relative movement between the disk recording medium device and the rack rod 95 so that the input portion $56_{b1}$ is pushed into the opening hole 57 by pressing force of the gear teeth. Then, a plurality of gear teeth of the rack portion 95a are sequentially brought in contact with the surfaces opposing the loading guide groove 53 of the input portion $56_{b1}$, whereby the input portion $56_{b1}$ is held within the opening hole 57.

A direction w in which external force that is pushing force on the surface in which each addendum of the rack portion 85a comes in contact with the input portion $56_{b1}$ acts is set to be longer than an addendum distance x of the rack portion 95a that is the same as the addendum distance x of the gear portion 60a of the operated portion 60 provided on the rotary member 14 so as to rotate the rotary member 14. As described above, when the length w of the input portion $56_{b1}$ at its direction in which external force acts is set to be longer than the addendum distance x of the rack portion 95a, it is possible to prevent the disk cartridge from being broken when the disk cartridge is caught with addendums of the rack portion 95a. A relationship between the length w of this input portion $56_{b1}$ and the addendum distance x of the rack portion 95a will be described in detail with reference to FIG. 41 later on.

The lock arm 56c and the resilient arm 56d of the lock member 56 have a clearance of a proper size formed therebetween. The resilient arm 56d is given resilience of proper strength. Then, the lock arm 56c has a lock claw $56_{c1}$ provided at its tip end and the resilient arm 56d has a support head portion $56_{d1}$ provided at its tip end. The lock claw $56_{c1}$ of the lock arm 56 is formed of a wedge-like concave portion that protrudes in the direction opposite to the input portion $56_{b1}$. This lock claw $56_{c1}$ has a protrusion $56_{c2}$ protruded from its one side to the direction in which the hole of the rotary shaft portion 56a is extended. A support head portion $56_{d1}$ of the resilient arm 56d is cylindrical in shape and this support head portion $56_{d1}$ is brought in contact with the lower front edge portion 15a of the lower shell 15.

The lock member 56 having the above-mentioned arrangement is attached to the support shaft 58 in the state shown in FIGS. 32 to 40. Specifically, in the state in which the lock claw $56_{c1}$ is directed toward the side of the lower concave portion 16b, the rotary shaft portion 56a is fitted into the support shaft 58 and the support head portion $56_{d1}$ of the resilient arm 56d is brought in contact with the inner surface of the lower front edge portion 15a. As a consequence, the lock arm 56c is inwardly spring-biased under spring force of the resilient arm 56d, whereby the lock claw $56_{c1}$ at the tip end of the lock arm is protruded into the lower concave portion 16b. At the same time, the input portion $56_{b1}$ of the operation arm 56b is inserted into the opening hole 57 from the inside and the tip end of the input portion $56_{b1}$ is projected into the loading guide groove 53.

The lock member 56 that is the above-mentioned spring member may be suitably made of polyacetal (POM), for example. It is needless to say that other engineering plastics can be applied to the lock member and that a metal spring member can be used as the material of the lock member. The lock member 56 is not limited to the shape of this embodiment and shape, layout and so forth of the lock member can be selected properly so long as it includes the operation arm 56b, the lock arm 56c and the resilient arm 56d. Conversely, the support shaft 58 may be provided on the upper shell 13 so that it can be supported to the side of the upper shell so as to become freely rotatable. Further, half support shafts may be protruded from both shells and two support shafts may support the lock member 56.

The rotary member 14 that is made freely rotatable within the upper and lower concave portions 16a, 16b of the upper shell 13 and the lower shell 15 has the arrangement shown in FIGS. 1, 2, 7 and 8. This rotary member 14 has a flat surface portion 14a formed of a disk-like thin plate member and a ring portion 14b continued to the outer peripheral edge of this flat surface portion 14a. The inside opening portion 18 is formed on the flat surface portion 14a of this rotary member 14. This inside opening portion 18 is substantially equal to the outside opening portion 17 of the lower shell 15 in shape and in size.

Specifically, similarly to the outside opening portion 17, the inside opening portion 18 also includes a table opening portion 18a set at the central portion of the flat surface portion 14a and into and from which the turntable is inserted and ejected and a head opening portion 18b continued to the table opening portion 18a and into and from which the optical head is inserted and ejected. Then, the table opening portion 18a of the flat surface portion 14a has the support edge portion 14c provided at its inner peripheral edge to support the inside non-recording area of the optical disk 11 from the underside in the free condition.

Figure 7:
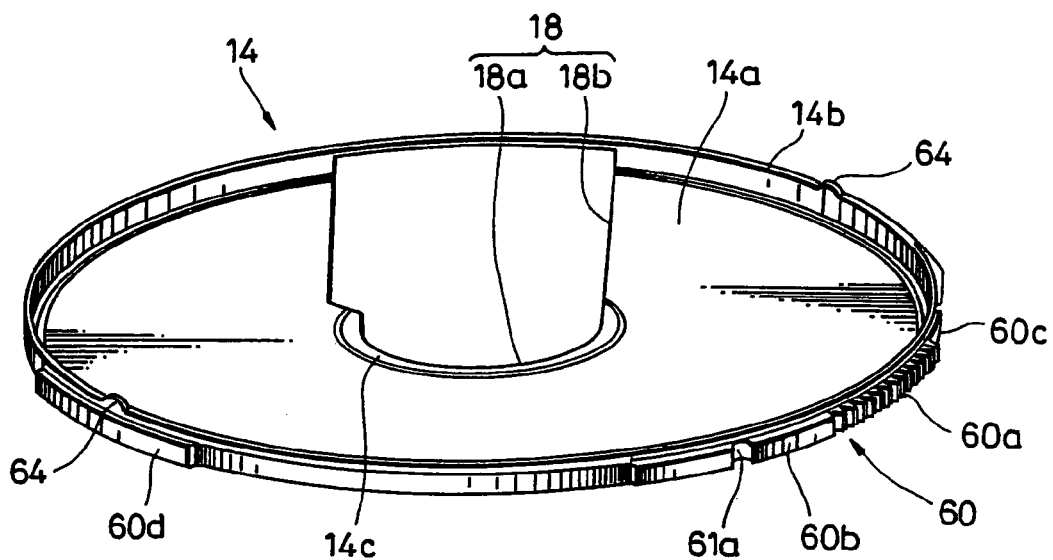
FIG. 7 is a perspective view showing a rotary member of the disk cartridge for use with the disk recording medium device according to the present invention from the upper surface side.
Figure 8:
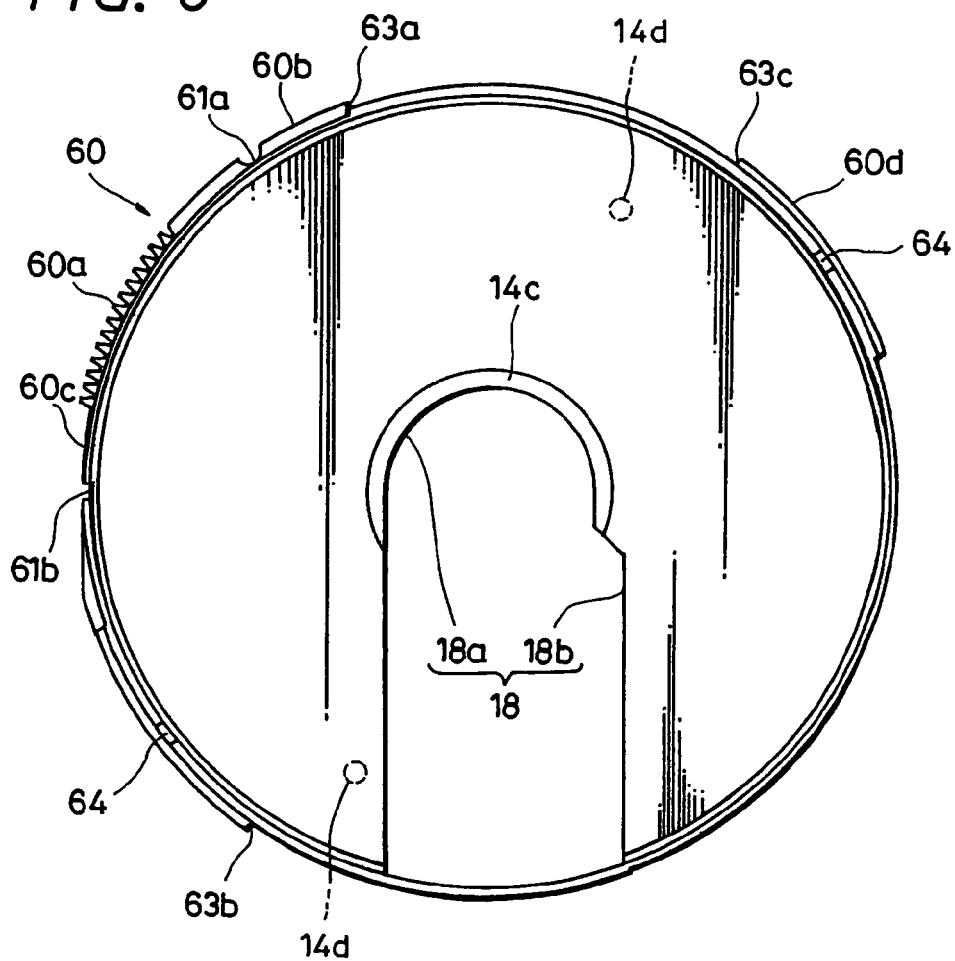
FIG. 8 is a plan view of the rotary member of the disk cartridge for use with the disk recording medium device according to the present invention.
Figure 9:
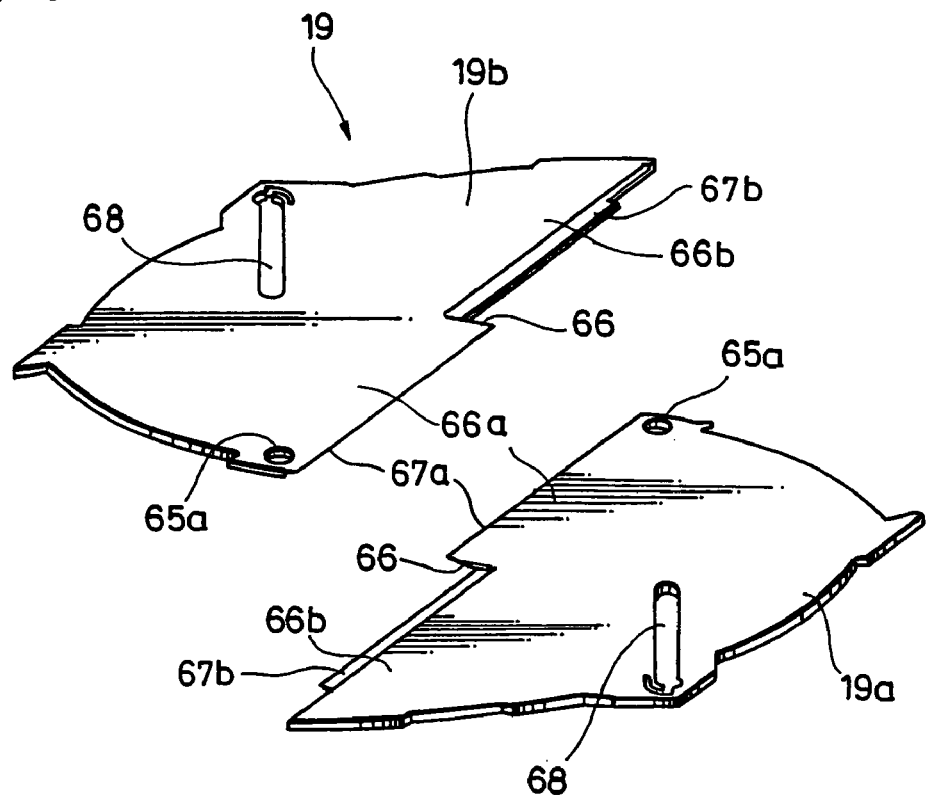
FIG. 9 is a perspective view showing a pair of shutter members of the disk cartridge for use with the disk recording medium device according to the present invention from the upper surface side.
Figure 10:
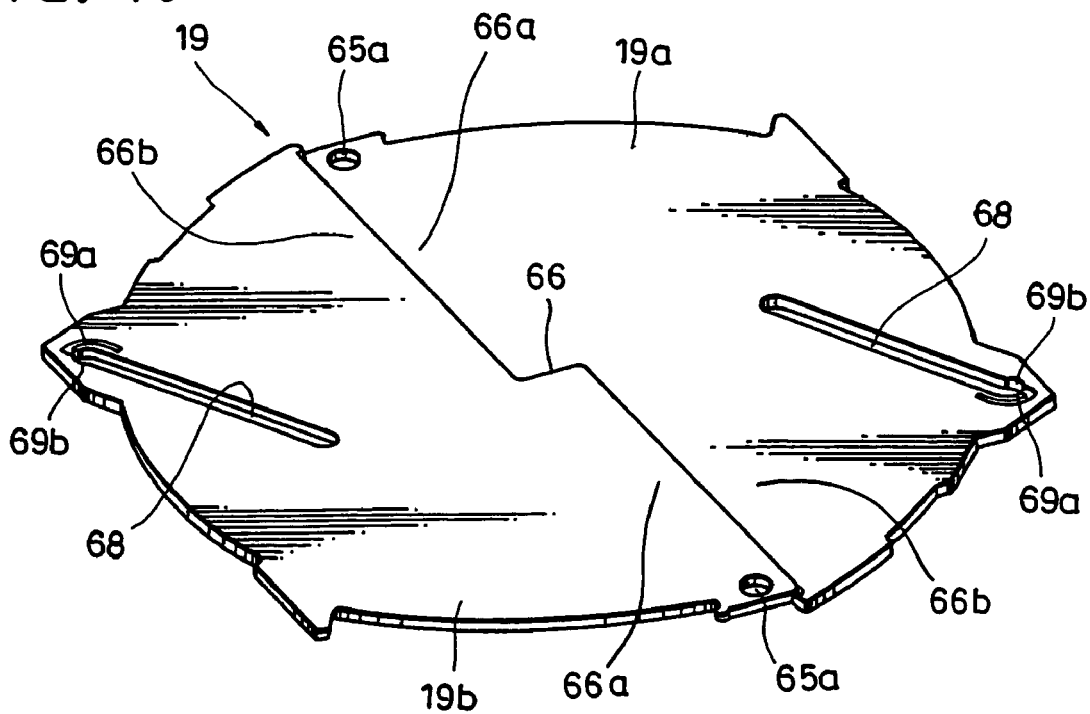
FIG. 10 is a perspective view showing the assembled state of a pair of shutter members of the disk cartridge for use with the disk recording medium device according to the present invention from the upper surface side.

At one portion of the outer peripheral surface of the ring portion 14b of the rotary member 14, there is provided an operated portion 60 that is engaged with the rotary member by the shutter opening and closing means to rotate the rotary member 14 within a predetermined angular extent when the shutter opening and closing means is moved in a reciprocation fashion. As shown in FIGS. 7, 8 and the like, this operated portion 60 includes a gear portion 60a having a large number of gear teeth formed over the circumferential direction in a predetermined angular extent (approximately 30°), a front slide portion 60b continued to one side of this gear portion 60a, a rear slide portion 60c continued to the other side of the gear portion 60a, a first land portion 60d provided at the position distant from the gear portion 60a in the circumferential direction by a predetermined distance and a second land portion 60e provided at the position distant from the front slide portion 60b in the circumferential direction by a predetermined distance.

An inclined surface portion 60f whose height on the side of the rear slide portion 60c is decreased is provided between the rear slide portion 60c and the first land portion 60d of the operated portion 60. The outer peripheral surface of the front slide portion 60b of the operated portion 60 is substantially the same as the addendum circle of the gear portion 60a in height, and the outer peripheral surface of the rear slide portion 60c is substantially the same as the bottom circle of the gear portion in height. Then, one side of the inclined surface portion 60f is set to be substantially as high as the rear slide portion 60c, and the other side is linearly extended like a tangent and is reached to the top surface of the first land portion 60d. Further, the front slide portion 60b has an initial operation concave portion 61a formed of a recess having an arc-like cross-section provided at its approximately central portion of the circumferential direction, and the rear slide portion 60c and the inclined surface portion 60f have a set position concave portion 61b formed of a recess having a trapezoidal cross-section provided therebetween.

Since the gear portion 60a and the front and rear slide portions 60b, 60c of this operated portion 60 are protruded from the outer peripheral surface of the ring portion 14b to the outside, an upper escape portion 52a and a lower escape portion 52b are provided on the corresponding portions of the upper shell 13 and the lower shell 15 so as to avoid them from contacting with these protruded portions and to allow them to pass therein as shown in FIGS. 4 and 15. The upper and lower escape portions 52a, 52b constitute the opening window 52. Then, a second engagement portion that is engaged by the lock claw 56c, of the lock member 56 is constructed at the position in which the opening portions 17, 18 are closed by the set position concave portion 61b.

The end portion on the opposite side of the gear portion 60a of the front slide portion 60b comprises an end stopper 63a of the opening side, the end portion on the opposite side of the inclined surface portion 60f of the first land portion 60d comprises a first end stopper 63b of the closing side and the end portion opposing the end stopper 63a of the second land portion 60e comprises a second end stopper 63a of the closing side. Then, the first end stopper 63b comprises a first engagement portion that is engaged by the lock claw 56c1 of the lock member 56 at the opening position in which the opening portions 17, 18 are opened.

Figure 32:
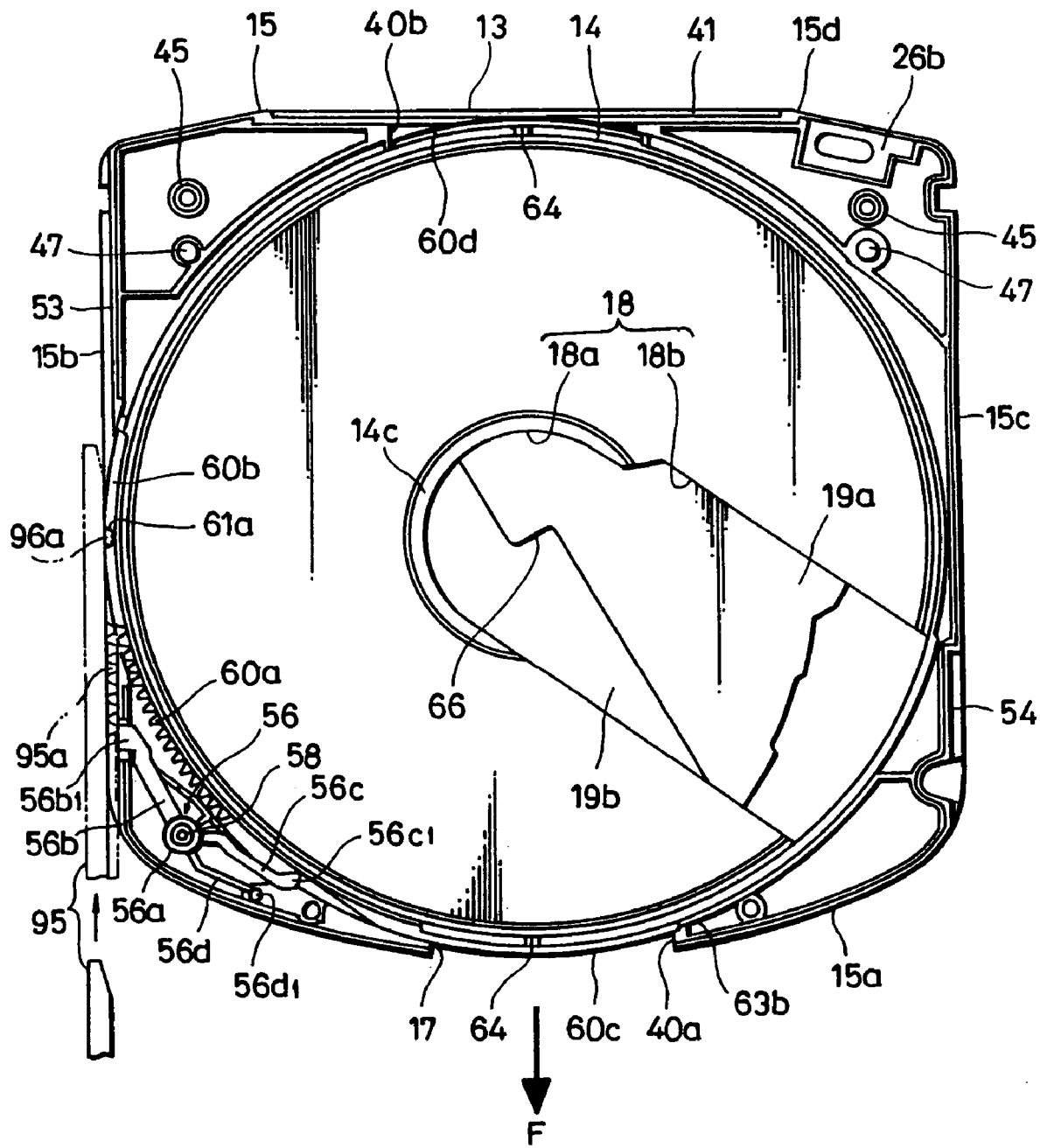
FIG. 32 is a diagram to which reference will be made in explaining the manner in which the shutter mechanism of the disk recording medium device according to the present invention is opened and closed by the shutter opening and closing means and illustrates the state obtained until an initial operation convex portion of a rack rod reaches to an opening window of the lower shell after a pair of shutter members had closed the opening portion of the lower shell and the opening portion of the rotary member completely.
Figure 33:
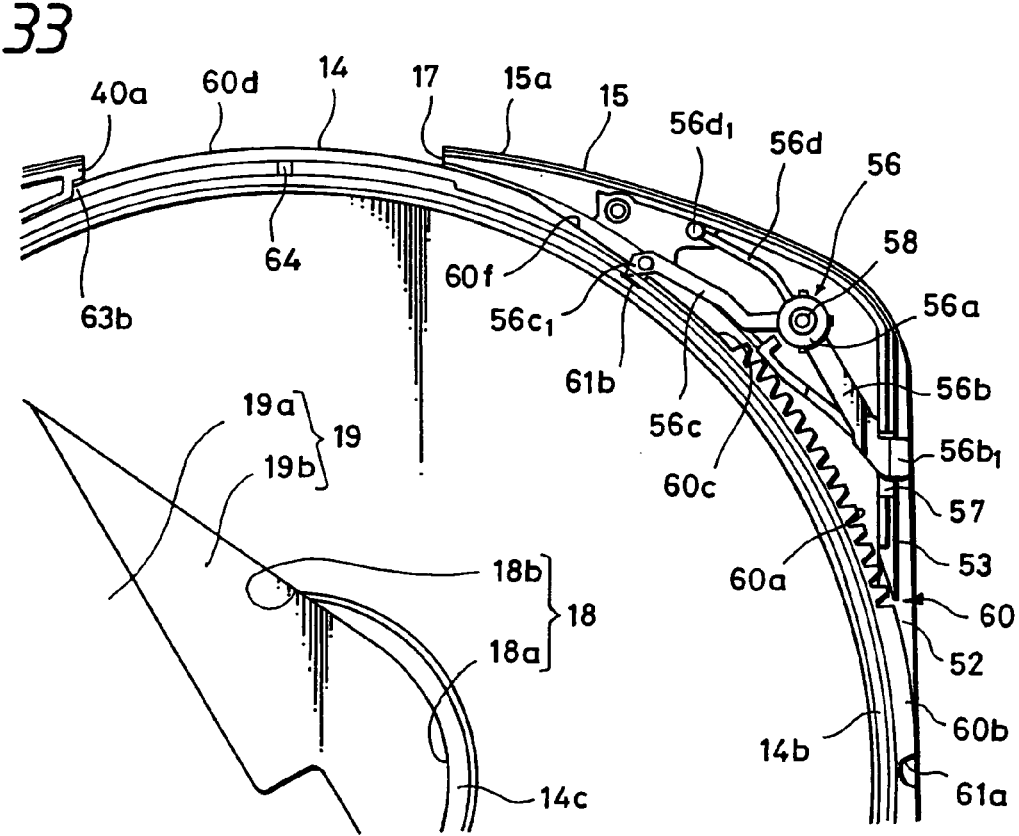
FIG. 33 is a plan view showing a main portion of FIG. 32 in an enlarged-scale.

Thus, the lower shell 15, the rotary member 14 and the lock member 56 are placed in the following positional relationship upon assembly-process. As shown in FIGS. 32 and 33, in the shutter closed state in which the outside opening portion 17 of the lower shell 15 and the inside opening portion 18 of the rotary member 14 are rotated and displaced most largely, the front slide portion 60b of the operated portion 60 is opposed to the opening window 52 of the cartridge housing 12 and the first end stopper 63b of the first land portion 60d is brought in contact with the opening end 40a of the lower shell 15. At that time, the second end stopper 63c of the second land portion 60e is opposed to the positioning portion 40b of the lower shell 15. The lock claw $56_{c1}$ of the lock member 56 is engaged with the set position concave portion (second engagement portion) 61b of the rotary member 14, and the rotary member 14 is being locked by this lock member 56.

In this state, when the rotary member 14 is released from being locked by the lock member 56 and is rotated in the predetermined direction by a predetermined angle, the inside opening portion 18 agrees with the outside opening portion 17 and hence the two outside and inside opening portions 17, 18 are opened a great deal. As a result, the disk housing portion 16 is opened through the two outside and inside opening portions 17, 18 to expose a part of the information recording surface of the optical disk 11. At that time, the end stopper 63a of the front slide portion 60b contacts with the positioning portion 40b of the lower shell 15 to prevent the rotary member 14 from being rotated more. The set position concave portion 61b is opposed to the opening window 52 and the lock claw $56_{c1}$ of the lock member 56 is engaged with the first end stopper 63b, whereby the rotary member 14 is held in the locked state.

Arc-like cam protrusions 64 which are disposed at two places in the circumferential direction are provided on the end face of the opening side of the ring portion 14b of the rotary member 14. These cam protrusions 64 are engaged with the cam grooves of the upper shell 13 when the rotary member 14 is assembled with the upper shell 13 and the like. Then, when the rotary member 14 is rotated a predetermined angle, the respective cam protrusions 64 are slid over the cam portions 22a of the cam grooves 22, whereby the rotary member 14 is urged against the side of lower shell 15.

This rotary member 14 has a pair of support shafts 14d, 14d provided at its flat surface portion 14a to support a pair of shutter members 19a, 19a such that the shutter members can be freely rotated in the plane direction of the flat surface portion 14a. A pair of support shafts 14d, 14d forms supporting points corresponding to a pair of shutter members 19a, 19b and is disposed about the center of the table opening portion 18a in a point symmetry fashion so that one of the support shafts may be located at the edge portion of the head opening portion 18b.

A pair of shutter members 19a, 19b consisting the shutter mechanism 19 attached to the rotary member 14 through a pair of support shafts 14d, 14e is comprised of the two shutter members 19a, 19b which are the same in shape and in size. A pair of shutter members 19a, 19b has a shape and a structure shown in FIGS. 9, 10 and so forth. Specifically, a pair of shutter members 19a, 19b is formed of an approximately semicircular thin plate member.

Bearing holes 65a are formed on the respective shutter members 19a, 19b at their one side portions of the chord sides. A pair of support shafts 14 disengaged with the respective bearing holes 65a so as to become freely rotatable, respectively. When the tip end portions of the respective support shafts 14d are caulked, a pair of shutter members 19a, 19b is placed over the flat surface portion 14a of the rotary member 14 and thereby attached so as to turn freely. At that time, a pair of shutter members 19a, 19b is attached in such a manner that their chord sides may oppose to each other.

Stepped portions 66 having predetermined lengths in the direction perpendicular to the chord lines are provided on the chord sides of a pair of shutter members 19a, 19b. The stepped portions 66 form a convex-side joint portion 66a and a concave-side joint portion 66b at their respective sides. The respective joint portions 66a, 66b have overhang portions 67a, 67b provided there at so as to overhang in the directions perpendicular to the directions in which the chords are extended. As a consequence, in a pair of shutter members 19a, 19b, the end face of the convex-side joint portion 66a and the end face of the concave-side joint portion 66b are opposed to each other with the result that the overhang portion 67a of the convex-side joint portion 66a and the overhang portion 67b of the concave-side joint portion 66b are fastened together.

Figure 16:
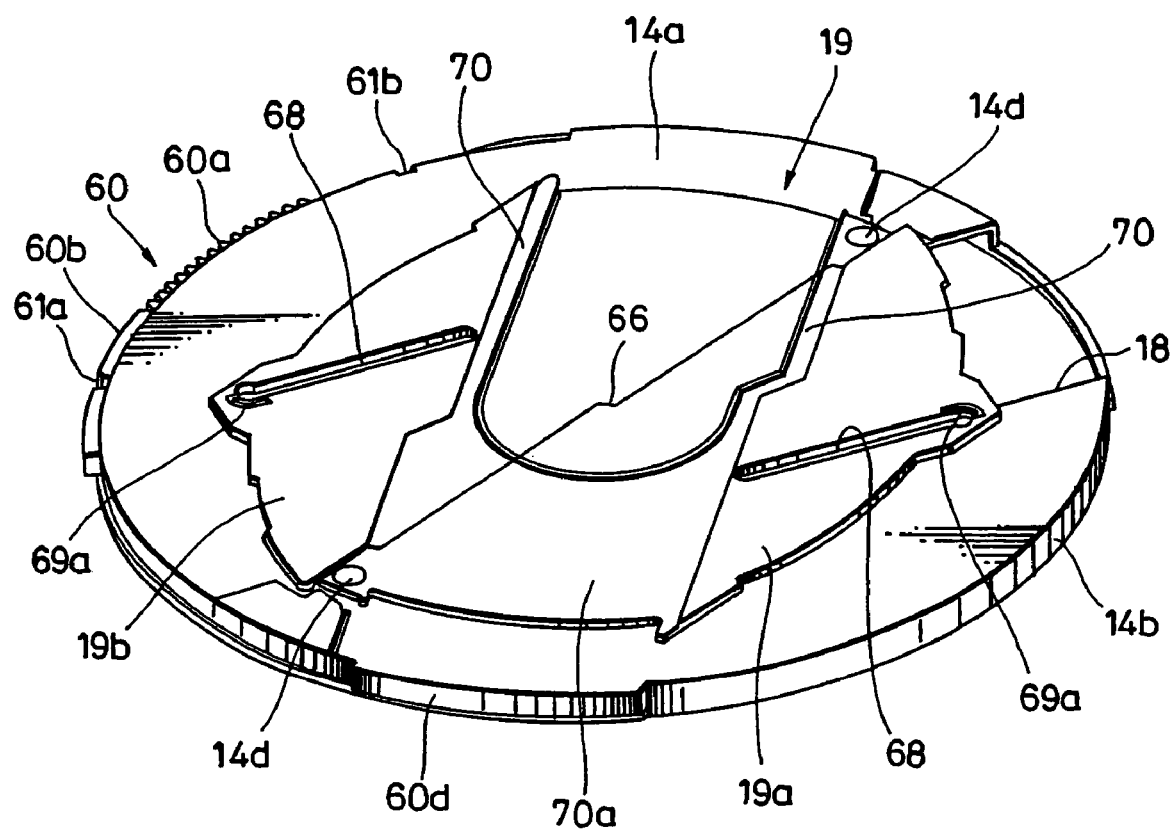
FIG. 16 is a perspective view showing the state in which a pair of shutter members is attached to the rotary member of the disk recording medium device shown in FIG. 1 to thereby close the inside opening portion.

As shown in FIG. 16, a pair of shutter members 19a, 19b is attached to the rotary member 14 in such a manner that their chord sides may be opposed to each other. Accordingly, when a pair of shutter members 19a, 19b is rotated so as to be detached from each other to the outside, the respective shutter members 19a, 19b are moved on the flat surface portion 14a outwardly, by which the inside opening portion 18 is opened completely. On the other hand, a pair of shutter members 19a, 19b is rotated toward the inside to cause their joint portions 66a, 66b to contact with each other, whereby the shutter mechanism 19 is shaped in approximately circle. As a result, the central portion of the inside opening portion 18 is completely closed by a pair of shutter members 19a, 19b.

Further, the respective shutter members 19a, 19b have open and close grooves 68 provided thereon to allow the shutter members 19a, 19a to open and close the opening portions 17, 18 through the rotation movement of the rotary member 14. One ends of the respective open and close grooves 68 are set at substantially the central portions of the respective shutter members 19a, 19b and the respective open and close grooves are formed so as to be extended to the outside of prolonged lines which connect one ends and the bearing holes 65a. At the outside end portions of a pair of open and close grooves 68, there are provided resilient members 69a which are formed by recessing the above outside end portions and concave portions 69a which are used to escape the operation convex portions 39a, 39b of the lower shell 15. Corresponding operation convex portions of a pair of operation convex portions 39a, 39b of the lower shell 15 are slidably engaged with a pair of open and close grooves 68.

Furthermore, a pair of shutter members 19a, 19b has rib-escape grooves 70 that are shaped like concave grooves corresponding to the ribs 37 serving as the ribs of the lower shell 15 in the state in which the opening portions 17, 18 are closed completely. Specifically, the rib-escape grooves 70 are formed like substantially U-shaped grooves corresponding to the arc-like rib portions 37a and a pair of linear rib portions 37b, 37b of the ribs 37. On the opposite sides of the rib-escape grooves, there are provided flat-surface-like escape surfaces 70a corresponding to the symmetrical rib portions 37c, 37c. The rib-escape grooves 70 and the ribs 37 constitute a labyrinth-like dust-proof clearance 71 having a crank-like shape as shown in FIG. 21.

This dust-proof clearance 71 has the above labyrinth-like clearance to prevent dusts and smudges from entering the disk compartment. The dust-proof clearance 71 is formed when the rotary member 14 is rotated in predetermined direction to allow a pair of shutter members 19a, 19b to completely close the opening portions 17, 18. The labyrinth-like clearance having the crank-like shape is formed at the joint surface between a pair of shutter members 19a, 19b and the lower shell 15, whereby dusts and smudges can be prevented from passing thereto without difficulty. Thus, dusts and smudges can be prevented or effectively suppressed from entering the disk compartment 16.

Conversely, the above-mentioned ribs may be provided on a pair of shutter members and corresponding rib-escape grooves may be provided on the lower shell with similar effects being achieved. Although a clearance is set between the outer peripheral edge and the shutter members 19a, 19b on the side of the flat surface portion 14a of the rotary member 14, since such clearance is closed by a shielding portion 38a provided on the lower shell 15, it is possible to prevent dusts and smudges from entering into the disk compartment from the above clearance.

A pair of shutter members 19a, 19b having the above-mentioned arrangement is assembled on the rotary member 14 with a predetermined positional relationship such that a pair of shutter members can open and close the inside opening portion 18 as shown in FIG. 16. Then, the rotary member 14 having a pair of shutter members 19a, 19b is assembled with a predetermined positional relationship relative to the upper and lower shells 13, 15 as shown in FIG. 20.

Specifically, when the cartridge housing 12 is assembled, the upper and lower shells are fastened together in such a manner that the inside opening portion 18 of the rotary member 14 may oppose to the outside opening portion 17 of the lower shell 15. At that time, of the operated portions 60 of the rotary member 14, the front slide portion 60b continued to one side of the gear portion 60a is disposed on the opening window 52 of the cartridge housing 12, whereby the initial operation concave portion 61a is disposed at substantially the central portion of the opening window 52. This rotary member 14 and the upper shell 13 constitute the disk compartment 16 formed of a circular space portion.

This disk compartment 16 accommodates therein the optical disk 11, which shows a concrete example of the disk-like recording medium, in such a manner that the optical disk can be freely rotated with predetermined clearances in the outside of the radius direction and in the thickness direction. At that time, when the optical disk 11 is of the single side recording system in which an information recording surface is formed on only one side, the optical disk is accommodated within the disk compartment in such a fashion that the information recording surface thereof may be opposed to the opening portions 17, 18. As a result, a label attachment surface, which is the other surface of the optical disk 11, is set on the side of the upper shell 13 and the chucking ring 33 is opposed to the central center hole 11a.

The optical disk 11 is formed of a thin disk-like recording member having the center hole 11a bored at its central portion. The turntable 81 of the table drive apparatus 78 housed within the disk recording and reproducing apparatus is fitted into the center hole 11a of the optical disk 11 as shown in FIG. 22. The chucking ring 33 is attracted by magnetic force of the magnet 97 incorporated within this turntable 81 and the optical disk 11 is held by the chucking ring 33 and the turntable 81 and thereby formed as one body in the rotation direction. Then, the turntable 81 and the optical disk 11 may be rotated together at a predetermined speed (e.g. constant linear velocity) by driving the spindle motor 75 to which the turntable 81 is attached.

Synthetic resins such as ABS resin (acrylonitrile-butadiene-styrene resin) and HIPS (high impact polystyrene resin), for example, may be suitable as materials of the upper shell 13, the rotary member 14, the lower shell 15, the shutter the members 19a, 19b, the mis-erase prevention member 25 and the ring holder 34.

However, it is needless to say that other engineering plastics may also be used suitably and that other metal materials such as aluminum alloy and stainless steel can also be used suitably. A material of the chucking ring 33 is not limited to the above-mentioned stainless steel, and not only metals such as iron and other magnetic materials but also magnetic materials in which plastics have contained magnetic materials can be applied to the material of the chucking ring.

The disk recording medium device 10 having the aforementioned arrangement can be assembled with ease as follows. The assembly work of this disk recording medium device 10 is carried out in the state in which the upper shell 13 is faced downward. First, the optical disk 11 is set within the upper concave portion 16a of the upper shell 13. At that time, the optical disk 11 is inserted into the upper concave portion 16a in the state in which the information recording surface is faced downward.

Next, the opening side of the rotary member 14 is fitted into the upper concave portion 16a in such a manner as to cover the optical disk 11, whereby the optical disk 11 is rotatably accommodated within the disk compartment 16 formed of the rotary member 14 and the upper shell 13. At that time, the direction in which the inside opening portion 18 of the rotary member 14 is extended is made coincident with the front and rear direction of the upper shell 13 and the front slide portion 60b of the operated portion 60 is faced to the opening window 52.

It is desired that the shutter mechanism 19 should be assembled to the rotary member 14 in advance. In that case, the chord sides of a pair of shutter members 19a, 19b are opposed to each other, and the respective bearing holes 65a are fitted into the respective support shafts 14d of the rotary member 14, thereby the shutter members being set on the flat surface portion 14a. Then, the tip end portions of the respective support shafts 14d are caulked to allow a pair of shutter members 19a, 19b to be attached to the flat surface portion 14a in such a manner that a pair of shutter members can open and close the inside opening portion 18.

Next, the lock member 56 is attached to the support shaft 58 of the lock housing portion 55. At that time, the support head portion $56_{d1}$ of the resilient arm 56d of the lock member 56 is brought in contact with the inner surface of the upper front edge portion 13a of the upper shell 13 and the input portion $56_{b1}$ of the operation arm 56b is protruded into the loading guide groove 53 from the opening hole 57 of the cartridge housing 12 under spring force of the resilient arm 56d. Then, the lock claw 56,1 of the lock arm 56c of the lock member 56 is engaged with the set position concave portion 61b of the operated portion 60. As a result, the rotary member 14 is locked by the lock member 56.

At the same time or before and after the rotary member is locked by the lock member, the mis-erase prevention member 25 is attached to the plug housing portion 26. In this case, the mis-erase prevention member is inserted from the side of the guide protrusion 25c, the engagement portion 25d is engaged with the guide portion 29 and the operation protrusion 25b is engaged with the lower recess 27b of the opening window 27.

Next, the lower shell 15 is laid over the rotary member 14 including the shutter mechanism 19 and this lower shell 15 is combined to the upper shell 13. At that time, the opening end 40a of the lower shell 15 is fitted into the first concave portion 23a of the upper shell 13, and the positioning portion 40b of the lower shell 15 is fitted into the concave portion 23b of the upper shell 13. At the same time, the respective positioning shaft portions 46a, 46b of the lower shell 15 are fitted into the respective escape portions 49a, 49b of the upper shell 13. Then, the reference protrusions 47 provided on the respective positioning shaft portions 46a, 46b are fitted into the respective reference holes 48 of the upper shell 13, whereby the lower shell 15 may be properly positioned to the upper shell 13 automatically.

At that time, if a pair of shutter members 19a, 19b is set in the state shown in FIG. 16, then a pair of operation convex portions 39a, 39b provided within the lower concave portion 16b of the lower shell 15 can be respectively opposed to the concave portions 69b of the open and close grooves 68 provided on the respective shutter members 19a, 19b. As a result, regardless of the exact positions of a pair of open and close grooves 68, a pair of operation convex portions 39a, 39b can be engaged with a pair of open and close grooves 68, 68 with ease only by combining the lower shell 15 with the upper shell 13 together.

Figure 17:
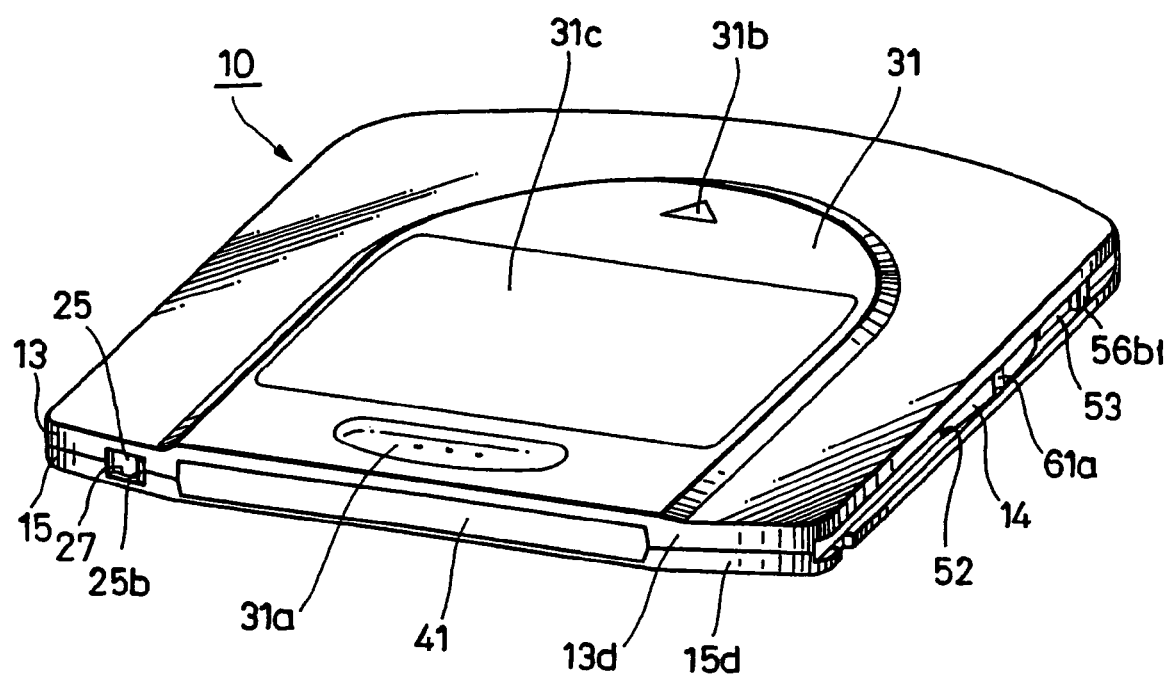
FIG. 17 is a perspective view showing an outward arrangement of the disk recording medium device shown in FIG. 1.

Thereafter, by the use of a plurality of stationary screws, the lower shell 15 can be fastened and fixed to the upper shell 13, whereby the assembly work of the disk recording medium device 10 having the outside appearance and shape shown in FIG. 17 and which has the cross-sectional arrangement shown in FIG. 20 is completed.

In this case, without using a fixing means consisting of separate members such as stationary screws, the joint surfaces of the upper shell 13 and the lower shell 15 can be directly bonded together by a suitable means such as an adhesive agent. As described above, according to the disk recording medium device 10 of this embodiment, the number of used assemblies is relatively small and the assembly work can be carried out with ease.

Although not shown, if the cartridge housing is provided with an opening portion of size corresponding to two of the above-mentioned opening portions 17, 18, then the disk recording medium device becomes able to use two optical heads simultaneously. In this case, the opening portions of size corresponding to two opening portions may be disposed at a right angle and thereby shaped as an L-like opening portion. Alternatively, the above-mentioned opening portions of size corresponding to two opening portions may be disposed on a straight line in an opposing relation to each other and thereby shaped as an I-like opening portion.

In this case, if the rotary member 14 and the lower shell 15 for use with one head are used instead of the rotary member and the lower shell for use with two heads, then while a new information signal is being recorded by one optical head, an information signal that has been just recorded by the other optical head can be processed in such various manners as to confirm the recorded state of the information signal. If the rotary members and the lower shells are exchanged with each other for one head or two heads, then the manufacturing process of the disk recording medium device can cope with the manufacturing process for use in one head and the manufacturing process for use in two heads with ease. Thus, the manufacturing and assembly lines can be made common and hence the disk recording medium device according to the present invention can properly meet the needs of users.

According to the disk recording medium device 10 having the aforementioned arrangement, the rotary member 14 can be rotated by small force, accordingly, a pair of shutter members 19a, 19b can be opened and closed by small drive force. In addition, the rotary member 14 can generate resistance to impacts and vibrations inputted from the outside so that a pair of shutter members 19a, 19b may become difficult to open.

Figure 26:
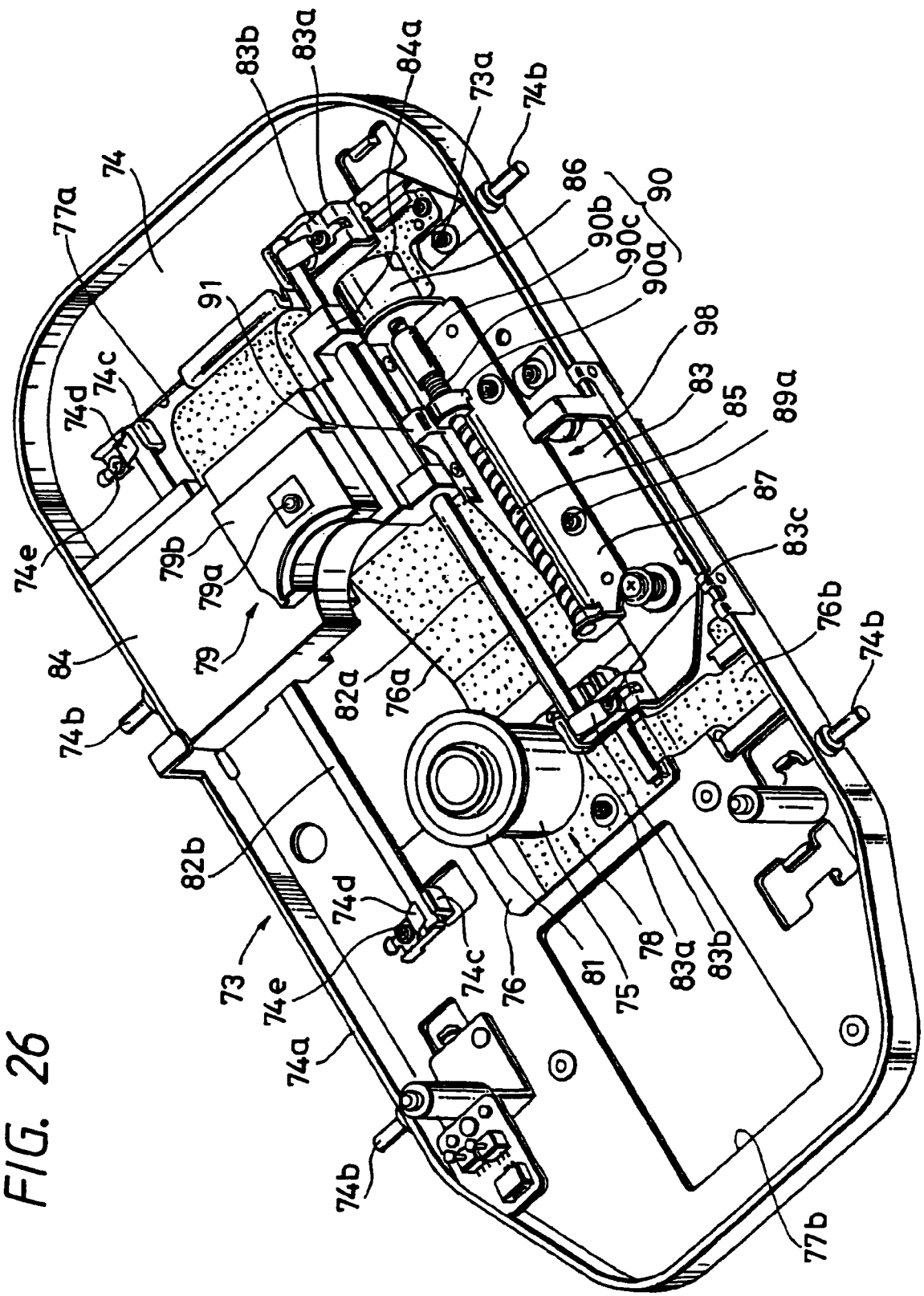
FIG. 26 is a perspective view showing a disk recording and/or reproducing apparatus according to an embodiment of the present invention.

The disk recording medium device 10 can be used by a disk recording and reproducing apparatus 73 which shows a concrete example of the disk recording and/or reproducing apparatus having the arrangement shown in FIG. 26, for example.

The disk recording and reproducing apparatus 73 includes the tape drive apparatus 78 to chuck and rotate the optical disk 11 and the optical pickup device 79 to read an information signal from the optical disk and to write an information signal on the optical disk by radiating laser beams on the information recording surface of the optical disk 11 and is mounted on a chassis 74.

The chassis 74 is shaped like a flat surface having approximately a square shape and includes a reinforcement rib 74a that is obtained by continuously bending the peripheral edge of the chassis upward. The reinforcement rib 74 includes support protrusions 74b provided at its four positions to support the chassis 74 to the members on the side of the apparatus body shown in FIGS. 29 and 30.

A motor base plate 76 having the spindle motor 75 mounted thereon is fixed to approximately the central portion of the chassis 74 by a fixing means such as stationary screws. A first opening portion 77a and a second opening portion 77b, both of which are shaped like squares, are provided on the chassis 74 at its respective sides of the longitudinal directions across the spindle motor 75. The table drive apparatus 78 is attached in association with the first opening portion 77a. The second opening portion 77b is used to attach another table drive apparatus, not shown.

The disk recording and reproducing apparatus 73 consists of the table drive apparatus 78 for rotating the optical disk 11 at a predetermined speed (e.g. constant linear velocity) the optical pickup device 79 which shows a concrete example of a pickup device for writing an information signal on the optical disk and for reading an information signal from the optical disk and a pickup movement apparatus 80 for moving this optical pickup device 79 close to or away from the table drive apparatus 78 and so forth.

The table drive apparatus 78 is comprised of the spindle motor 75, the turntable 81 integrally provided at the rotation portion of this spindle motor 75 and the like. The spindle motor 75 is attached onto the motor base plate 76 made of a thin plate metal, and a flexible wiring plate 76a is fixed to the upper surface of the motor base plate 76 by a fixing means such as an adhesive agent. Then, wiring of the spindle motor 75 and wiring of a table drive connector are connected to the wiring circuit of the flexible wiring plate 76a. Further, a plurality of flexible wiring plates 76b are fixed to the connector.

As shown in FIGS. 21, 22 and the like, the spindle motor 75 includes a fixed portion 75a fixed to the motor base plate 76 and a rotary portion 75b rotatably supported by this fixed portion 75a. The turntable 81 is integrally provided with a rotary shaft that serves as a rotation center of the rotary portion 75b. The turn table 81 includes a fitted portion 81a fitted into the center hole 11a of the optical disk 11 and a table portion 81b disposed at the lower portion of this fitted portion 81a and on which the peripheral edge portion of the center hole 11a is held and the like. Then, the fitted portion 81a houses therein the magnet 97. The chucking ring 33 is opposed to this turntable 81 and the optical disk 11 set on the table portion 81b is held under attraction force of the chucking ring 33 attracted by the magnet 97, whereby the optical disk 11 can be chucked and rotated in unison with the turntable 81.

As shown in FIG. 26, a pair of guide shafts 82a, 82b is disposed in parallel to each other so as to sandwich the spindle motor 75 from both sides. A pair of guide shafts 82a, 82b is formed of a round bar-like member whose outer peripheral surface is made smooth. Then, the first guide shaft 82a is supported at its respective ends by an adjustment plate 83. The second guide shaft 82b is supported at its respective ends by the chassis 74.

The adjustment plate 83 is attached to the chassis 74 in such a manner that its attitude can be changed. By changing the attitude of the adjustment plate 83, it becomes possible to adjust degree of parallelism between a pair of guide shafts 82a and 82b. By a pair of guide shafts 82a, 82b, the optical pickup device 79 is supported so as to move close to or away from the turntable 81. One end portions of a pair of guide shafts 82a, 82b are disposed at both sides of the spindle motor 75 and the other end portions are made parallel to each other and extended in the direction in which they are moving away from the spindle motor 75.

The optical pickup device 79 comprises a slide member 84 guided and slid by a pair of guide shafts 82a, 82b, an optical head set on this slide member 84 and which can be moved back and forth in a reciprocation fashion and the like. The slide member 84 is large enough to cross a pair of guide shafts 82a, 82b and is formed as a block-like shape in order to increase rigidity. A pair of bearing portions 84a is provided at one side of the longitudinal direction of this slide member 84 in the width direction crossing the longitudinal direction. The first guide shaft 82a is slidably inserted into these bearing portions 84a. Further, on the other side of the longitudinal direction of the slide member 84, there is provided an insertion hole, not shown, into which the second guide shaft 82b is inserted slidably. This insertion hole is larger than the diameter of the second guide shaft 82b and hence the slide member 84 can be rotated about the first guide shaft 82a so that the slide member can be inclined an amount corresponding to such clearance in the upper and lower direction.

The optical head of the optical pickup device 79 includes a biaxial actuator having an objective lens 79a, an optical control unit having a semiconductor laser, a photo-electric conversion element or the like for recording and reproducing an information signal through this biaxial actuator and so forth. Most of the biaxial actuator is covered with a head cover 79b and the objective lens 79a is exposed from an opening portion formed on this head cover 79b. This objective lens 79a is opposed to the information recording surface of the optical disk 11 set onto the turntable 81.

Of a pair of guide shafts 82a, 82b, the first guide shaft 82a is supported by a pair of shaft support members 83a, 83a provided on the adjustment plate 83. The respective shaft support members 83a are provided with a pair of shaft presser plates 83b and the first guide shaft 82a is fixedly supported by fixing these shaft presser plates with screws 83c. The second guide shaft 82b is supported by a pair of shaft support members 74c, 74c provided on the chassis 74 and fixedly supported by screwing with fixing screws 74e. Then, a feed screw drive device 98 serving as a pickup movement device is attached to the adjustment plate 83.

Figure 27:
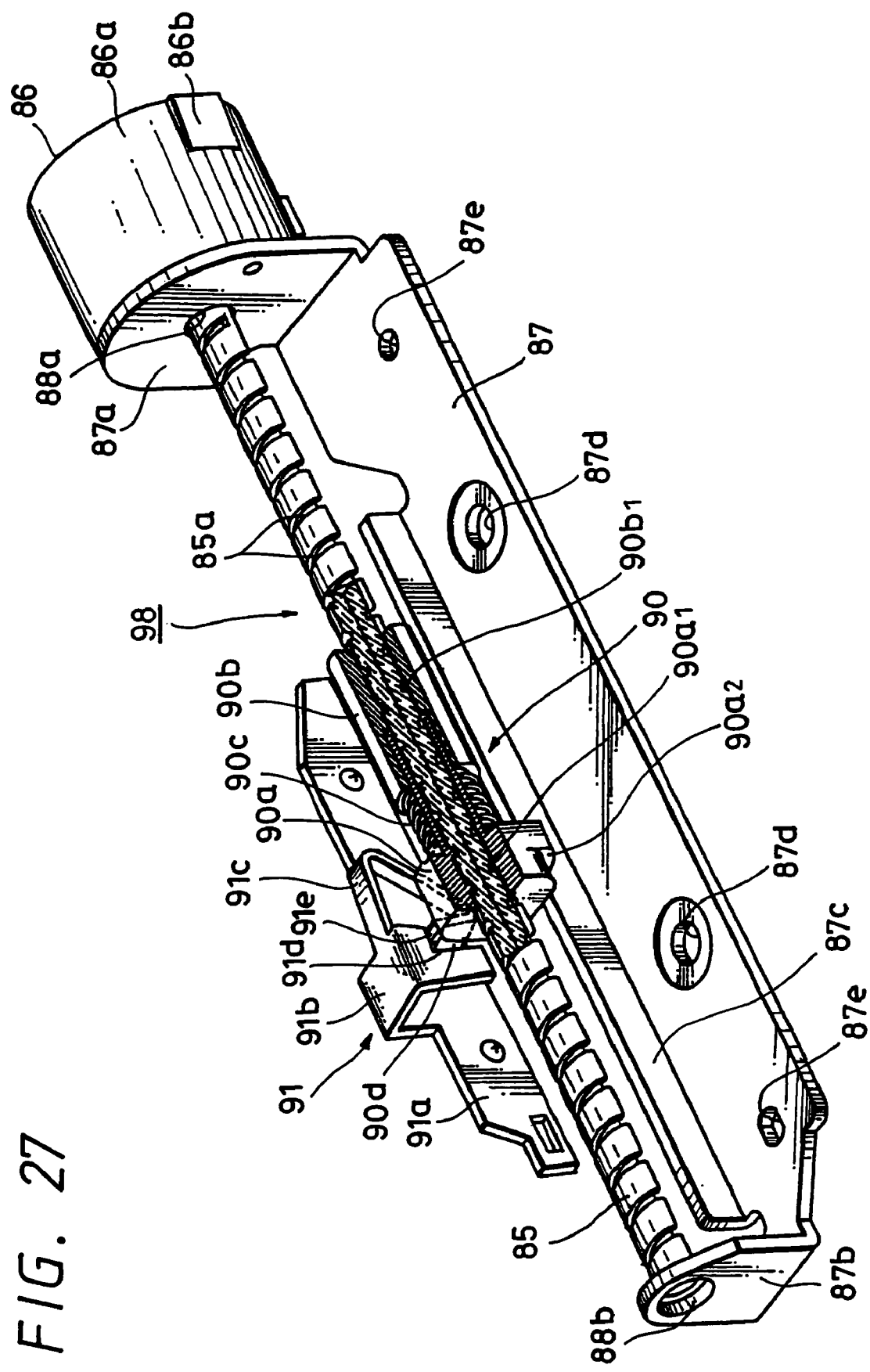
FIG. 27 is a perspective view showing a feed screw drive device of the disk recording and/or reproducing apparatus according to the present invention and illustrates a part of a power transmission member and so forth in a cross-sectional fashion.

The feed screw drive device 98 is comprised of a feed screw 85, a feed motor 86, a support plate 87, a power transmission member 88 and the like as shown in FIG. 27 in an enlarged-scale. The feed screw 85 is obtained by forming a streak of screw groove 85a, which is spirally extended, on an outer circumference surface of a round bar slightly shorter than the guide shafts 82a, 82b along substantially the whole length of the axis direction. A trapezoid shape whose cross-section is trapezoid having slight inclination angles on both side surfaces of the groove may be suitable as the screw shape of this feed screw 85 and a square thread whose cross-section forms a square may be suitable as the above-mentioned screw shape of the feed screw. Moreover, a semicircular thread whose cross-section forms a semicircle may be applied to the above-mentioned screw shape of the feed screw, and other screws of well-known shapes can be applied to the above-mentioned screw shape of the feed screw.

The feed screw 85 may serve as a rotary shaft of the feed motor 86, which is a drive source, as well. The feed screw is directly rotated by the feed motor 86. The feed motor 86 includes a cylindrical motor case 86a and a case cover 86b that closes one opening portion of the motor case 86a. The motor case 86a is fixed to a motor supporting member 87a of a support plate 87 by a fixing means such as caulking and thereby configured integrally therewith. A coil portion that is wound in an annular fashion is fitted into and fixed to the inner peripheral surface of this motor case 86a and an annular magnet is fitted into the inside of the coil portion by a fixing means such as insertion with pressure.

The support plate 87 is formed of a long and slender plate material made of plate metal having approximately the same length as that of the feed screw 85a. The support plate 87 has a motor support member 87a and a screw support member 87b provided at its respective ends in the longitudinal direction, and the motor support member and the screw support member are opposed to each other when they are erected in the same direction. The motor support member 87a has an aperture 88a bored at its central portion and has also a fitting aperture 88b bored at its height position corresponding to the aperture 88a in the upper portion of the screw support member 87b. The feed motor 86 is fixed to the outer surface of the motor support member 87a and the feed screw 85 is inserted into the aperture 88a. Then, a tip end portion of the feed screw 85 is supported by a bearing member, which is fitted into and fixed to the fitting aperture 88b, so as to become freely rotatable.

The support plate 87 has a guide rib 87c that is one side of the support plate obtained after one side of the width direction of the support plate has been continuously erected along the longitudinal direction. This guide rib 87c is disposed substantially just under the feed screw 85 and is also extended in substantially parallel to the axis line of the feed screw 85. Further, the support plate 87 has two insertion apertures 87d and two positioning apertures 87e defined therein. The two positioning apertures 87e are used to properly locate the support plate 87 at predetermined position, and the support plate is attached to the adjustment plate 83 by attachment screws 89a inserted into the insertion apertures 87d.

A feed nut 90, which shows a concrete example of a power transmission member, is used to convert rotation force of the feed screw 85 into rectilinear motion and to transmit the rectilinear motion to the slide member 84. The feed nut is composed of a first nut member 90a and a second nut member 90b and a coil spring 90c for spring-biasing the two nut members 90a, 90b in the direction in which they are moved away from each other.

The first nut member 90a includes a nut body shaped like a block and a cylindrical cylinder shaft portion continued to one surface side of this nut body and has also at its one side of the axial direction aperture extending through the nut body and the cylinder shaft portion a first screw portion $90_{a1}$ that is screwed with the screw groove 85a of the feed screw 85. Further, the first nut member 90a is provided with a protrusion portion $90_{a2}$ that is protruded in the lateral direction perpendicular to the axis direction. This protrusion portion $90_{a2}$ has a slit extended in the direction in which the cylinder shaft portion is extended. The guide rib 87c of the support plate 87 is engaged with this slit so as to become freely slidable. The second nut member 90b is formed of a sleeve-like cylindrical member and has an axis direction aperture bored at its central portion. The axis direction aperture has a second screw portion $90_{b1}$ formed at one side thereof to be screwed into the screw groove 85a of the feed screw 85. Further, the axis direction aperture has a fitting aperture into which the cylindrical shaft portion of the first nut member 90a is fitted detachably. This fitting aperture has a key-like protrusion that is protruded in the inside of the radius direction. The coil spring 90c is interposed between the second nut member 90b and the first nut member 90a. Under spring force of this coil spring, a pair of nut members 90a and 90b is spring-biased in the direction in which the nut members are made distant from each other to thereby absorb axis-direction fluctuations generated between the feed nut 90 and the feed screw 85.

The first and second nut members 90a, 90b having the above-mentioned arrangements and the coil spring 90c are integrally combined and assembled on the feed screw 85. The assembly work of the first and second nut members and the coil spring will be described below, for example. First, after the coil spring 90c had been inserted into the cylinder shaft portion of the first nut member 90a, the cylinder shaft portion is fitted into the fitting aperture of the cylinder shaft portion of the second nut member 90b. Next, the feed screw 85 is inserted into the feed nut 90 where the two nut members 90a, 90b had been assembled.

In this case, the coil spring 90c is slightly contracted by moving the two nut members 90a, 90b close to each other. In the state in which this compressed state is being held, the feed screw 85 is turned and inserted into the feed nut 90. As a result, the thread portion of the first nut member 90a is meshed with the screw groove 85a of the feed screw 85 and the thread portion of the second nut member 90b is simultaneously meshed with the screw groove 85a. As a result, under spring force of the coil spring 90c, the first nut member 90a is spring-biased in the direction in which it is moved away from the feed motor 86, whereby the second nut member 90b is spring-biased in the direction in which it is moved close to the feed motor 86.

As a result, in the screw portion of the first nut member 90a, the thread surface of the left-hand side shown in FIG. 27 is urged against the left-hand side thread surface of the feed screw 85 so that a clearance is produced between the right-hand side thread surface and the left-hand side thread surface. Similarly, in the thread portion of the second nut portion 90b, the thread surface of the right-hand side shown in the sheet of drawing is urged against the right-hand side thread surface of the feed screw 85 so that a clearance is produced between the left-hand side thread surface and the right-hand side thread surface. As a result, a clearance on the whole of the feed nut 90 can be removed and hence fluctuations between the feed nut and the feed screw 85 can be absorbed. Then, since the slit provided on the protruded portion 90$_{a2}$ of the first nut member 90a is engaged with the guide rib 87c of the support plate 87, the feed nut 90 can be linearly moved to the axis direction of the feed screw 85.

Further, the first nut member 90a is provided with a drive protrusion 90d that protrudes in the lateral direction. This drive protrusion 90d is engaged with a protrusion reception member 91 secured to the slide member 84, and movement force of the feed unit 90 is transmitted through this protrusion reception member 91 to the slide member 84. The protrusion reception member 91 includes a fixing member 91a for fixing the protrusion reception member to the slide member 84, a support member 91b continued to this fixing member 91a and a resilient member 91c continued to the support member 91b.

The fixing member 91a is formed of a long and slender plate member and includes the L-like support member 91b provided at its one side of the width direction in somewhere of the longitudinal direction. Then, the support member 91b includes a support portion 91d formed of a recess provided at its tip end corner portion of the free end side to receive and support the drive protrusion 90d. The resilient member 91c has resiliency of proper strength given by two corner portions formed of a bent triangle, and a bent portion at the tip end is formed as a presser portion 91e and opposed to the support portion 91d. Further, the fixing member 91a has a plurality of insertion apertures to attach the protrusion reception member 91 to the slide member 84 and the protrusion reception member 91 is attached by a fixing means such as fixing screws.

The drive protrusion 90d of the feed nut 90 attached to the feed screw 80 is inserted into a clearance between the support portion 91d of the protrusion reception member 91 thus attached and the presser portion 91e. Then, the drive protrusion 90d is held between the support portion 91d and the presser portion 91e under spring force of the resilient member 91c, whereby force can be transmitted to the feed nut 90 and the slide member 84.

A stainless steel plate may be suitably used as materials of the adjustment plate 83 and the support plate 87, for example. It is needless to say that a steel plate and other metal plates may also be used suitably as the materials of the adjustment plate and the support plate and that engineering plastics having large strength may also be used suitably as the materials of the adjustment plate and the support plate. Further, metal materials such as stainless steel that is difficult to gather rust and which has sufficiently large strength may be suitably used as a material of the feed screw 85. Furthermore, a stainless steel plate having large strength may also be suitably used as a material of the protrusion reception member 91 and other plate materials also may be used as the material of the protrusion reception member.

Figure 28:
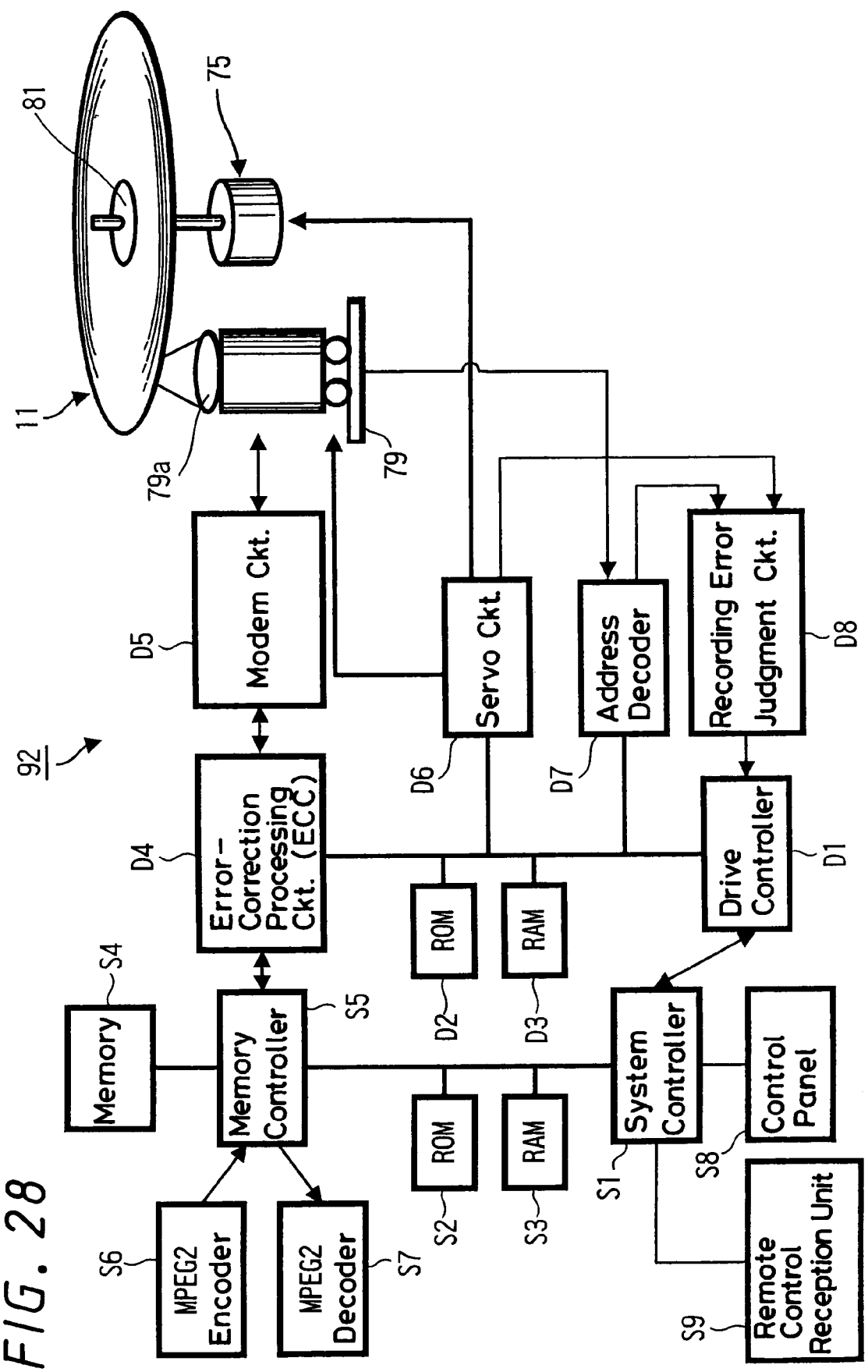
FIG. 28 is an explanatory block diagram showing a circuit arrangement of a disk recording and/or reproducing apparatus according to an embodiment of the present invention.

The aforementioned pair of guide shafts 82a, 82b, the adjustment plate 83 and the feed screw drive apparatus 98 constitute the pickup movement apparatus that can move the optical pickup device 79 close to or away from the turntable 81. Next, a recording and reproducing apparatus body 92 of the disk recording and reproducing apparatus 73 will be described. FIG. 28 shows a concrete example of the recording and reproducing apparatus body 92. The recording and reproducing apparatus body is comprised of the following constituents. Specifically, the recording and reproducing apparatus body 92 includes three control apparatus of a system controller S1, a memory controller S5 and a drive controller D1.

The system controller S1 and the memory controller S5 are directly connected and the connected line therebetween is connected to a read-only memory device (ROM) S2 and a random-access memory device (RAM) S3. Further, the memory controller S5 is connected with a memory S4, an encoder S6 for MPEG2 (moving picture compression system applied to the existing television broadcasting that corresponds to 3M to 40 Mbps, HDTV and a broadband ISDN) and an MPEG2 decoder S7. Furthermore, the system controller S1 is connected with a control panel S8 and a remote control reception unit S9.

The drive controller D1 is connected with an error-correction processing circuit (ECC) D4 and the connected line therebetween is connected with a memory device (ROM) D2, a memory device (RAM) D3, a servo circuit D6 and an address decoder D7. Further, the drive controller D1 is connected with a recording error judgment circuit D8 for judging whether or not error occurs in the recording mode. This drive controller D1 is connected through a command interface to the system controller S1.

The correction processing circuit D4 is connected through a data interface to the memory controller S5 and is also connected to a modem circuit D5. Then, the modem circuit D5 is connected to the optical head including the objective lens 79a of the optical pickup device 79. Further, the servo circuit D6 is connected to the spindle motor 75, the optical pickup device 79 and the recording error judgment circuit D8. Then, the optical pickup device 79 is connected to an address decoder D7, and the address decoder D7 is connected to the recording error judgment circuit D8.

Figure 29:
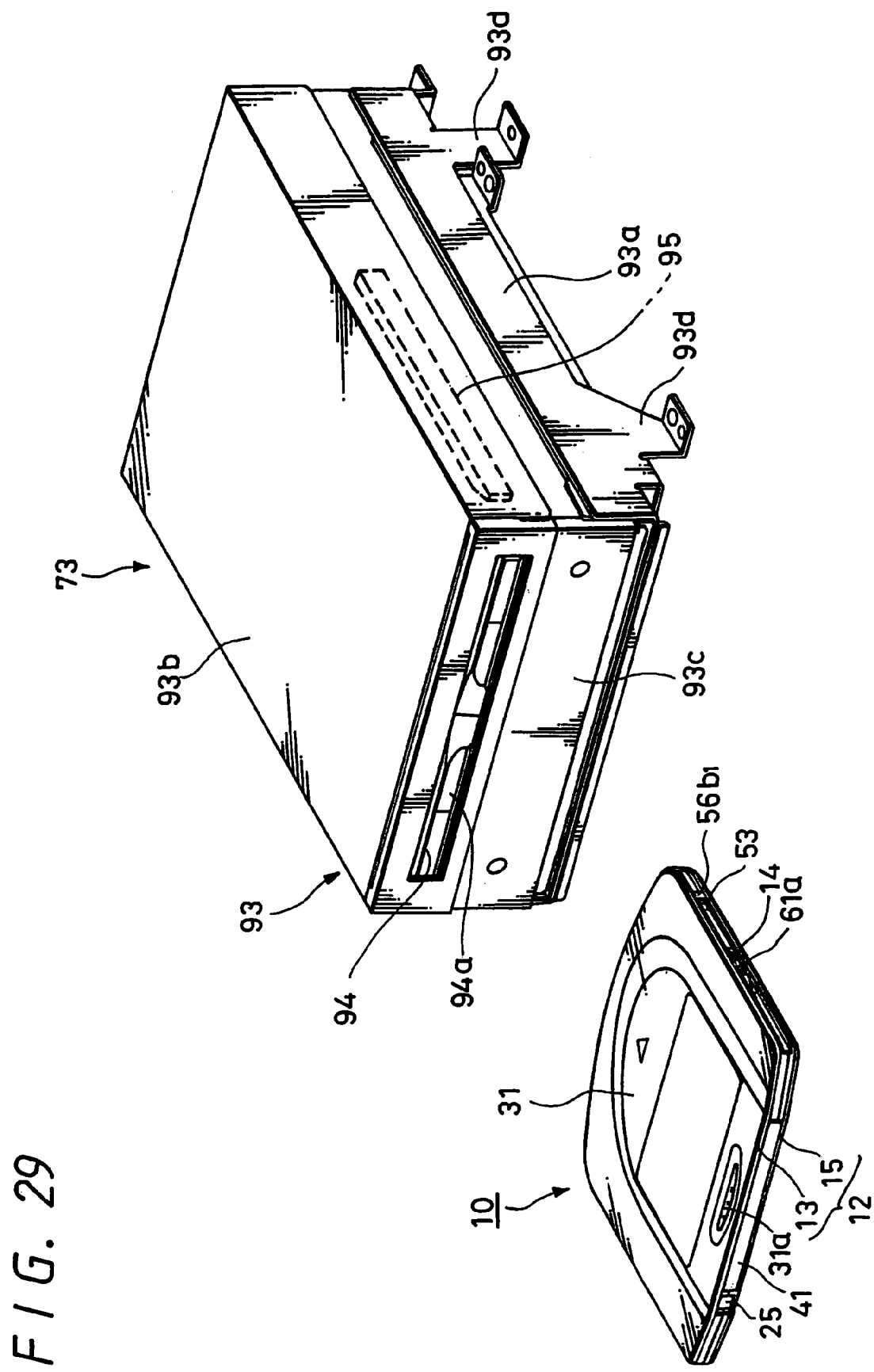
FIG. 29 is a perspective view showing the state presented before the disk recording medium device is loaded onto the table drive apparatus of the disk recording and/or reproducing apparatus according to the present invention.
Figure 30:
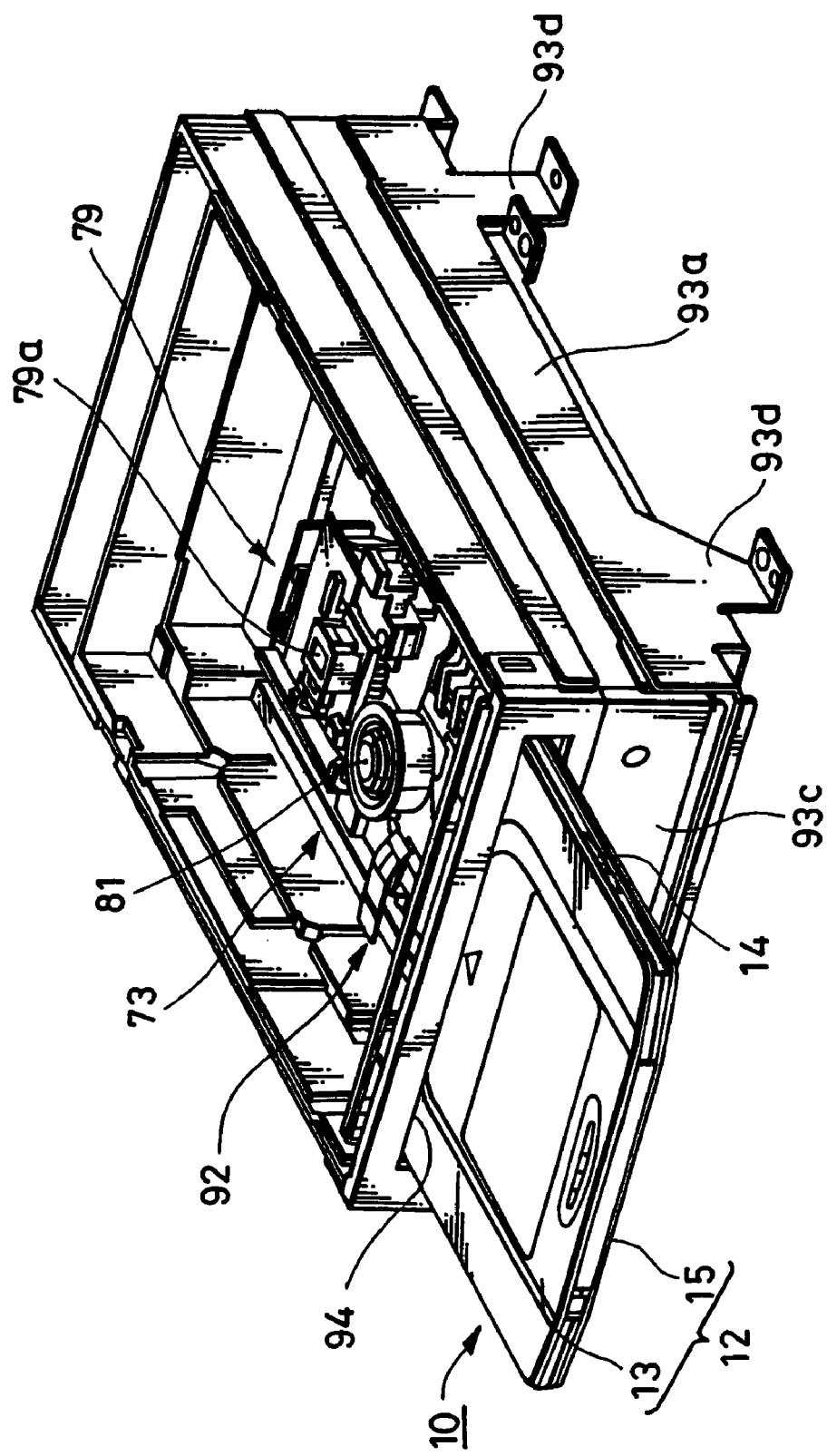
FIG. 30 is a perspective view showing the state presented when the disk recording medium device is being loaded onto the disk recording and/or reproducing apparatus according to the present invention.

The recording and reproducing apparatus body 92 having the above-mentioned arrangement is accommodated within an armor case 93 formed of a hollow housing shown in FIGS. 29 and 30, for example, and is used as a constituent of the disk recording and reproducing apparatus 73. The armor case 93 includes a case body 93a that is opened to the upper surface and the front surface, a case lid 93b detachably attached to the upper portion so as to close the upper surface of the case body 93a, a front panel 93c detachably attached to the front portion so as to close the front surfaces of the case body 93a and the case lid 93b and so forth. The disk recording and reproducing apparatus 73 including the recording and reproducing apparatus body 92, the above-mentioned table drive apparatus 78 and so forth are accommodated within this armor case 93.

The case body 93a of the armor case 93 has leg members 93d provided at its four portions to project downward. The front panel 93c of the armor case 93 is formed of an oblong plate member and has an oblong cartridge entrance and exit slot 94 provided at its upper portion. The cartridge entrance and exit slot 94 has approximately the same size as that of the front surface side of the disk recording medium device 10. This cartridge entrance and exit slot 94 is constantly closed by an open and close door 94a disposed in its inside.

The open and close door 94a is spring-biased in the closing side under spring force of a spring, not shown. As shown in FIG. 30, when the disk recording medium device 10 is inserted into predetermined position by pressing the open and close door 94a at the front portion of the disk recording medium device, the disk recording medium device 10 can be automatically loaded onto the disk recording and reproducing apparatus body by a loading mechanism, not shown. Then, the disk recording medium device 10 that has been transported by the loading mechanism is properly located at predetermined position within the armor case 93 and fixed. At the same time or before and after the disk recording medium device is properly located and fixed, the shutter mechanism 19 of the disk recording medium device 10 is opened by the shutter open and close means provided within the armor case 93, whereby the inside and outside opening portions 17, 18 of the cartridge housing 12 are opened.

Figure 31:
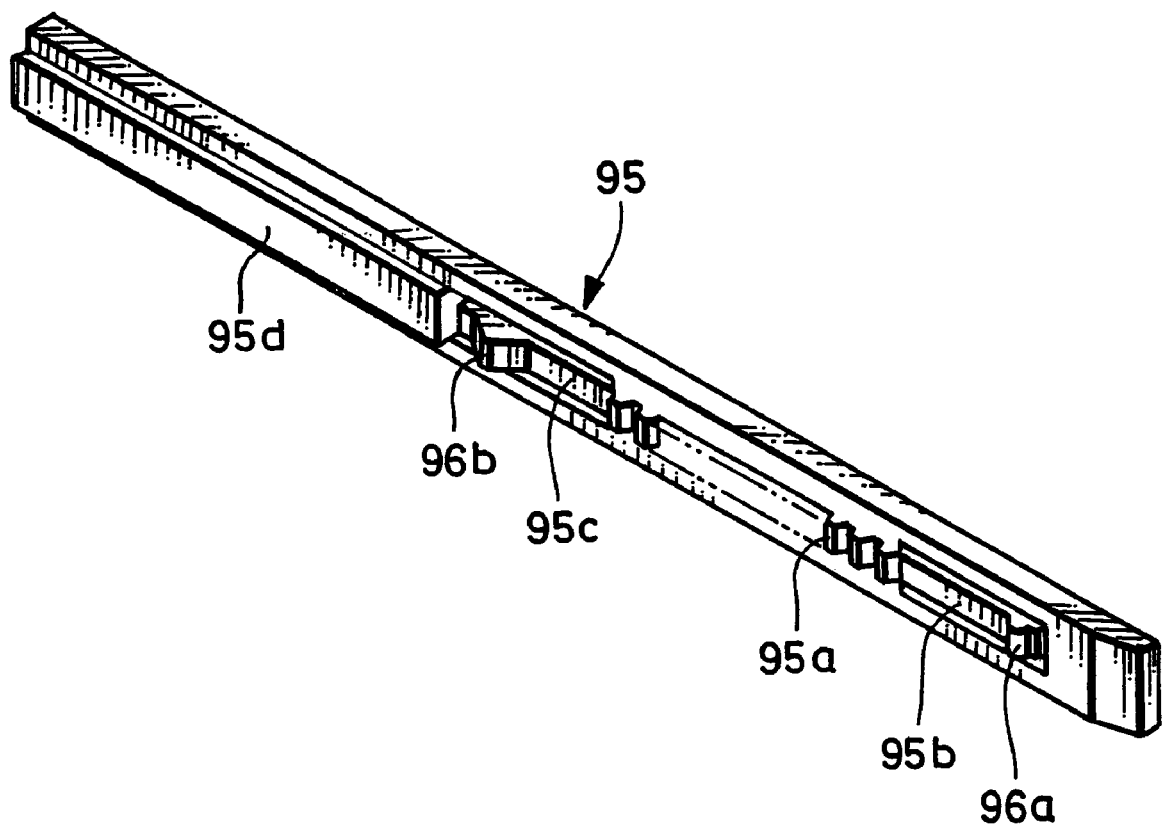
FIG. 31 is a perspective view showing a shutter opening and closing means that opens and closes the shutter mechanism of the disk recording medium device according to the present invention.

FIG. 31 shows a rack rod 95 that shows a concrete example of this shutter open and close means. This rack rod 95 includes a rack portion 95a meshed with the gear portion 60a of the operated portion 60 of the rotary member 14, a front resilient member 95b provided at the tip end side of this rack portion 95a and a rear resilient member 95c provided at the base end side of the same rack portion 95a. The rack portion 95a of the rack rod 95 is formed of a straight rod material and is protruded at its intermediate portion to one surface side. The rack portion has gear teeth the number of which is approximately the same as that of the gear portion 60a.

Figure 41:
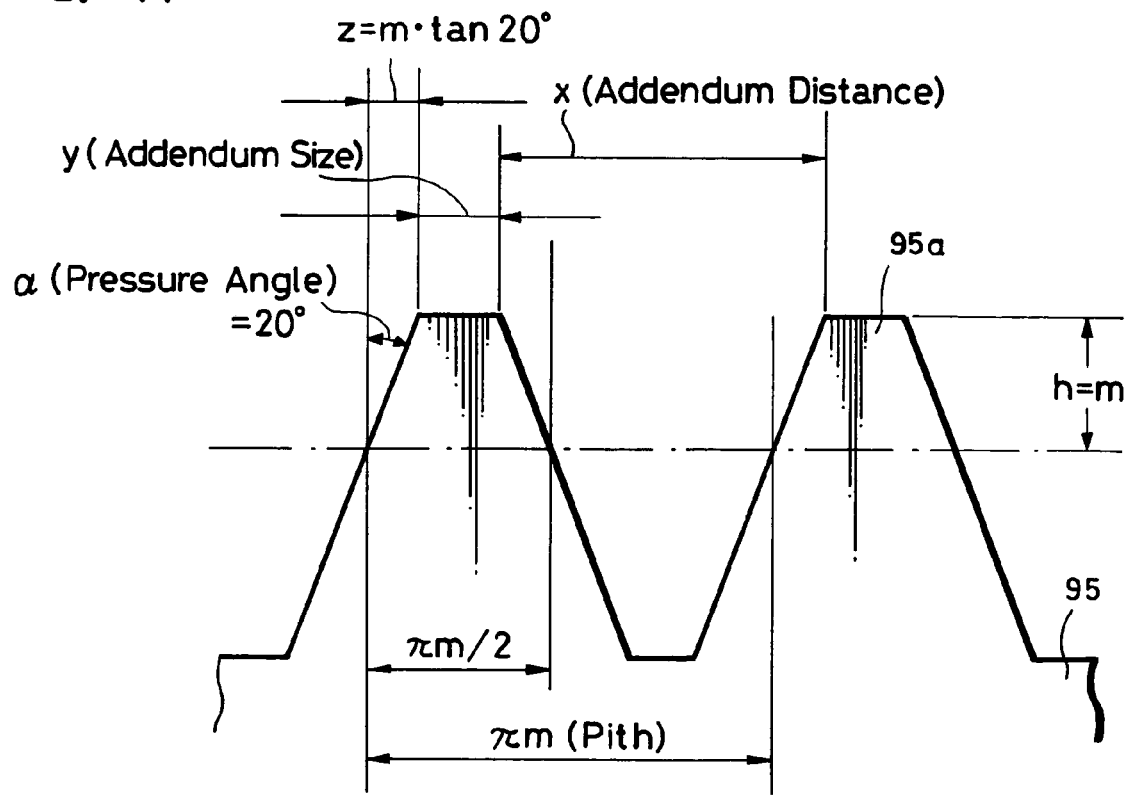
FIG. 41 is an explanatory diagram showing a main portion and to which reference will be made in explaining a tooth form of the rack portion of the rack rod shown in FIG. 31.

Assuming that the rack portion 95a of the rack rod 95 is shaped as shown in FIG. 41, for example, then the distance x between adjacent addendums of the rack portion 95a and the length w of the input portion $56_{b1}$ of the lock member 56 should preferably have the following relationship.

Where m: module
α: pressure angle (e.g. 20°)
x: addendum distance
y: addendum size
h: height of tooth (h=m)
πm: pitch
πm/2: ½ of pitch The pressure angle α is not limited to 20° and other angles such as 14.5° can be applied to the pressure angle. The addendum size y is given by the following equation:

$$y = \pi m/2 - 2 \times z$$
$$= \pi m/2 - 2 \times m \times \tan 20°$$

The addendum distance x is given by the following equation:

$$x = \pi m - y$$
$$= \pi m - (\pi m/2 - 2 \times m \times \tan 20°)$$
$$= \pi m/2 + 2 \times m \times \tan 20°$$

Therefore, the length w of the input portion $56_{b1}$ is set to be larger than x (addendum distance). Such size relationship can be applied to the rack portion 95a of the rack rod 95 and the input portion $56_{b1}$ of the lock member 56 with the following effects being achieved, for example.

When the shutter opening and closing operations of the disk cartridge of the above-described disk recording medium device 10 are carried out by rack-like parts integrally formed or composed of a plurality of assemblies, the lock mechanism of the shutter mechanism is released by the rack-like parts. At that case, when the length w of the input portion $56_{b1}$ for releasing the lock mechanism is set to be larger (longer) than the distance x between adjacent addendums of the rack portion 95a, the addendum of the rack portion 95a can constantly act on the input portion $56_{b1}$. As a result, the input portion $56_{b1}$ can be constantly pressed by the addendum of the rack portion 95a, load fluctuations generated such as when the input portion is caught with the addendum of the rack portion 95a can be suppressed so that smooth shutter opening and closing operations can be realized.

As a result, load fluctuations generated when the shutter of the disk recording medium device 10 is opened and closed by the table drive apparatus 78 can be suppressed reliably without any special devices. Then, the input portion $56_{b1}$ can be prevented from being caught with the addendum of the rack portion 95a of the rack rod 95 and the disk cartridge can be prevented from being broken when the input portion is caught with the addendum.

The front resilient member 95b of the rack rod 95 is extended in the same direction of the rack rod 95 and is made resilient properly. An initial operation convex portion 96a is provided at the tip end portion of the front resilient member. Further, the rear resilient member 95c is similarly extended in the same direction of the rack rod 95 and is made resilient properly. A stopper convex portion 96b is provided at the tip end portion of the rear resilient member. The initial operation convex portion 96a and the stopper convex portion 96b are protruded in the same direction as that of the gear teeth of the rack portion 95a and these initial operation portion and stopper convex portion are set on the same straight line.

Further, although the initial operation convex portion 96a has an arc-like cross-section, the size and height of the initial operation convex portion are approximately the same as those of the gear teeth of the rack portion 95a. On the other hand, although the stopper convex portion 96b has a cross-section that is an angle form similarly to the gear teeth of the rack portion 95a, the size and height of the cross-section of the stopper convex portion are formed slightly larger. Then, the front and rear resilient members 95b, 95c are given resiliency of proper strength, whereby the initial operation convex portion 96a and the stopper convex portion 96b can be moved rearward with resiliency. In FIG. 31, reference numeral 95d designates a guide portion that serves as a reinforcement portion for use with the rack rod 95 as well. This guide portion 95d is engaged with the loading guide groove 53 of the disk recording medium device 10.

The manner in which the rotary member 14 of the disk recording medium device 10 is rotated, the shutter mechanism 19 is opened and closed and other members are operated in unison with actions of the rack rod 95 having the above-mentioned arrangement will be described with reference to FIGS. 29 and 30 and FIGS. 32 to 40.

As shown in FIG. 29, the inside and outside opening portions 17, 18 of the disk recording medium device 10 are completely closed by the shutter mechanism 19 until the disk recording medium device is inserted into the cartridge entrance and exit slot 94 of the armor case 93. In this state, as shown in FIG. 30, when the disk recording medium device 10 is inserted from the cartridge entrance and exit slot 94 of the armor case 93 into the disk recording and reproducing apparatus 73, the lock member 56 is released from the locked state by the rack rod 95 disposed within the armor case 93. Thereafter, the rack rod 95 acts to open a pair of shutter members 19a, 19b to allow the inside and outside opening portions 17, 18 to be opened, thereby a part of the information recording surface of the optical disk 11 being exposed.

First, as shown in FIGS. 30 and 32, when the disk recording medium device 10 is inserted into the cartridge entrance and exit slot 94 of the armor case 93 a predetermined amount, the initial operation convex portion 96a of the rack rod 95 is entered into the loading guide groove 53 formed on one side surface portion of the disk recording medium device 10. As a result, the initial operation convex portion 96a inserts the input portion $56_{b1}$ of the lock member 56 protruded in the loading guide groove 53 into the lock housing portion 55 with pressure against spring-biasing force of the resilient arm 56d.

Figure 34:
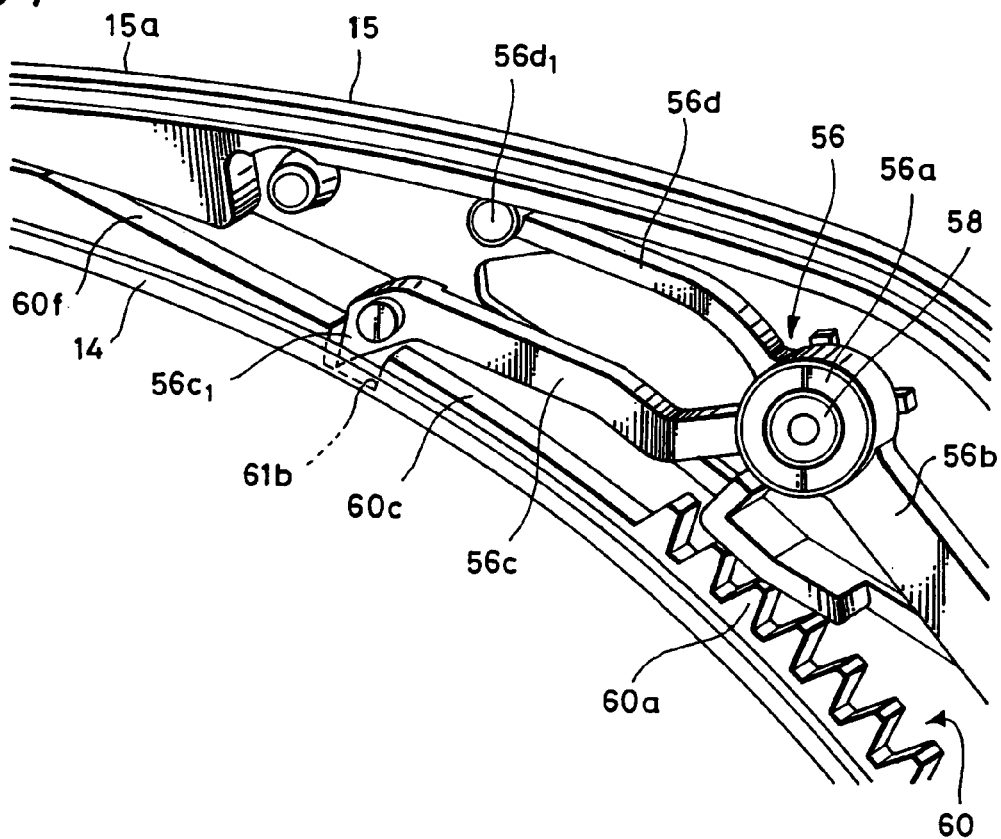
FIG. 34 is a perspective view showing a main portion of FIG. 33 in a more enlarged-scale.

Consequently, the lock member 56 is rotated about the support shaft 58 to allow the lock claw $56_{c1}$ to be disengaged from the set position concave portion 61b as shown in FIGS. 33 and 34. As a result, the rotary member 14 is released from the locked state and thereby becomes able to rotate freely.

In this case, although the input portion $56_{b1}$ that had been inserted into the opening hole 57 with pressure by the initial operation convex portion 96a is protruded into the loading guide groove 53 temporarily under spring force of the resilient arm 56d, the input portion is inserted again into the opening hole 57 with pressure by the teeth of the rack portion 95a continuing the initial operation convex portion 96a. The inserted state of this input portion $56_{b1}$ is being continued during a period in which the rack portion 95a is being opposed to the input portion $56_{b1}$. At that time, since the length w of the input portion $56_{b1}$ is larger than the distance $x(=\pi m/2+2 \times m \times \tan 20°)$ between the adjacent addendums of the rack portion 95a, the addendum of the rack portion 95a can constantly act on the input portion $56_{b1}$. As a result, hammering generated when the addendum of the rack portion 95a contacts with the input portion $56_{b1}$ and load fluctuations generated when the input portion is caught with the addendum of the rack portion can be prevented or suppressed so that smooth shutter opening and closing operations can be realized.

Figure 35:
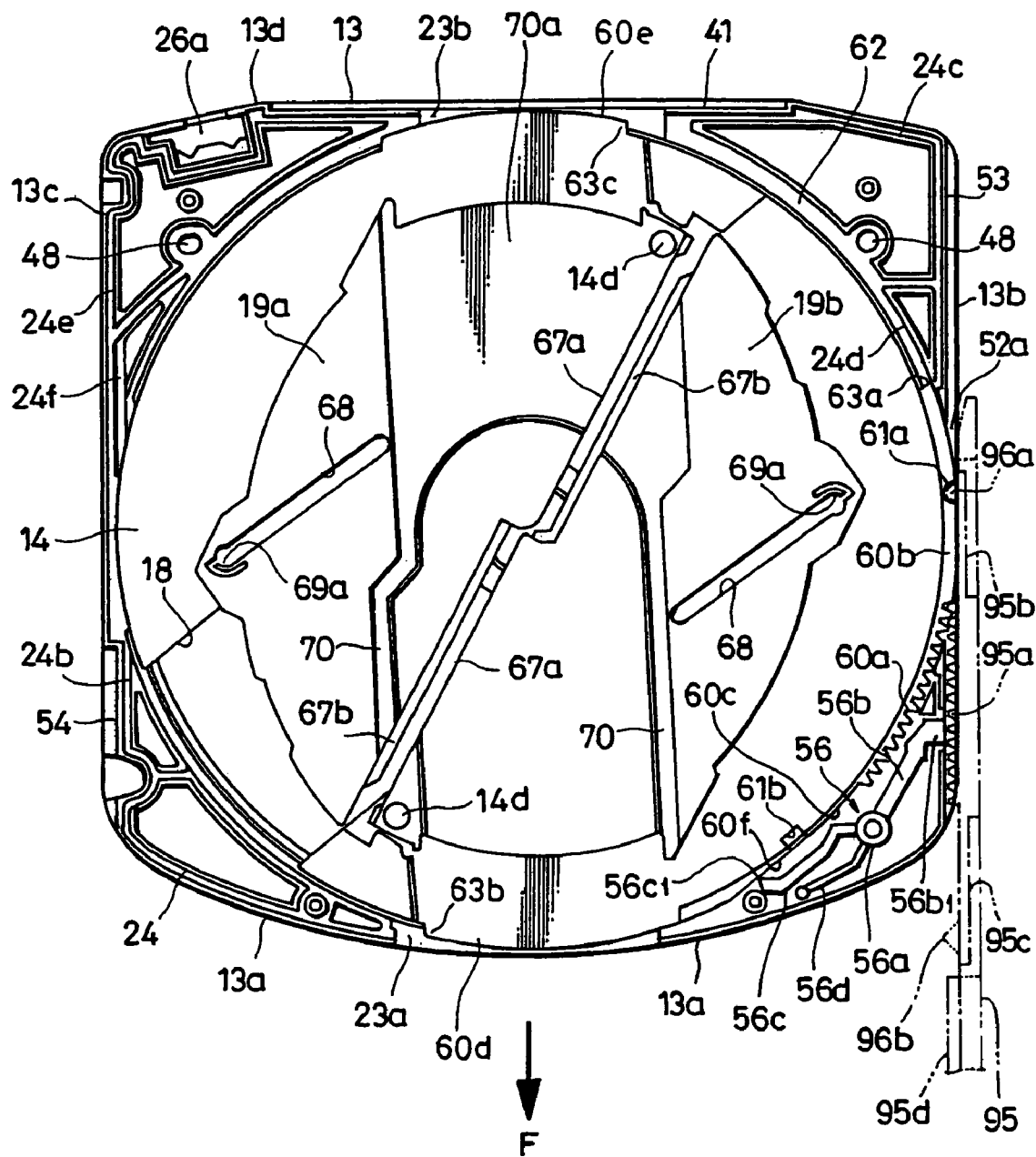
FIG. 35 is a diagram to which reference will be made in explaining the manner in which the shutter mechanism is opened and closed by the shutter opening and closing means in the state in which the lower shell is removed from the disk recording medium device according to the present invention and illustrates the state obtained when a pair of shutter members is slightly opened (approximately 5°) after the initial operation convex portion of the rack member had engaged with an initial operation concave portion of the rotary member to enable the rotary member begin to rotate.

Next, as shown in FIG. 35, the disk recording medium device 10 is inserted into the cartridge insertion direction F and the disk recording medium device 10 is advanced relative to the rack rod 95, whereby the initial operation convex portion 96a is brought in contact with the front slide portion 60b of the operated portion 60 of the rotary member 14 and slid over the front slide portion 60b. At that time, since the front resilient member 95b has resiliency of proper strength, when the front resilient member 95b is flexed, the initial operation concave portion 96a is flexed backward, moved and slid over the front slide portion 60b. As a result, the initial operation convex portion 96a is entered into the initial operation concave portion 61a of the operated portion 60.

Figure 36:
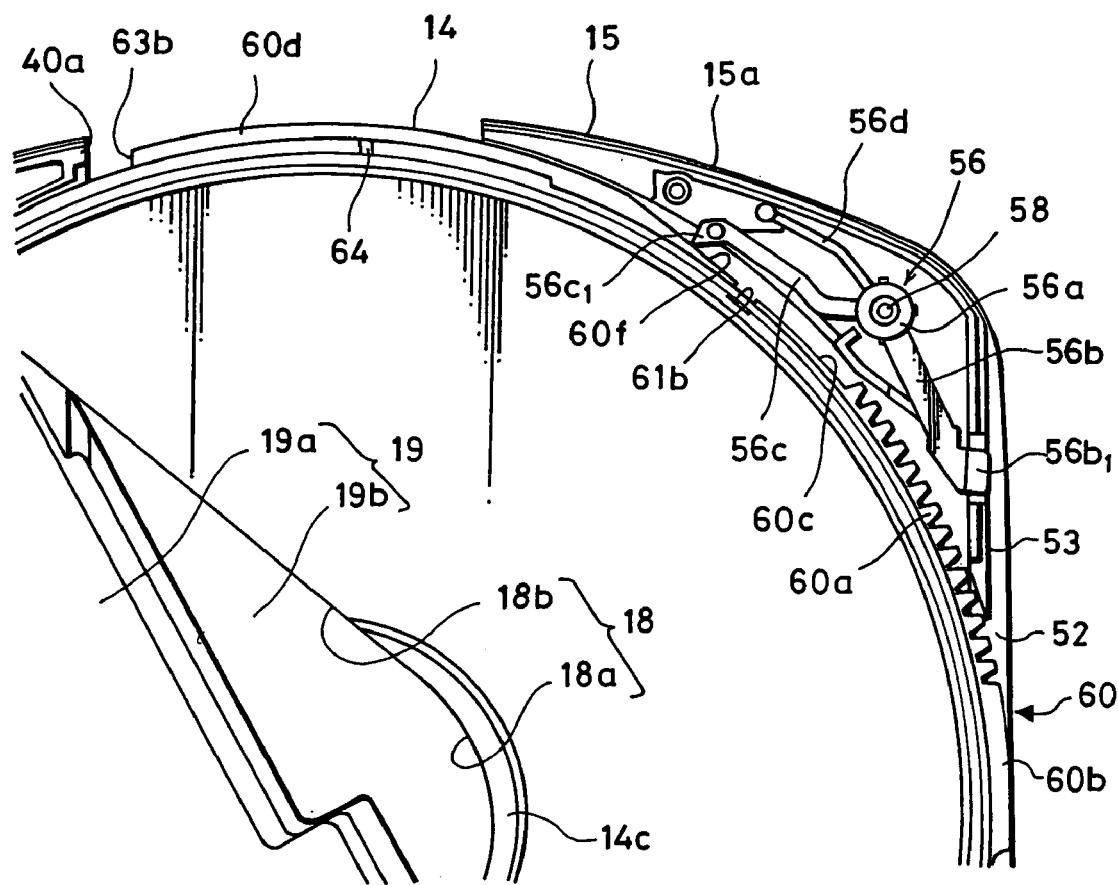
FIG. 36 is a plan view showing a main portion in an enlarged-scale and to which reference will be made in explaining relationships among the rotary member, the lower shell, the lock member and the like in the state in which the upper shell is removed from the recording medium device shown in FIG. 35.

This convex portion 96a is engaged with the concave portion 61a, whereby the rotary member 14 is rotated in the counter-clockwise direction in the sheet of drawing by repulsive force from the rack rod 95. As a result, the rotary member 14 is rotated a predetermined angle in response to a relative movement amount between it and the rack rod 95, whereby the rack portion 95a is meshed with the gear portion 60a of the operated portion 60 before the convex portion 96a is disengaged from the concave portion 61a. Thus, a power transmission route becomes strong so that movement force of the rack rod 94 is positively transmitted to the rotary member 14, thereby the rotary member being rotated a predetermined angle. At that time, the lock claw $56_{c1}$ of the lock member 56 is moved upwardly along the inclined surface portion 60e as shown in FIG. 36.

Figure 37:
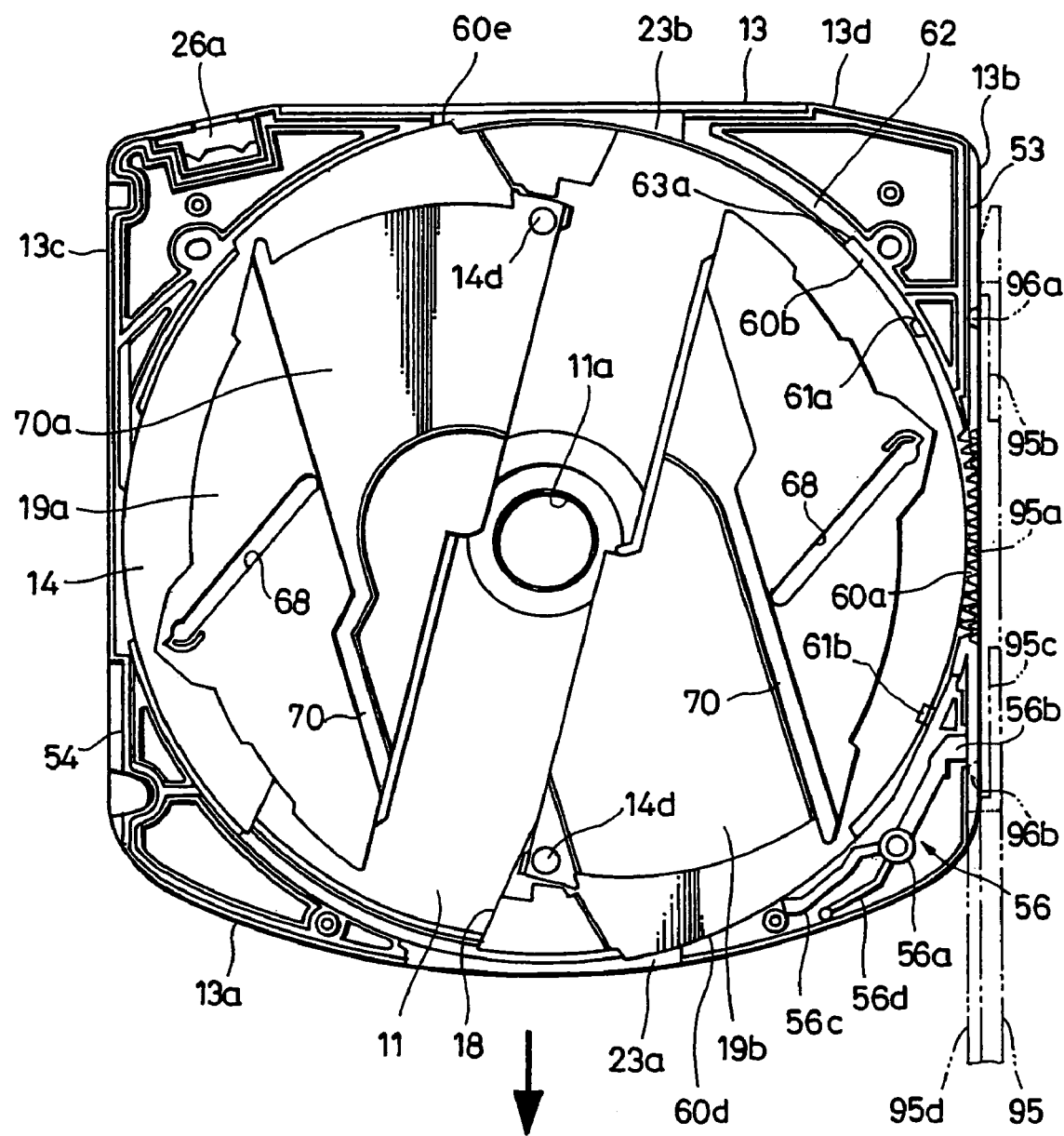
FIG. 37 is a diagram to which reference will be made in explaining the manner in which the shutter mechanism is opened and closed by the shutter opening and closing means in the state in which the lower shell is removed from the disk recording medium device according to the present invention and illustrates the state obtained when a pair of shutter members is largely opened (approximately 30°) after a rack portion of the rack rod had meshed with a gear portion of the rotary member.
Figure 38:
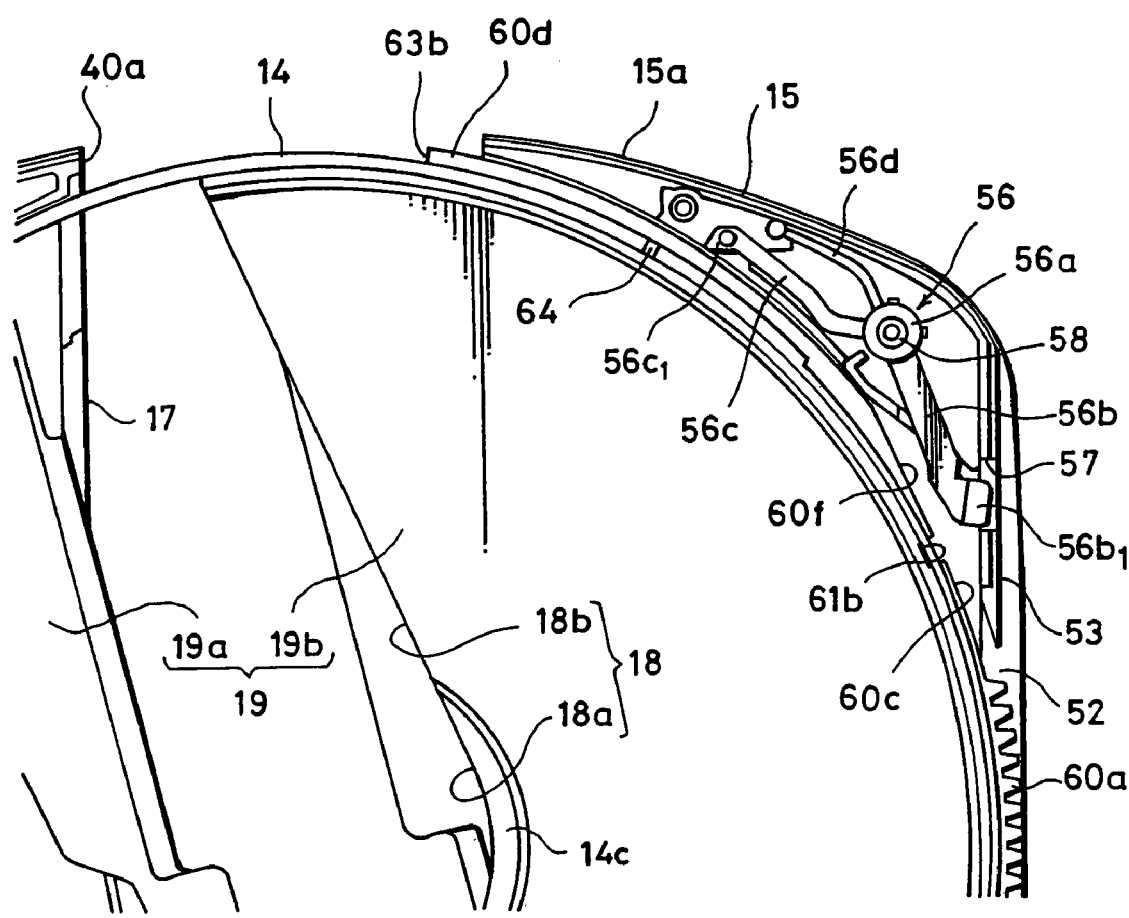
FIG. 38 is a plan view showing a main portion in an enlarged-scale and to which reference will be made in explaining relationships among the rotary member, the lower shell, the lock member and the like in the state in which the upper shell is removed from the disk recording medium device shown in FIG. 37.

Next, as shown in FIG. 37, before the rack portion 95a that linearly advances and the gear portion 60a that advances in a curved fashion are released from being meshed with each other, the stopper convex portion 96b is engaged with the set position concave portion 61b provided on the rear slide portion 60c of the operated portion 60. At that time, the lock claw $56_{c1}$ of the lock portion 56 is passed through the inclined surface portion 60f and slid over the first land portion 60d as shown in FIG. 38.

Figure 39:
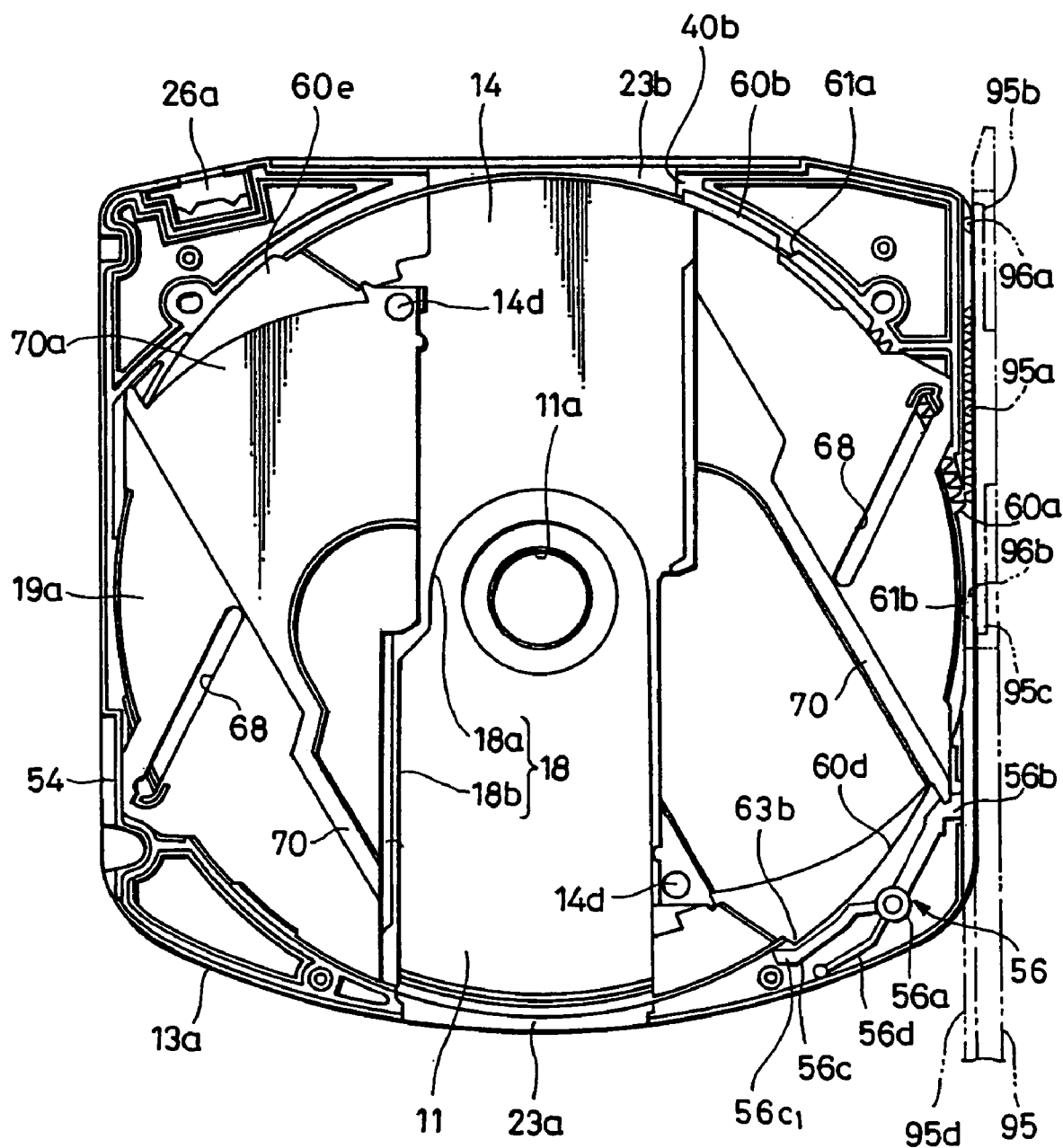
FIG. 39 is a diagram to which reference will be made in explaining the manner in which the shutter mechanism is opened and closed by the shutter opening and closing means in the state in which the lower shell is removed from the disk recording medium device according to the present invention and illustrates the state obtained when a pair of shutter members opens the opening portion completely (approximately 55°) after a stopper convex portion of the rack member had engaged with a set position concave portion of the rotary member.

Thereafter, as shown in FIG. 39, when the stopper convex portion 96b is firmly meshed with the set position concave portion 61b, the rack portion 95a and the gear portion 60a are released from the meshed state. Thus, the insertion operation of the disk recording medium device 10 is completed and the disk recording medium device 10 is set to the cartridge loading portion that is the predetermined position of the table drive apparatus 78.

Figure 40:
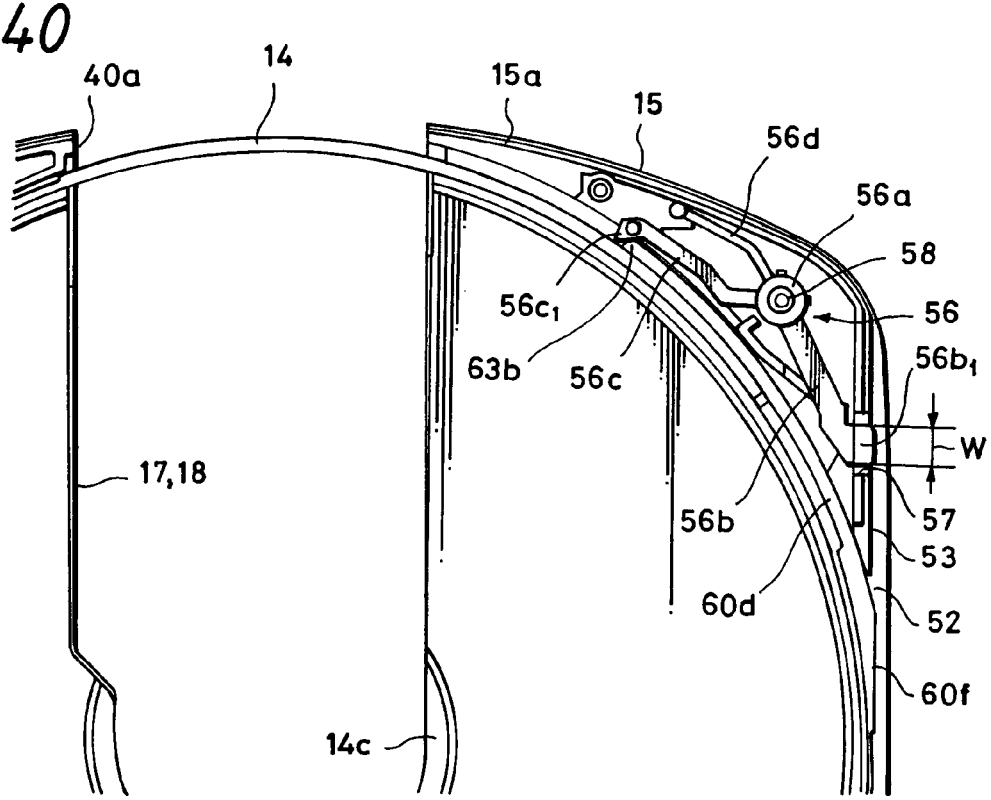
FIG. 40 is a plan view showing a main portion in an enlarged-scale and to which reference will be made in explaining relationships among the rotary member, the lower shell, the lock member and the like in the state in which the upper shell is removed from the disk recording medium device shown in FIG. 39.

At that time, the lock claw $56_{c1}$ of the lock member 56 is slid along the top surface of the first land portion 60d, dropped on the side distant from the gear portion 60a and is thereby engaged with the first end stopper 63b as shown in FIG. 40. At the same time, the end stopper 63a of the front slide portion 60b is brought in contact with the positioning portion 40b of the lower shell 15 from the inside. The operated portion 60 of the rotary member 14 is sandwiched by the positioning portion 40b and the lock claw $56_{c1}$ from both sides and the rotary member 14 is locked by the engagement of the lock claw $56_{c1}$ and thereby inhibited from being rotated. Thus, opening operations of a pair of shutter members 19a, 19b are completed so that the inside and outside opening portions 17, 18 are opened completely.

Thereafter, pressing force applied to the cartridge housing 12 is released by the rack rod 95. Meaning for releasing the pressing force is to remove such a risk that vibrations and shocks generated on the side of the table drive apparatus 78 when the rotary member 14 or the like is loosened by pushing force while pushing force is being applied to the rotary member 14 and the like, for example, will be transmitted through the rack rod 95 to the cartridge housing 12. To be concrete, after opening operations of a pair of shutter members 19a, 19b had been finished, the rack rod 95 is moved away from the cartridge housing 12 and loads applied to the cartridge housing 12 (in particular, the rotary member 14 and the like) are released by the rack rod 95.

At that time, the cartridge housing 12 of the disk recording medium device 10 is positioned with high accuracy by a pair of reference holes 48, 48 of the upper shell 13 and a pair of reference protrusions 47, 47 of the lower shell 15 as described above, and a pair of positioning holes 50a, 50b are provided on the lower shell 15 so as to become coaxial with these reference protrusions 47 and so forth. Thus, when the disk recording medium device 10 is loaded onto the disk loading portion of the table drive apparatus 78, since accuracy with which the lower shell 15 is positioned on the table drive apparatus 78 becomes equal to accuracy with which the upper shell 13 is positioned on the table drive apparatus, it is possible to increase accuracy with which the upper shell 13 is positioned on the table drive apparatus.

Figure 25:
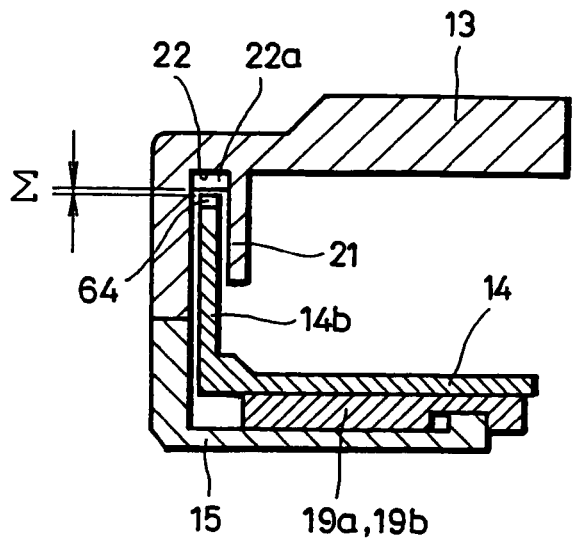
FIG. 25 is a diagram to which reference will be made in explaining how to calculate a clearance between a cam portion of the upper shell and a cam protrusion of a rotary member of the disk cartridge according to the present invention and shows its clearance in the form of reference numerals.

In the state in which the disk recording medium device is set, since the stopper convex portion 96b is firmly meshed with the set position concave portion 61b, there is then no risk that the rotary member 14 will be rotated. At that time, in the initial state in which the rotary member 14 begins to rotate, as shown in FIGS. 23C and 25, a plurality of cam protrusions 64 provided on the end face of the ring portion 14b of the rotary member 14 are slid over the cam portion 22a provided on the cam groove 22 of the upper shell 13.

As a result, the flat surface portion 14a of the rotary member 14 is moved toward the side of the lower shell 15, whereby a pair of shutter members 19a, 19b is held between the flat surface portion 14a and the lower shell 15. Thus, friction force is generated between the rotary member 14 and the lower shell 15 so that force necessary for rotating the rotary member 14 should increase unavoidably. If the rotary member 14 is rotated against friction force generated when the cam protrusions are slid over the cam portion 22a, then the cam protrusion 64 passes the cam portion 22a as shown in FIG. 23B. In consequence, since friction force generated when the cam protrusion 64 passes the cam portion disappears, the rotary member 14 becomes able to rotate very easily and smoothly from now on.

A pair of shutter members 19a, 19a is rotated about the support shaft 14d in unison with the rotation of the rotary member 14. At the same time, the operation convex portions 39a, 39b of the lower shell 15 are slidably engaged with the open and close grooves 68 provided on the respective shutter members 19a, 19b. Consequently, when the rotary member 14 is rotated, the respective open and close grooves 68 are rotated relative to a pair of operation convex portions 39a, 39b. As a result, a pair of shutter members 19a, 19b is moved toward the inside (toward the center of the rotary member 14) in which they are moved close to each other in response to the rotation amount of the rotary member 14.

Thus, a pair of shutter members 19a, 19b is changed from the state shown in FIG. 32 through the states shown in FIGS. 35 and 37 to the state shown in FIG. 39 to open the inside and outside opening portions 17, 18 and thereby moved to the positions opposing in the right and left. Thus, since the inside opening portion 18 of the rotary member 14 and the outside opening portion 17 of the lower shell 15 are opened completely, a part of the optical disk accommodated within the disk compartment 16 is exposed from the inside and outside opening portions 17, 18 (see FIG. 19).

Figure 18:
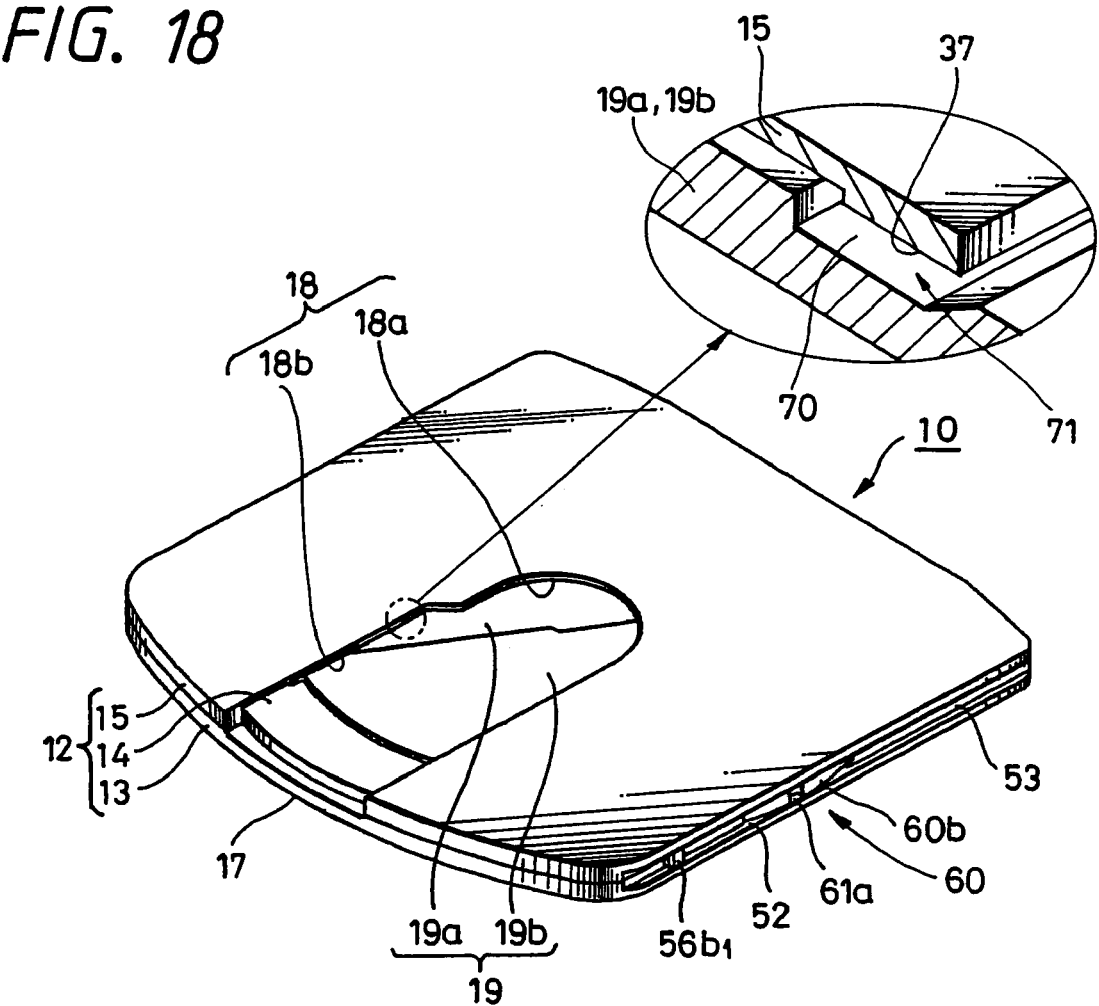
FIG. 18 is a perspective view showing the disk recording medium device shown in FIG. 17 from the lower surface side and illustrates the state in which the opening portion is closed by closing a shutter mechanism.
Figure 19:
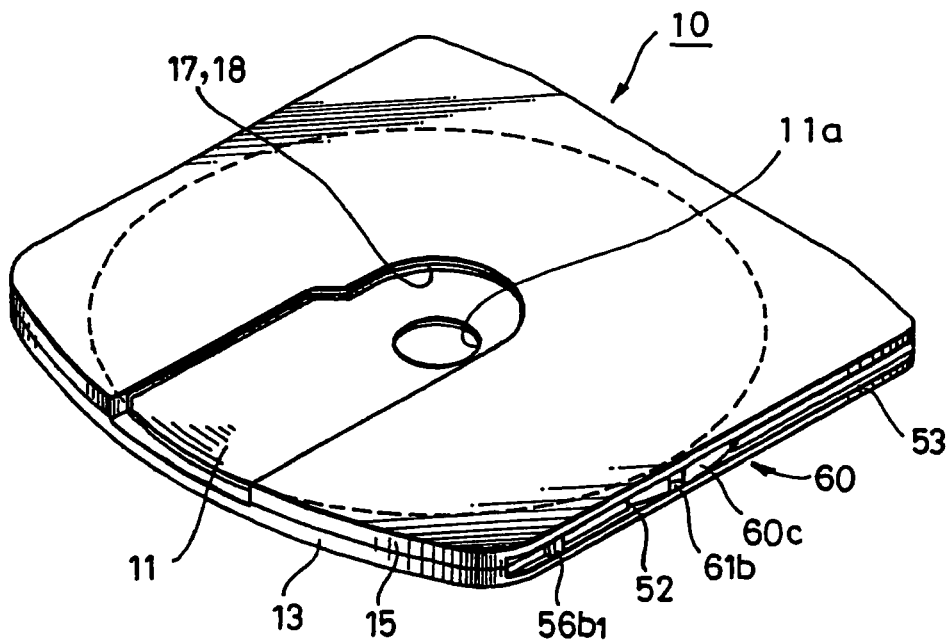
FIG. 19 is a perspective view showing the disk recording medium device shown in FIG. 17 from the lower surface side and illustrates the state in which the opening portion is opened by opening the shutter mechanism.

As a result, the inside and outside opening portions 17, 18 are changed from the state shown in FIG. 18 to the state shown in FIG. 19 with the result that it becomes possible to insert the turntable 81 and the optical head having the objective lens 79a into the inside and outside opening portions 17, 18. Accordingly, the turntable 81 or the like is moved toward the side of the disk recording medium device 10 or the disk recording medium device 10 is moved toward the side of the turntable 81 and the state shown in FIG. 21 is changed into the state shown in FIG. 22, whereby the turntable 81 is entered into the table opening portions 17a, 18a provided at the central portion of the cartridge housing 12 and the optical head is entered into the head opening portion 17b, 18b.

Consequently, the fitting portion 81a of the turntable 81 is fitted into the center hole 11a of the optical disk 11 and the peripheral edge portion of the center hole 11a is held on the table portion 81b. At the same time, magnetic force from the magnet 97 incorporated within the fitting portion 81a acts on the position restriction portion 33d serving as the magnetic force reception portion of the chucking ring 33 held on the ring holder 34 of the upper shell 13 and the chucking ring 33 is attracted by the magnetic force. As a result, the holding portion 33b of the chucking ring 33 is urged against the peripheral edge portion of the center hole 11a of the optical disk 11 by the magnetic force of the magnet 97, whereby the peripheral edge portion is held between the holding portion 33b and the table portion 81a of the turntable 81.

Consequently, the optical disk 11 is chucked onto the turntable 81 by the chucking ring 33 and thereby the optical disk 11 is integrated with the rotation direction of the turntable 81. At that time, the tip end portion of the table portion 81a of the turntable 81 is fitted into the concave portion 33f of the position restriction portion 33d of the chucking ring 33, whereby the chucking ring 33 is properly positioned to the turntable 81 at the same time. Thus, the chucking ring 33 is properly positioned at substantially the central portion of the turntable 81.

As a result, the chucking ring 33 is floated from the upper shell 13 so that predetermined clearances are held between the inner surface of the tapered portion 33c of the chucking ring 33 and the outside inclined surface of the second annular convex portion 99b of the upper shell 13, between the outer surface of the tapered portion 33c and the inner peripheral edge of the inner flange 34a of the ring holder 34 and between the surface of the position restriction portion 33d of the chucking ring 33 and the inside inclined surface of the first annular convex portion 99a of the upper shell 13 to thereby prevent the above-mentioned elements from rubbing with each other.

Concurrently with the chucking operation, the optical head of the optical pickup device 79 enters into the opening portions 17, 18 to allow its objective lens 79a to oppose the information recording surface of the optical disk 11 with a predetermined clearance. Thus, the disk recording and reproducing apparatus 73 becomes able to reproduce or record an information signal from or on the information recording surface of the optical disk 11.

Accordingly, the table drive apparatus 78 is operated, the spindle motor 75 is driven to rotate the optical disk 11 through the turntable 81. At the same time, the optical pickup device 79 is driven to allow the objective lens 79a of the optical head to irradiate laser beams on the information recording surface of the optical disk 11. Thus, the information signal can be read out from the information recording surface of the optical disk 11 or a new information signal can be written on the information recording surface. In this manner, the information signal can be reproduced or recorded by the disk recording and reproducing apparatus 73.

Next, the manner in which the disk recording medium device 10 is ejected from the armor case 93 will be described. After the information signal had been reproduced or recorded, when a user operates a cartridge eject button (not shown) provided on the armor case 93, for example, the loading mechanism is activated to disengage the disk recording medium device 10 from the disk recording and reproducing apparatus 73 so that the disk recording medium device is ejected from the armor case 93.

For example, in the state in which the disk recording medium device 10 is fixed to the disk loading portion, the spindle motor 75 is moved rearward and the turntable 81 is pulled out from the opening portions 17, 18 of the disk recording medium device 10. At that time, when the spindle motor 75 is moved rearward, first, the turntable 81, the optical disk 11 and the chucking ring 33 are moved in unison with each other. Then, when the turntable, the optical disk and the chucking ring are moved a little in unison with each other, the tapered portion 33c of the chucking ring 33 is brought in contact with the inner peripheral edge of the inner flange 34a of the ring holder 34 fixed to the upper shell 13.

When the spindle motor 75 is further moved rearward, the movement force of the spindle motor becomes larger than the attraction force of the magnet 97 so that the chucking ring 33 is detached from the turntable by resistance of the ring holder 34. As a result, the chucking ring 33 is held on the upper shell 13 by the ring holder 34. Next, the peripheral edge portion of the center hole 11a of the optical disk 11 is brought in contact with the support edge portion 14c of the rotary member 14 and the spindle motor 75 is further moved rearward to allow the fitting portion 81a of the turntable 81 to be removed from the center hole 11a of the optical disk 11. As a result, the optical disk 11 is held within the disk compartment 16 of the cartridge housing 12. Then, the spindle motor 75 is continuously moved rearward until the turntable 81 is completely extracted from the opening portions 17, 18.

Thereafter, when the disk recording medium device 10 is moved in the eject direction by eject operation of the loading mechanism, the rack rod 95 is relatively move rearward. When the disk recording medium device 10 is moved rearward relative to this rack rod 95, the rotary member 14 is rotated by the stopper convex portion 96b engaged with the set position concave portion 61b. Then, before the convex portion 96b is disengaged from the concave portion 61b, the rack portion 95a is meshed with the gear portion 60a and the rotary member 14 is continued to rotate by the meshed state between the rack portion and the gear portion.

At that time, since the tip end of the stopper convex portion 96b of the rack rod 95 has already been inserted into the opening window 52 of the cartridge housing 12, the convex portion 96b is brought in contact with the edge of the opening window 52. However, since the rear resilient member 95c that was integrated with the convex portion 96b has resiliency of proper strength, this rear resilient member 95c is flexed and deformed with the result that the convex portion 96b is deformed to the outside with resiliency and passed through the edge of the opening window 52. Therefore, even though the height of the convex portion 96b is higher than the height of the gear teeth of the rack portion 95a, the convex portion 96b distant from the concave portion 61b can be easily extracted from the opening window 52. Accordingly, the rotation of the rotary member 14 will be maintained later on.

When the rotary member 14 is rotated, the initial operation convex portion 96a is engaged with the initial operation concave portion 61a before the rack portion 95a is disengaged from the gear portion 60a within the opening window 52. The convex portion 96a is engaged with the concave portion 61a, whereby the rotary member 14 is continued to rotate and the rotary member 14 is rotated to the initial position. As a result, since the second end stopper 63c of the rear slide portion 60c of the operated portion 60 is brought in contact with the positioning portion 40b of the lower shell 15, this contact will hinder the rotary member 14 from rotating later on.

On the other hand, since the disk recording medium device 10 and the rack rod 95 are continued to move relatively, the rotary member 14 is given rotation force by movement force of the convex portion 96a engaged with the concave portion 61a. Repulsive force of this rotation force is given to the convex portion 96a, the front resilient member 95b is flexed and deformed by this repulsive force and the convex portion 96a is moved to the outside, thereby the engagement between the convex portion and the concave portion 61a being released.

Thereafter, the initial operation convex portion 96a of the rack rod 95 is passed through the opening hole 52, whereby the input portion $56_{b1}$ of the lock member 56 is protruded from the opening hole 57 into the loading guide groove 53. At the same time, the lock claw $56_{c1}$ of the lock member 56 is moved to the inside and thereby meshed with the set position concave portion 61b of the operated portion 60 of the rotary member 14. As a result, the lock member 56 locks the rotary member 14 to stop rotation of the rotary member.

At that time, a pair of shutter members 19a, 19b executes operations opposite to those executed when the disk recording medium device is inserted into the armor case to thereby close the inside and outside opening portions 17, 18 completely. Since the cam protrusion 64 of the rotary member 14 is located within the cam groove 22, the rotary member 14 can be rotated by small force. Further, since the cam protrusion 64 is brought in contact with the cam portion 22a and slid over the cam portion, the above-mentioned friction force will be applied to rotation of the rotary member 14 later on. Then, immediately before the shutter mechanism 19 is closed, the operation convex portion 39b (or 39a) moves the open and close groove 68 to the outermost side portion so that the operation convex portion contacts with and presses the resilient member 69a. Thus, spring force is generated in the resilient member 69a by pushing force of the operation convex portion 39b (or 39a).

Under spring force of this resilient member 69a, urging force for acting on the other shutter member 19a (or 19b) is generated in the central stepped portion. Since this urging force is produced in both of the shutter members 19a, 19b, an airtight property of a pair of shutter members 19a, 19b can be improved more by their urging force. Therefore, a dust-proof property at the joint portion between a pair of shutter members 19a and 19b can be improved so that dusts and smudges can be prevented from entering the disk compartment 16 more effectively.

In this manner, the whole of the inside and outside opening portions 17, 18 is completely closed by a pair of shutter members 19*a*, 19*b* (see FIG. 32, etc.), and in this closed state, the disk recording medium device 10 is ejected from the cartridge entrance and exit slot 94 of the armor case 93 to the outside of the case. Thus, the ejection operation of the disk recording medium device 10 is completed.

Figure 24:
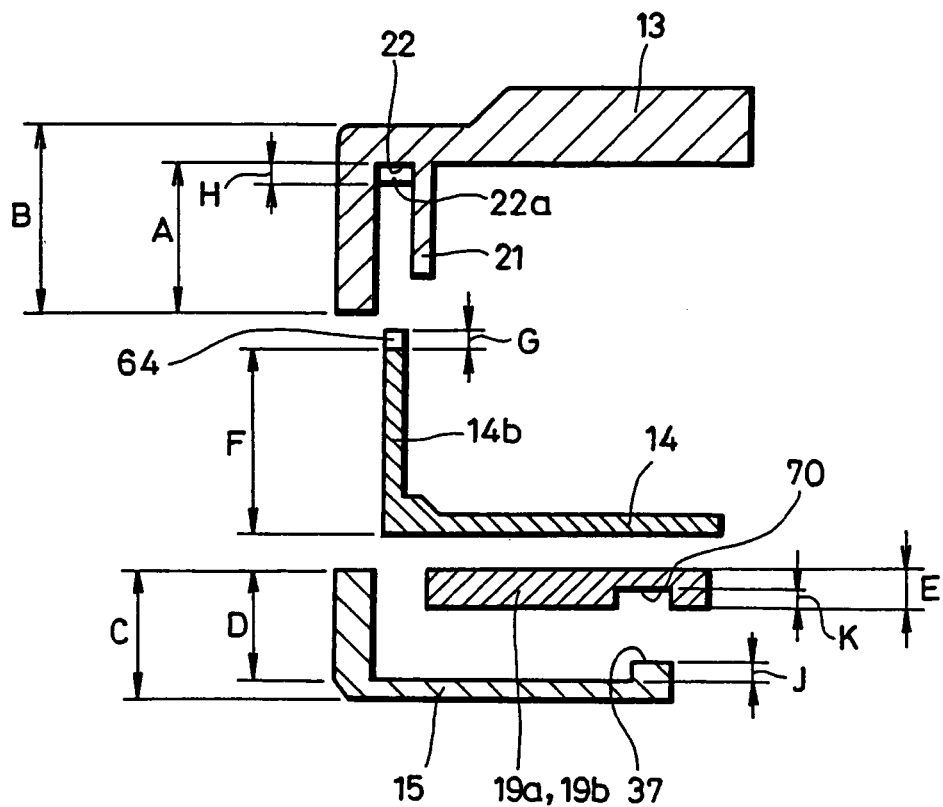
FIG. 24 is a diagram to which reference will be made in explaining how to calculate clearances among a cam portion of the upper shell and a cam protrusion of a rotary member of the disk cartridge according to the present invention and shows sizes of the upper shell, the rotary member, the lower shell and the shutter member in the form of reference numerals.

In the above-mentioned disk recording medium device 10, the sizes of the thickness direction among the upper shell 13, the rotary member 14, the lower shell 15 and the shutter members 19*a*, 19*b* should preferably be set so as to satisfy the relationships shown in FIGS. 24 and 25 and an equation •. Meanings of reference letters A to K shown in FIG. 24 and reference symbol Σ shown in FIG. 25 are as follows:

(1) A: height from the end face of an upper front surface edge 13*a* of the upper shell 13 or the like to the surface of the cam groove 22
A=2.9 mm+0.1/0 mm
(2) B: height from the end face of the upper front surface edge 13*a* of the upper shell 13 or the like to the upper surface
B=3.85 mm±0.05 mm (reference size)
(3) C: height from the end face of the lower front surface edge 15*a* of the lower shell 15 or the like to the lower surface
C=4.15 mm+0.1/−0 mm (reference size)
(4) D: height from the end face of the lower front surface edge 15*a* of the lower shell 15 or the like to the bottom surface
D=3.3 mm±0.05 mm
(5) E: thickness of the shutter members 19*a*, 19*b*
E=1.1 mm+0/−0.05 mm
(6) F: height from the lower surface of the rotary member 14 to the end face
F=4.7 mm+0/−0.1 mm
(7) G: height of the cam protrusion 64 of the rotary member 14
G=0.2 mm+0/−0.05 mm
(8) H: height of the cam portion 22*a* of the upper shell 13
H=0.2 mm+0/−0.05 mm
(9) J: height of the rib 37 of the lower shell 15
J=0.2 mm+0/−0.05 mm (reference size)
(10) K: depth of the rib escape groove 70 of the shutter members 19*a*, 19*b*
K=0.2 mm+0.05/−0 mm (reference size)
(11) Σ: ideal clearance produced between the cam portion 22*a* and the cam protrusion 64 upon assembly-process $$\sum = -H + A + D - E - F - G \cdots.$$
$$= 0 \text{ mm} + 0.45 / -0 \text{ mm (accumulated tolerance)}$$
$$0.064 \text{ mm} + 0.322 / -0 \text{ mm (mean square} \times 1.66)$$

As is clear from the above-mentioned equation •, the ideal clearance Σ should preferably be selected in a range of from 0 mm to 0.45 mm and the most preferable value of the ideal clearance is approximately 0.2 mm.

In this embodiment, the rotary member 14 that rotates to open and close the shutters may be operated in a clearance of approximately 0.4 mm (center value of tolerance) between the upper shell 13 and the lower shell 15. The clearance is narrowed to approximately 0.2 mm when the disk recording medium device is preserved. When the clearance ranging from 0 mm to 0.45 mm (optimum value is about 0.2 mm) is set while the rotary member 14 is not urged against the upper shell 13 as described above, the route in which dusts and smudges may enter the disk recording medium device can be narrowed as much as possible so that dusts and smudges can be prevented from entering the disk compartment 16 effectively.

Moreover, in this embodiment, since the rib 37 (arc-like rib portion 37*a* and linear rib portion 37*b*) is provided on the peripheral edge portion of the outside opening portion 17 of the lower shell 15, the rib escape groove 70 is provided at the portion opposing a pair of shutter members 19*a*, 19*b* that opposes the rib 37 in the shutter closed state and the rib 37 and the rib escape groove 70 constitute the dust-proof clearance 71, a dust-proof property obtained when the disk recording medium device 10 is preserved in which the opening portions 17, 18 are completely closed by the shutter members 19*a*, 19*b* can be improved and hence dusts and smudges can be effectively prevented from entering the disk compartment 16.

Figure 42:
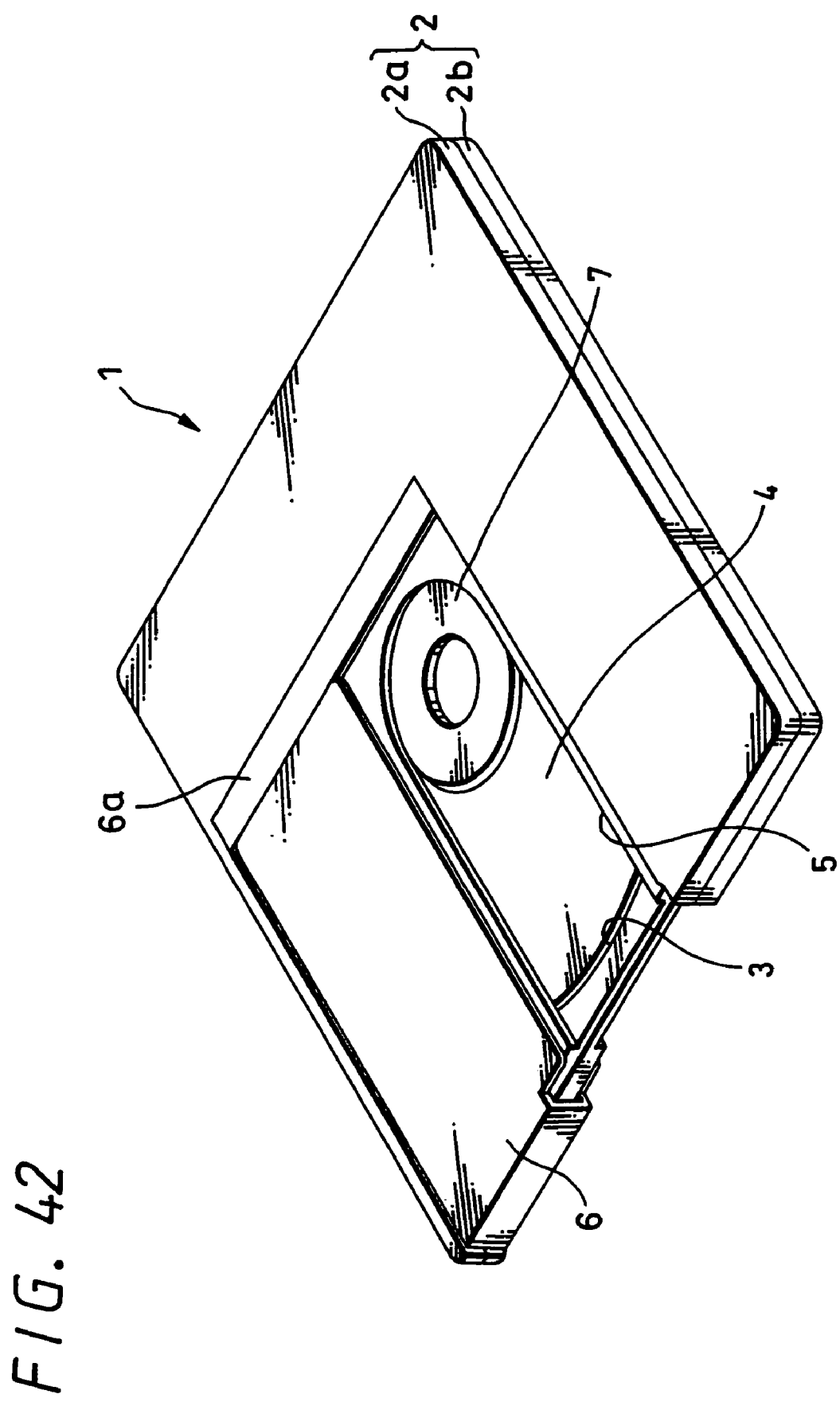
FIG. 42 is a perspective view showing a disk cartridge according to the prior art.

The cartridge housing can be configured by combining the upper and lower shells without the rotary member. Then, as shown in FIG. 42 which shows an example of the prior art, a cartridge housing may include a shutter member that can linearly move to open and close an opening portion. If the cartridge housing having such arrangement is provided with the chucking ring 33 and the ring holder 34 of the above-mentioned embodiment, similar effects to those of the above-mentioned embodiment can be achieved. Further, the opening portion may include only either the upper shell or the lower shell. In such case, the chucking ring may be provided on a shell having no shell formed thereon.

The present invention has been described so far but the present invention is not limited to the above-mentioned embodiment. For example, while the present invention is applied to the example in which the optical disk is used as the information recording medium as described above, the present invention can be applied to magnetic disks such as a magneto-optical disk and a flexible disk and other various kinds of disk-like recording mediums. Further, while the present invention is applied to the example in which the disk recording and reproducing apparatus capable of both of recording and reproducing information is used as the disk recording and/or reproducing apparatus as described above, it is needless to say that the present invention may be applied to a disk recording apparatus or a disk reproducing apparatus that is capable of either recording or reproducing information.

While the lower shell 15 and the rotary member 14 of the cartridge housing 12 are provided with the opening portions 17, 18 as described above, the present invention is not limited thereto and the upper shell 13, for example, may be provided with an opening portion to enable users to access the disk recording medium device from the upper and lower directions of the cartridge housing 12. In this case, the above-mentioned convex rib and concave groove may be set on the rotary member and the shutter member. Further, the rotary member and the lower shell may constitute a disk compartment, a disk-like recording medium may be accommodated within this disk compartment and the upper shell may be provided with an opening portion. In this case, the above-mentioned chucking ring 33 is provided on the lower shell.

Furthermore, while the shutter opening and closing means is fixed and the opening portion is opened and closed by moving the disk recording medium device when the shutter is opened and closed as described above, the present invention is not limited thereto and the shutter member may be opened and closed by relatively moving the shutter opening and closing means and the disk cartridge. For example, the shutter member may be opened and closed by moving the shutter opening and closing means with a suitable means such as a motor after the disk recording medium device has been fixed to the disk loading portion.

As described above, the present invention can be variously modified without departing from the gist thereof.

INDUSTRIAL APPLICABILITY

As described above, according to the disk cartridge of the present application, in the disk cartridge comprising the cartridge housing (combination of the upper shell and the lower shell or combination of the upper shell, the rotary member and the lower shell) including the disk compartment, the shutter member that is movable between the opening position and the closing position to open and close the opening portion and the shutter fixing means for holding the shutter member in the closed state at the closing position, since the shutter member is held in the opened state by the shutter fixing means even at the opening position, the shutter member need not be held in the opened state by the open and hold mechanism of the external apparatus. Thus, there is no risk that vibrations generated from the external apparatus will be transmitted through the open and hold mechanism to the disk cartridge and the like. Therefore, malfunctions caused by vibrations can be prevented or suppressed when information is written and read. Moreover, even when shocks are applied to the external apparatus, the open and hold mechanism is disengaged from the disk cartridge and the shutter member can be prevented from being moved to the closed state automatically. There is then no risk that the shutter member will contact with the optical head of the optical pickup device and the turntable. Accordingly, there can be removed a risk that the optical head and the shutter member will be broken.

Further, according to the disk recording medium device of the present application, in the disk recording medium device comprising the cartridge housing (combination of the upper shell and the lower shell or combination of the upper shell, the rotary member and the lower shell) including the disk compartment, the disk-like recording medium, the shutter member that is movable between the opening position and the closing position to open and close the opening portion and the shutter fixing means for holding the shutter member in the closed state at the closing position, since the shutter member is held in the opened state by the shutter fixing means even at the opening position, the shutter member need not be held in the opened state by the open and hold mechanism of the external apparatus. Thus, there is no risk that vibrations generated from the external apparatus will be transmitted through the open and hold mechanism to the disk cartridge and the like. Therefore, malfunctions caused by vibrations can be prevented or suppressed when information is written and read. Moreover, even when shocks are applied to the external apparatus, the open and hold mechanism is disengaged from the disk cartridge and the shutter member can be prevented from being moved to the closed state automatically. There is then no risk that the shutter member will contact with the optical head of the optical pickup device and the turntable. Accordingly, there can be removed a risk that the optical head and the shutter member will be broken.

Further, according to the disk recording and/or reproducing apparatus of the present application, in the disk recording and reproducing apparatus comprising the disk recording medium device including the disk compartment in which the disk-like recording medium is accommodated and the shutter member movable between the opening position at which it opens the opening portion formed so as to expose a part of the disk-like recording medium and the closing position at which it closes the opening portion, the shutter opening and closing means for opening and closing the shutter member and the table drive apparatus for chucking and rotating the disk-like recording medium, since the shutter member is held in the opened state by the shutter fixing means even at the opening position, the shutter member need not be held in the opened state by the open and hold mechanism of the external apparatus. Thus, there is no risk that vibrations generated from the external apparatus will be transmitted through the open and hold mechanism to the disk cartridge and the like. Therefore, malfunctions caused by vibrations can be prevented or suppressed when information is written and read. Moreover, even when shocks are applied to the external apparatus, the open and hold mechanism is disengaged from the disk cartridge and the shutter member can be prevented from being moved to the closed state automatically. There is then no risk that the shutter member will contact with the optical head of the optical pickup device and the turntable. Accordingly, there can be removed a risk that the optical head and the shutter member will be broken. Therefore, the information signal is recorded and reproduced by using the disk recording medium device in which the optical head and the shutter member can be prevented from being broken. Thus, reading and writing of information can be normally executed in safety.

The invention claimed is:

1. A disk cartridge comprising:
a cartridge housing in which a disk compartment is formed by an upper shell and a rotary member or between said rotary member and a lower shell by combining said upper shell, said rotary member and said lower shell, said rotary member is supported by at least one of said upper shell and said lower shell so as to become freely rotatable and in which an opening portion is provided on at least one of said upper shell and said lower shell or on at least one of said upper shell and said lower shell and said rotary member;
a shutter member provided on said cartridge housing so as to become movable between the opening position at which it opens said opening portion and the closing position at which it closes said opening portion in response to rotation of said rotary member; and
shutter fixing means for holding said shutter member in a closed state at said closing position, a disk cartridge characterized in that said shutter member is held in the opened state at said opening position by said shutter fixing means.

2. A disk cartridge according to claim 1, wherein said shutter fixing means is a lock member supported to at least one of said upper shell and said lower shell so as to become freely rotatable and which is engaged with said rotary member to lock said rotary member at both positions of said opening position and said closing position.

3. A disk cartridge according to claim 2, wherein said lock member includes a lock claw detachably engaged with said rotary member, a resilient member for spring-biasing said lock claw toward said rotary member and an input portion operated by action of external force to release said rotary member from being locked by said lock claw against spring force of said resilient member.

4. A disk cartridge according to claim 3, wherein said lock member is longer in the direction in which said external force acts on said input portion than a distance between iddendums of a gear portion that is provided on said rotary member to rotate said rotary member.

5. A disk cartridge according to claim 1, wherein said rotary member includes a first engagement portion and a second engagement portion that are respectively engaged with said lock claw at both positions of said opening position and said closing position.

6. A disk cartridge according to claim 1, wherein said shutter member is formed of two plate materials of substantially semicircular shape and said two shutter members forming a pair are disposed on at least one surface side of said rotary member, said upper shell and said lower shell having said opening portion so as to oppose to each other across said opening portion.

7. A disk cartridge according to claim 6, wherein said pair of shutter members is supported to at least one of said upper shell and said lower shell so as to freely rotate about supporting points corresponding to respective shutter members.

8. A disk cartridge according to claim 6, wherein said pair of shutter members is supported to said rotary member so as to freely rotate about supporting points corresponding to respective shutter members and said pair of shutter members is supported to at least one of said upper shell and said lower shell by supporting points corresponding to said two shutter members so as to become freely slidable.

9. A disk cartridge comprising:
a cartridge housing in which a disk compartment is formed by combining an upper shell and a lower shell and in which an opening portion is provided on at least one of said upper shell and said lower shell;
a rotary member, wherein a disk compartment is formed between the upper shell and the rotary member or between the lower shell and the rotary member;
a shutter member provided on said cartridge housing so as to become movable by the opening position at which it opens said opening portion and the closing position at which it closes said opening portion; and
shutter fixing means for holding said shutter member in a closed state at said closing position, a disk cartridge characterized in that said shutter member is held in the opened state by said shutter fixing means at said opening position.

10. A disk recording medium device comprising:
a cartridge housing in which a disk compartment is formed between an upper shell and a rotary member or by said rotary member and a lower shell by combining said upper shell, said rotary member and said lower shell, said rotary member is supported by at least one of said upper shell and said lower shell so as to become freely rotatable and an opening portion is formed between at least one of said upper shell and said lower shell or between at least one of said upper shell and said lower shell and said rotary member;
a disk-like recording medium accommodated within said disk compartment so as to become freely rotatable;
a shutter member provided on said cartridge housing so as to become freely movable between the opening position at which it opens said opening portion and the closing position at which it closes said opening portion; and
shutter fixing means for holding said shutter member in the closed state at said closing position, a disk recording medium device characterized in that said shutter number is held in the opened state at said opening position by said shutter fixing means.

11. A disk recording medium device according to claim 10, wherein said shutter fixing means is a lock member supported to at least one of said upper shell and said lower shell so as to become freely rotatable and which is engaged with said rotary member to lock said rotary member at both positions of said opening position and said closing position.

12. A disk recording medium device according to claim 11, wherein said lock member includes a lock claw engaged with said rotary member cons to become freely detachable, a resilient member for spring biasing said lock claw toward said rotary member and an input portion operated by action of external force to release said rotary member from being locked by said lock claw against spring force of said resilient member.

13. A disk recording medium device according to claim 12, wherein said lock member is longer in the direction in which said external force acts on said input portion than a distance between addendums of a gear portion that is provided on said rotary member to rotate said rotary member.

14. A disk recording medium device according to claim 10, wherein said rotary member includes a first engagement portion and a second engagement portion that are respectively engaged with said lock claw at both positions of said opening position and said closing position.

15. A disk recording medium device according to claim 10, wherein said shutter member is formed of two plate materials of substantially semicircular shape and said two shutter members forming a pair are disposed on at least one surface side of said rotary member, said upper shell and said lower shell having said opening portion so as to oppose to each other across said opening portion.

16. A disk recording medium device according to claim 15, wherein said pair of shutter members is supported to at least one of said upper shell and said lower shell so as to freely rotate about supporting points corresponding to respective shutter members.

17. A disk-recording medium device according to claim 15, wherein said pair of shutter members is supported to said rotary member so as to freely rotate about supporting points corresponding to respective shutter members and said pair of shutter members is supported to at least one of said upper shell and said lower shell by supporting points corresponding to said two shutter members so as to become freely slidable.

18. A disk recording medium device comprising:
a cartridge housing in which a disk compartment is formed by combining an upper shell and a lower shell and in which an opening portion is provided on at least one of said upper shell and said lower shell;
a rotary member, wherein a disk compartment is formed between the upper shell and the rotary member or by the lower shell and the rotary member;
a disk-like recording medium accommodated within said disk compartment so as to freely become rotatable;
a shutter member provided on said cartridge housing so as to become movable between the opening position at which it opens said opening portion and the closing position at which it closes said opening portion; and
shutter fixing means for holding said shutter member in a closed state at said closing position, a disk recording medium device characterized in that said shutter member is held in the opened state at said opening position by said shutter fixing means.

19. A disk recording and/or reproducing apparatus comprising:

a disk recording medium device consisting of a cartridge housing having a disk compartment in which a disk-like recording medium is accommodated so as to become freely rotatable, a shutter member movable between the opening position at which it opens an opening portion provided on said cartridge housing so as to expose a part of said disk-like recording medium and the closing position at which it closes said opening portion and shutter fixing means for holding said shutter member in the closed state at said closing position;

shutter opening and closing means for opening and closing said opening portion by moving said shutter member in response to insertion and ejection operations of said disk recording medium device and a table drive apparatus on which said disk recording medium device is loaded detachably and which is inserted into said recording and/or reproducing apparatus from said opening portion opened by said shutter opening and closing means to chuck and rotate said disk-like recording medium when said disk recording medium device is loaded onto said disk recording and/or reproducing apparatus, a disk recording and/or reproducing apparatus characterized in that slid cartridge housing is formed by combining an upper shell and a lower steel or by combining said upper shell, a rotary member and said lower shell, said disk compartment is formed by said upper shell and said lower shell or between said upper shell and said rotary member or between said rotary member and said lower shell and said shutter member is held in the opened state at said opening position by said shutter fixing means, wherein said shutter fixing means is a holding member supported to at least one of said upper shell and said lower shell so as to become freely rotatable and which is engaged with said rotary member to hold said rotary member at both positions of said opening position and said closing position.

20. A disk recording and/or reproducing apparatus according to claim 19, wherein said lock member includes a lock claw engaged with said rotary member so as to become freely detachable, a resilient member for spring-biasing said lock claw toward said rotary member and an input portion operated by action of external force to release said rotary member from being locked by said lock claw against spring force of said resilient member.

21. A disk recording and/or reproducing apparatus according to claim 20, wherein said lock member is longer in the direction in which said external force acts on said input portion than a distance between addendums of a gear portion that is provided on said rotary member to rotate said rotary member.

22. A disk recording and/or reproducing apparatus comprising:

a disk recording medium device consisting of a cartridge housing having a disk compartment in which a disk-like recording medium is accommodated so as to become freely rotatable, a shutter member movable between the opening position at which it opens an opening portion provided on said cartridge housing so as to expose a part of said disk-like recording medium and the closing position at which it closes said opening portion and shutter fixing means for holding said shutter member in the closed state at said closing position;

shutter opening and closing means for opening and closing said opening portion by moving said shutter member in response to insertion and ejection operations of said disk recording medium device and a table drive apparatus on which said disk recording medium device is loaded detachably and which is inserted into said recording and/or reproducing apparatus from said opening portion opened by said shutter opening and closing means to chuck and rotate said disk-like recording medium when said disk recording medium device is loaded onto said disk recording and/or reproducing apparatus, a disk recording and/or reproducing apparatus characterized in that slid cartridge housing is formed by combining an upper shell and a lower steel or by combining said upper shell, a rotary member and said lower shell, said disk compartment is formed by said upper shell and said rotary member or by said rotary member and said lower shell and said shutter member is held in the opened state at said opening position by said shutter fixing means, wherein said rotary member includes a first engagement portion and a second engagement portion that are respectively engaged with said lock claw at both positions of said opening position and said closing position.

23. A disk recording and/or reproducing apparatus comprising:

a disk recording medium device consisting of a cartridge housing having a disk compartment in which a disk-like recording medium is accommodated so as to become freely rotatable, a shutter member movable between the opening position at which it opens an opening portion provided on said cartridge housing so as to expose a part of said disk-like recording medium and the closing position at which it closes said opening portion and shutter fixing means for holding said shutter member in the closed state at said closing position;

shutter opening and closing means for opening and closing said opening portion by moving said shutter member in response to insertion and ejection operations of said disk recording medium device and a table drive apparatus on which said disk recording medium device is loaded detachably and which is inserted into said recording and/or reproducing apparatus from said opening portion opened by said shutter opening and closing means to chuck and rotate said disk-like recording medium when said disk recording medium device is loaded onto said disk recording and/or reproducing apparatus, a disk recording and/or reproducing apparatus characterized in that slid cartridge housing is formed by combining an upper shell and a lower steel or by combining said upper shell, a rotary member and said lower shell, said disk compartment is formed by said upper shell and said rotary member or between said rotary member and said lower shell and said shutter member is held in the opened state at said opening position by said shutter fixing means, wherein said shutter member is formed of two plate materials of substantially semicircular shape and said two shutter members forming a pair are disposed on at least one surface side of said rotary member, said upper shell and said lower shell having said opening portion so as to oppose to each other across said opening portion.

24. A disk recording and/or reproducing apparatus comprising:

a disk recording medium device consisting of a cartridge housing having a disk compartment in which a disk-like recording medium is accommodated so as to become freely rotatable, a shutter member movable between the opening position at which it opens an opening portion provided on said cartridge housing so as to expose a part of said disk-like recording medium and the closing position at which it closes said opening portion and shutter fixing means for holding said shutter member in the closed state at said closing position;

shutter opening and closing means for opening and closing said opening portion by moving said shutter member in response to insertion and ejection operations of said disk recording medium device and a table drive apparatus on which said disk recording medium device is loaded detachably and which is inserted into said recording and/or reproducing apparatus from said opening portion opened by said shutter opening and closing means to chuck and rotate said disk-like recording medium when said disk recording medium device is loaded onto said disk recording and/or reproducing apparatus, a disk recording and/or reproducing apparatus characterized in that slid cartridge housing is formed by combining an upper shell and a lower steel or by combining said upper shell, a rotary member and said lower shell, said disk compartment is formed by said upper shell and said rotary member or by said rotary member and said lower shell and said shutter member is held in the opened state at said opening position by said shutter fixing means, wherein said pair of shutter members is supported to at least one of said upper shell and said lower shell so as to freely rotate about supporting points corresponding to respective shutter members.

25. A disk recording and/or reproducing apparatus according to claim 24, wherein said pair of shutter members is supported to said rotary member so as to freely rotate about supporting points corresponding to respective shutter members and said pair of shutter members is supported to at least one of said upper shell and said lower shell by supporting points corresponding to said two shutter members so as to become freely slidable.

26. A disk recording and/or reproducing apparatus comprising:

a disk recording medium device consisting of a cartridge housing having a disk compartment in which a disk-like recording medium is accommodated so as to become freely rotatable, a shutter member movable between the opening position at which it opens an opening portion provided on said cartridge housing so as to expose a part of said disk-like recording medium and the closing position at which it closes said opening portion and shutter fixing means for holding said shutter member in the closed state at said closing position;

shutter opening and closing means for opening and closing said opening portion by moving said shutter member in response to insertion and ejection operations of said disk recording medium device and a table drive apparatus on which said disk recording medium device is loaded detachably and which is inserted into said recording and/or reproducing apparatus from said opening portion opened by said shutter opening and closing means to chuck and rotate said disk-like recording medium when said disk recording medium device is loaded onto said disk recording and/or reproducing apparatus, a disk recording and/or reproducing apparatus characterized in that slid cartridge housing is formed by combining an upper shell and a lower steel or by combining said upper shell, a rotary member and said lower shell, said disk compartment is formed by said upper shell and said rotary member or by said rotary member and said lower shell and said shutter member is held in the opened state at said opening position by said shutter fixing means, wherein said shutter opening and closing means includes a rack portion and convex portions disposed ahead of and behind said rack portions, said rotary member includes a gear portion meshed with said rack portion and concave portions disposed ahead of and behind said gear portion aid said rotary member is caused to rotate based upon movement of said shutter opening and closing means.

* * * * *